(12) United States Patent
Tseng et al.

(10) Patent No.: US 10,444,471 B2
(45) Date of Patent: Oct. 15, 2019

(54) IMAGE SYSTEM LENS ASSEMBLY, IMAGE CAPTURING UNIT AND ELECTRONIC DEVICE

(71) Applicant: LARGAN Precision Co., Ltd., Taichung (TW)

(72) Inventors: Yu-Tai Tseng, Taichung (TW); Tzu-Chieh Kuo, Taichung (TW)

(73) Assignee: LARGAN Precision Co., Ltd., Taichung (TW)

( * ) Notice: Subject to any disclaimer, the term of this patent is extended or adjusted under 35 U.S.C. 154(b) by 90 days.

(21) Appl. No.: 15/795,003

(22) Filed: Oct. 26, 2017

(65) Prior Publication Data

US 2019/0079270 A1   Mar. 14, 2019

(30) Foreign Application Priority Data

Sep. 13, 2017 (TW) .............................. 106131474 A

(51) Int. Cl.
  *G02B 13/00* (2006.01)
  *G02B 9/64* (2006.01)
  *G02B 27/00* (2006.01)
  *H04N 5/232* (2006.01)

(52) U.S. Cl.
  CPC ............ *G02B 13/0045* (2013.01); *G02B 9/64* (2013.01); *G02B 27/0025* (2013.01); *H04N 5/23212* (2013.01)

(58) Field of Classification Search
  CPC .............................. G02B 13/0045; G02B 9/64
  USPC ................................................. 359/708, 755
  See application file for complete search history.

(56) References Cited

U.S. PATENT DOCUMENTS

| | | |
|---|---|---|
| 6,185,050 B1 | 2/2001 | Ota et al. |
| 9,851,536 B2 * | 12/2017 | Tang ................... G02B 13/0045 |
| 9,904,014 B1 | 2/2018 | Chang et al. |
| 2014/0307333 A1 | 10/2014 | Kawamura |
| 2014/0307338 A1 | 10/2014 | Kawamura |
| 2015/0198787 A1 | 7/2015 | Kubota et al. |
| 2015/0198791 A1 | 7/2015 | Kubota et al. |
| 2015/0247990 A1 | 9/2015 | Kubota et al. |
| 2015/0268448 A1 | 9/2015 | Kubota et al. |
| 2015/0268452 A1 | 9/2015 | Kawamura |
| 2015/0362704 A1 | 12/2015 | Kubota et al. |

(Continued)

FOREIGN PATENT DOCUMENTS

| | | |
|---|---|---|
| CN | 101806951 A | 8/2010 |
| JP | H11-281888 | 10/1999 |

(Continued)

OTHER PUBLICATIONS

Lohmann, Adolf W. "Scaling Laws for Lens Systems." Applied Optics, vol. 28, No. 23, 1989, p. 4996-4998.*

*Primary Examiner* — Zachary W Wilkes
(74) *Attorney, Agent, or Firm* — Hanley, Flight & Zimmerman, LLC

(57) ABSTRACT

An image system lens assembly includes seven lens elements which are, in order from an object side to an image side: a first lens element, a second lens element, a third lens element, a fourth lens element, a fifth lens element, a sixth lens element and a seventh lens element. At least one surface among object-side surfaces and image-side surfaces of the fifth lens element, the sixth lens element and the seventh lens element has at least one critical point in an off-axis region thereof.

24 Claims, 30 Drawing Sheets

(56) References Cited

U.S. PATENT DOCUMENTS

| | | |
|---|---|---|
| 2016/0116717 A1 | 4/2016 | Kubota et al. |
| 2016/0124191 A1 | 5/2016 | Hashimoto |
| 2016/0370560 A1 | 12/2016 | Kubota et al. |
| 2016/0377841 A1 | 12/2016 | Kubota et al. |
| 2017/0010449 A1 | 1/2017 | Kubota et al. |
| 2017/0075089 A1 | 3/2017 | Nagami et al. |
| 2017/0075091 A1 | 3/2017 | Kubota et al. |
| 2017/0168267 A1 | 6/2017 | Tang et al. |
| 2017/0168268 A1 | 6/2017 | Tang et al. |
| 2017/0184819 A1 | 6/2017 | Shi |
| 2017/0184820 A1 | 6/2017 | Shi |
| 2017/0184821 A1 | 6/2017 | Shi |
| 2017/0184822 A1 | 6/2017 | Shi |
| 2018/0196225 A1 | 7/2018 | Chang et al. |
| 2018/0196239 A1 | 7/2018 | Chang et al. |
| 2018/0231748 A1 * | 8/2018 | Chang et al. |
| 2018/0335608 A1 * | 11/2018 | Chang ................ G02B 13/0045 |
| 2018/0335609 A1 | 11/2018 | Chang et al. |

FOREIGN PATENT DOCUMENTS

| | | |
|---|---|---|
| JP | 2014-021340 | 2/2014 |
| JP | 2014055992 A | 3/2014 |
| JP | 2017-161845 | 9/2017 |
| TW | I650577 | 2/2019 |
| TW | I650578 | 2/2019 |
| TW | I650589 | 2/2019 |
| TW | I650591 | 2/2019 |

* cited by examiner

IMAGE SYSTEM LENS ASSEMBLY, IMAGE CAPTURING UNIT AND ELECTRONIC DEVICE

RELATED APPLICATIONS

This application claims priority under 35 U.S.C. § 119 to Taiwan Application 106131474, filed Sep. 13, 2017, which is incorporated by reference herein in its entirety.

BACKGROUND

Technical Field

The present disclosure relates to an image system lens assembly, an image capturing unit and an electronic device, more particularly to an image system lens assembly and an image capturing unit applicable to an electronic device.

Description of Related Art

In recent years, with the popularity of electronic devices having camera functionalities, the demand of miniaturized optical systems has been increasing. As advanced semiconductor manufacturing technologies have reduced the pixel size of sensors, and compact optical systems have gradually evolved toward the field of higher megapixels, there is an increasing demand for compact optical systems featuring better image quality.

With the rapid development of technology, the optical systems are widely applied to different kinds of electronic devices. Furthermore, with the development of portable electronic devices towards multi-functionality, the required image quality is increasing and the size constraint on the optical systems is more stringent. Now, a conventional optical system has a total of six lens elements is already incapable of meeting the current demand for high standard image quality. Therefore, it is a trend to develop an optical system having seven lens elements in order to meet the requirement of the high standard image quality. However, it is difficult for the optical system having seven lens elements to satisfy the size limitation for portable electronic devices. Accordingly, there is a need to develop an optical system featuring high image quality and compact size.

SUMMARY

According to one aspect of the present disclosure, an image system lens assembly includes seven lens elements. The seven lens elements are, in order from an object side to an image side, a first lens element, a second lens element, a third lens element, a fourth lens element, a fifth lens element, a sixth lens element and a seventh lens element. At least one surface among object-side surfaces and image-side surfaces of the fifth lens element, the sixth lens element and the seventh lens element has at least one critical point in an off-axis region thereof. When a number of lens element having an Abbe number less than 38 among the seven lens elements is NVd38, a displacement in parallel with an optical axis from an axial vertex of an image-side surface of the fourth lens element to a maximum effective radius position of the image-side surface of the fourth lens element is Sag42, and a central thickness of the fourth lens element is CT4, the following conditions are satisfied:

$5 \leq NVd38$; and $-1.5 < Sag42/CT4 < 3.0$.

According to another aspect of the present disclosure, an image capturing unit includes the aforementioned image system lens assembly and an image sensor, wherein the image sensor is disposed on an image surface of the image system lens assembly.

According to still another aspect of the present disclosure, an electronic device includes the aforementioned image capturing unit.

According to yet another aspect of the present disclosure, an image system lens assembly includes seven lens elements. The seven lens elements are, in order from an object side to an image side, a first lens element, a second lens element, a third lens element, a fourth lens element, a fifth lens element, a sixth lens element and a seventh lens element. At least one surface among object-side surfaces and image-side surfaces of the seven lens elements has at least one critical point in an off-axis region thereof. When a number of lens element having an Abbe number less than 38 among the seven lens elements is NVd38, an axial distance between an object-side surface of the first lens element and an image surface is TL, an entrance pupil diameter of the image system lens assembly is EPD, a focal length of the image system lens assembly is f, a curvature radius of an object-side surface of the fifth lens element is R9, and a curvature radius of an image-side surface of the fifth lens element is R10, the following conditions are satisfied:

$5 \leq NVd38$;

$0.8 < TL/EPD < 2.8$; and $0 \leq |f/R9| + |f/R10| < 5.0$.

BRIEF DESCRIPTION OF THE DRAWINGS

The disclosure can be better understood by reading the following detailed description of the embodiments, with reference made to the accompanying drawings as follows.

DETAILED DESCRIPTION

An image system lens assembly includes seven lens elements. The seven lens elements are, in order from an object side to an image side, a first lens element, a second lens element, a third lens element, a fourth lens element, a fifth lens element, a sixth lens element and a seventh lens element.

The first lens element can have positive refractive power; therefore, it is favorable for converging light rays and reducing a total track length of the image system lens assembly. The first lens element can have an object-side surface being convex in a paraxial region thereof; therefore, it is favorable for the first lens element to have sufficient positive refractive power so as to reduce the total track length.

The second lens element can have negative refractive power. Therefore, it is favorable for correcting spherical aberration and chromatic aberration generated by the first lens element.

The sixth lens element can have an object-side surface being convex in a paraxial region thereof. Therefore, a shape of the sixth lens element is favorable for correcting field curvature.

The seventh lens element can have negative refractive power; therefore, it is favorable for moving a principal point toward the object side of the image system lens assembly so as to reduce a back focal length, thereby reducing the total track length. The seventh lens element can have an object-side surface being convex in a paraxial region thereof; therefore, it is favorable for minimizing astigmatism. The seventh lens element can have an image-side surface being concave in a paraxial region thereof; therefore, it is favorable for adjusting the back focal length so as to meet the requirement of compactness.

Figure 29:
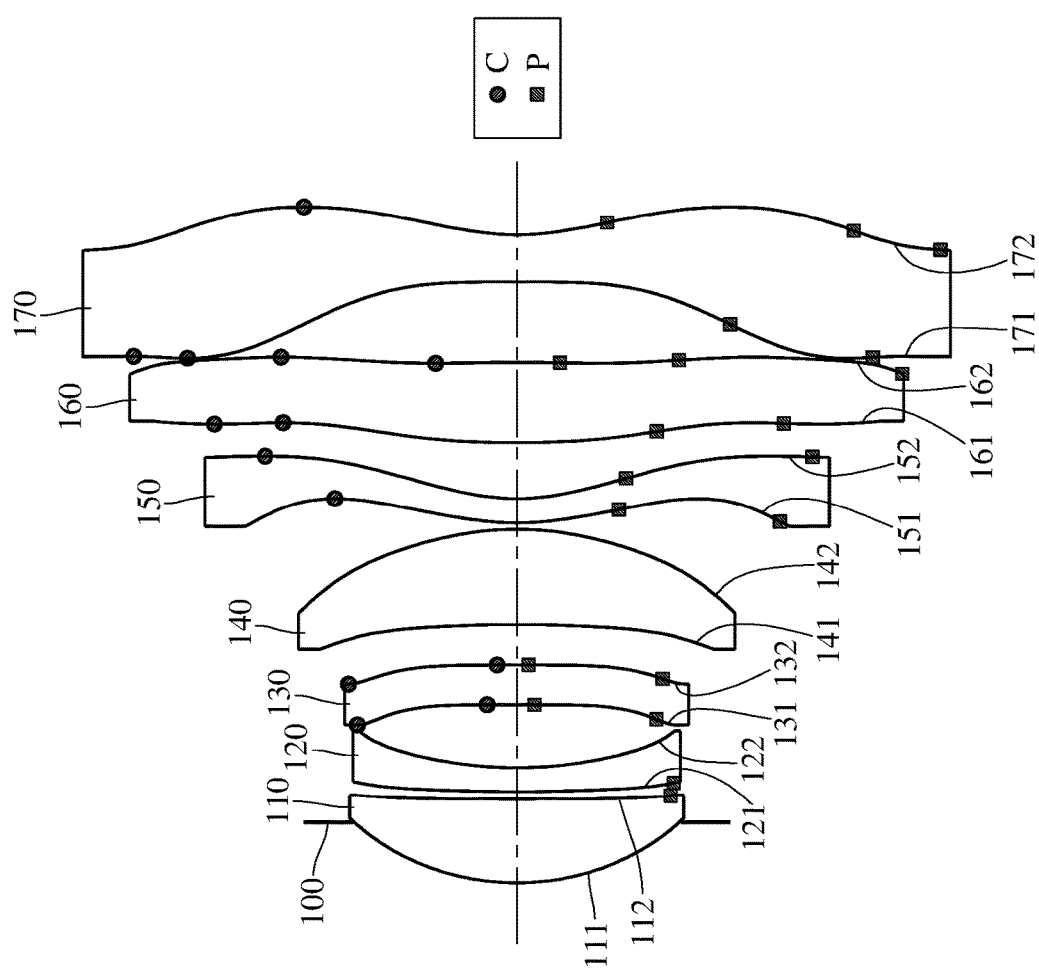
FIG. 29 shows a schematic view of critical points and inflection points of the lens elements according to the 1st embodiment of the present disclosure.

According to the present disclosure, at least one surface among object-side surfaces and image-side surfaces of the seven lens elements can have at least one critical point in an off-axis region thereof; therefore, it is favorable for correcting off-axis aberrations so as to enhance image sharpness and reducing the size of the image system lens assembly. Preferably, at least one surface among the object-side surfaces and the image-side surfaces of the fifth lens element, the sixth lens element and the seventh lens element can have at least one critical point in an off-axis region thereof; therefore, the critical points on the image side of the image system lens assembly is favorable for adjusting the incident angle in the off-axis region so as to increase illuminance at the periphery of an image surface and further correct off-axis aberrations. More preferably, at least one surface among the object-side surfaces and the image-side surfaces of the sixth lens element and the seventh lens element can have at least one critical point in an off-axis region thereof. Much more preferably, the image-side surface of the seventh lens element can have at least one critical point in an off-axis region thereof. Please refer to FIG. 29, which shows a schematic view of critical points C of the lens elements according to the 1st embodiment of the present disclosure.

According to the present disclosure, at least one of the seven lens elements can have an Abbe number less than 20. Therefore, an arrangement of the Abbe numbers of the lens elements is favorable for correcting chromatic aberration. Preferably, each of at least two lens elements of the seven lens elements can have an Abbe number less than 20. In addition, said Abbe number of a lens element is defined with the refractive index of material at the wavelength of helium d-line.

According to the present disclosure, each of at least two of the seven lens elements of the image system lens assembly can have at least one inflection point. Therefore, it is favorable for reducing the incident angle on the surfaces of the lens elements so as to prevent surface reflection, and providing the lens elements with a proper shape at the periphery thereof so as to increase manufacturing yield. Please refer to FIG. 29, which shows a schematic view of inflection points P of the lens elements according to the 1st embodiment of the present disclosure.

According to the present disclosure, among the seven lens elements of the image system lens assembly, each of at least three adjacent lens elements can have an Abbe number less than 38. Therefore, arranging at least three adjacent lens elements with each of them having low Abbe number is favorable for minimizing chromatic aberration. Preferably, each of the at least three adjacent lens elements can have an Abbe number less than 35.

When the number of lens element having an Abbe number less than 38 among the seven lens elements is NVd38, the following condition is satisfied: $5 \leq$ NVd38. Therefore, it is favorable for correcting chromatic aberration so as to reduce colour cast; furthermore, the lens elements made of materials having a low Abbe number can have a higher refractive index, which is favorable for correcting aberrations and achieving compactness. Preferably, when the number of lens element having an Abbe number less than 35 among the seven lens elements is NVd35, the following condition can be satisfied: $5 \leq$ NVd35. More preferably, when the number of lens element having an Abbe number less than 32 among the seven lens elements is NVd32, the following condition can be satisfied: $5 \leq$ NVd32.

Figure 30:
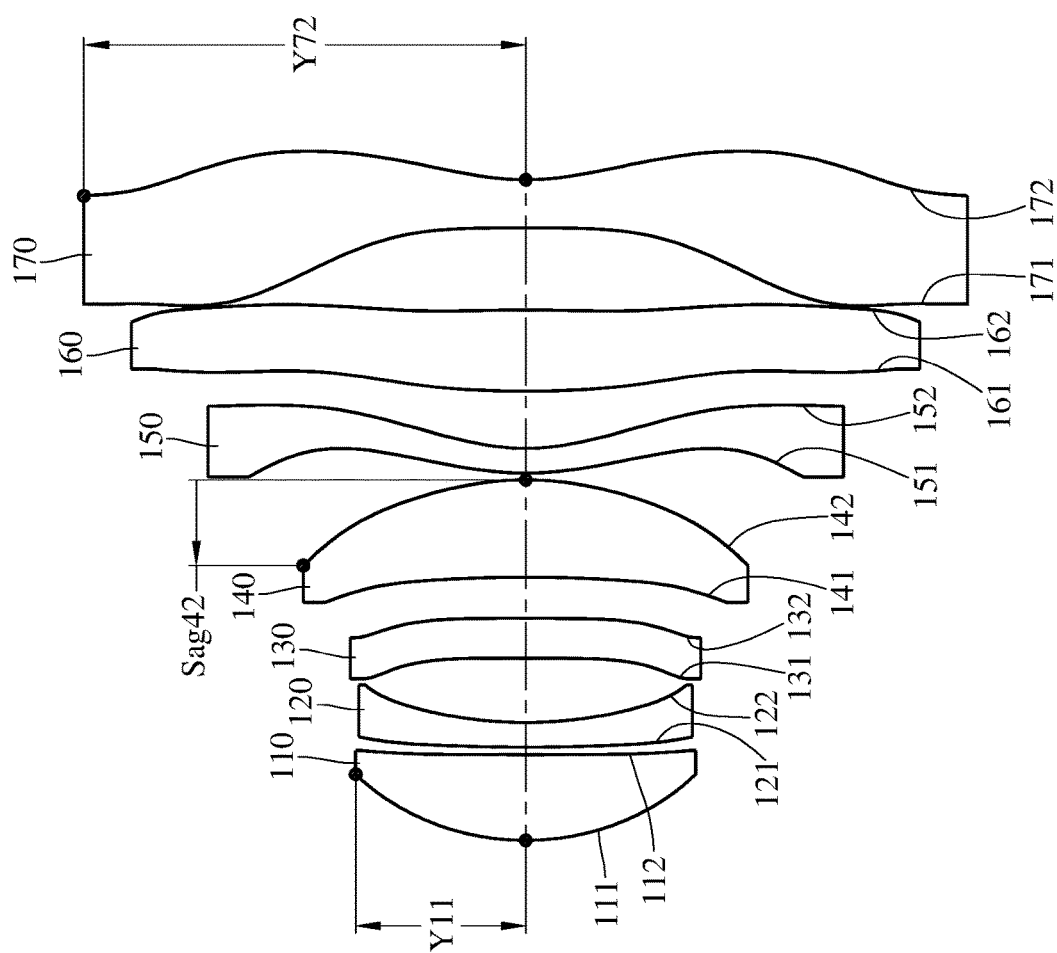
FIG. 30 shows a schematic view of Sag42, Y11 and Y72 according to the 1st embodiment of the present disclosure.

When a displacement in parallel with an optical axis from an axial vertex of an image-side surface of the fourth lens element to a maximum effective radius position of the image-side surface of the fourth lens element is Sag42, and a central thickness of the fourth lens element is CT4, the following condition can be satisfied: $-1.5<$Sag42/CT4$<3.0$. Therefore, a shape of the fourth lens element is favorable for correcting off-axis aberrations and preventing manufacturing problems. Preferably, the following condition can also be satisfied: $-1.0<$Sag42/CT4$<1.5$. Please refer to FIG. 30, which shows a schematic view of Sag42 according to the 1st embodiment of the present disclosure. When the direction from the axial vertex of one surface to the maximum effective radius position of the same surface is facing towards the image side of the image system lens assembly, the value of Sag42 is positive; when the direction from the axial vertex of the surface to the maximum effective radius position of the same surface is facing towards the object side of the image system lens assembly, the value of Sag42 is negative.

When an axial distance between the object-side surface of the first lens element and the image surface is TL, and an entrance pupil diameter of the image system lens assembly is EPD, the following condition can be satisfied: $0.8<$TL/EPD$<2.8$. Therefore, it is favorable for reducing the total track length and obtaining sufficient amount of incident light so as to achieve compactness and increase image brightness.

When a focal length of the image system lens assembly is f, a curvature radius of an object-side surface of the fifth lens element is R9, and a curvature radius of an image-side surface of the fifth lens element is R10, the following condition can be satisfied: $0 \leq |f/R9|+|f/R10|<5.0$. Therefore, it is favorable for preventing each surface of the fifth lens element from being overly curved so as to reduce surface reflection and prevent molding problems. Preferably, the following condition can also be satisfied: $0 \leq |f/R9|+|f/R10|<3.6$.

When a sum of Abbe numbers of the seven lens elements of the image system lens assembly is $\Sigma$Vd, the following condition can be satisfied: $70.0<\Sigma$Vd$<245.0$. Therefore, a proper Abbe number arrangement of the seven lens elements is favorable for correcting chromatic aberration.

When a central thickness of the sixth lens element is CT6, and a central thickness of the seventh lens element is CT7, the following condition can be satisfied: $0<$CT6/CT7$<2.10$. Therefore, proper central thicknesses of the sixth lens element and the seventh lens element are favorable for these two lens elements to work with each other so as to correct off-axis aberrations.

When a curvature radius of an object-side surface of the third lens element is R5, and the focal length of the image system lens assembly is f, the following condition can be satisfied: $-3.0<$R5/f$<3.0$. Therefore, it is favorable for the third lens element having proper shape and refractive power for correcting aberrations generated by the first lens element and the second lens element.

When the focal length of the image system lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, and a focal length of the seventh lens element is f7, the following conditions can be satisfied: $-2.0<$f/f1$<3.0$; $-2.0<$f/f2$<2.0$; $-2.0<$f/f3$<2.0$; $-3.0<$f/f4$<3.0$; $-3.0<$f/f5$<3.0$; $-3.0<$f/f6$<3.0$; and $-3.0<$f/f7$<3.0$; therefore, it is favorable for properly arranging the refractive powers of the seven lens elements so as to minimize aberrations, such as spherical aberration, and reduce sensitivity of the image system lens assembly. Preferably, the following conditions can also be satisfied: $-0.5<$f/f1$<2.5$; $-1.6<$f/f2$<1.6$; $-1.5<$f/f3$<1.5$; $-1.0<$f/f4$<1.0$; $-1.5<$f/f5$<1.5$; $-1.5<$f/f6$<2.5$; and $-2.5<$f/f7$<0.5$. More preferably, the following condition can be satisfied: $0.40<$f/f6$<2.5$; therefore, it is favorable for the sixth lens element to have sufficient positive refractive power so as to reduce the incident angle of light projected onto the image surface. Much more preferably, the following condition can also be satisfied: $-2.5<$f/f7$\leq-1.2$; therefore, it is favorable for the seventh lens element to have proper negative refractive power so as to maintain the back focal length.

When the focal length of the image system lens assembly is f, and a composite focal length of the third lens element and the fourth lens element is f34, the following condition can be satisfied: $-0.80<$f/f34$<0.55$. Therefore, it is favorable for adjusting the refractive power of the third and the fourth lens elements so as to balance the refractive power at the object side and the image side of the image system lens assembly.

When the axial distance between the object-side surface of the first lens element and the image surface is TL, and the focal length of the image system lens assembly is f, the following condition can be satisfied: $0.5<$TL/f$<1.6$. Therefore, it is favorable for obtaining a balance between the field of view and the size of the image system lens assembly.

When a maximum effective radius of the object-side surface of the first lens element is Y11, and a maximum effective radius of the image-side surface of the seventh lens element is Y72, the following condition can be satisfied: $0.1<$Y11/Y72$<1.0$. Therefore, it is favorable for adjusting traveling direction of light in the off-axis region so as to reduce the size of the image system lens assembly and adjust the field of view. Please refer to FIG. 30, which shows a schematic view of Y11 and Y72 according to the 1st embodiment of the present disclosure.

When a curvature radius of the object-side surface of the first lens element is R1, and the focal length of the image system lens assembly is f, the following condition can be satisfied: $0<$R1/f$<1.5$. Therefore, it is favorable for converging light rays and adjusting the field of view.

When a curvature radius of the image-side surface of the seventh lens element is R14, and the focal length of the image system lens assembly is f, the following condition can be satisfied: $0<$R14/f$<1.6$. Therefore, it is favorable for reducing the back focal length of the image system lens assembly.

When a curvature radius of an object-side surface of the second lens element is R3, and a curvature radius of an image-side surface of the second lens element is R4, the following condition can be satisfied: $0<$(R3−R4)/(R3+R4)

<1.0. Therefore, a proper shape of the second lens element is favorable for minimizing astigmatism.

According to the present disclosure, the image system lens assembly further includes an aperture stop, and the aperture stop can be located between an imaged object and the third lens element. Therefore, it is favorable for positioning the aperture stop for reducing the size of the image system lens assembly. Preferably, the aperture stop can be located between the imaged object and the second lens element. More preferably, the aperture stop can be located between the imaged object and the first lens element.

When an axial distance between the aperture stop and the image-side surface of the seventh lens element is SD, and an axial distance between the object-side surface of the first lens element and the image-side surface of the seventh lens element is TD, the following condition can be satisfied: $0.7<SD/TD<1.1$. Therefore, it is favorable for positioning the aperture stop for obtaining proper field of view and total track length.

When a minimum value among all absolute values of focal lengths of the seven lens elements is $|f|min$, and a maximum value among all absolute values of focal lengths of the seven lens elements is $|f|max$, the following condition can be satisfied: $0 \leq |f|min/|f|max<0.10$. Therefore, it is favorable for arranging the refractive power distribution so as to reduce the total track length.

When an axial distance between the sixth lens element and the seventh lens element is T67, and the central thickness of the seventh lens element is CT7, the following condition can be satisfied: $0.30<T67/CT7 \leq 1.0$. Therefore, it is favorable for providing a proper axial distance between the sixth lens element and the seventh lens element and a proper central thickness of the seventh lens element so as to correct off-axis aberrations.

When the focal length of the image system lens assembly is f, and a composite focal length of the first lens element and the second lens element is f12, the following condition can be satisfied: $0.60<f/f12<2.0$. Therefore, providing sufficient and proper positive refractive power at the object side of the image system lens assembly is favorable for light convergence.

When the focal length of the image system lens assembly is f, and a curvature radius of an image-side surface of the sixth lens element is R12, the following condition can be satisfied: $f/R12 \leq 0$. Therefore, it is favorable for obtaining a proper shape of the sixth lens element so as to correct astigmatism and field curvature.

When an f-number of the image system lens assembly is Fno, the following condition can be satisfied: $0.8<Fno<2.4$. Therefore, it is favorable for providing sufficient and proper illuminance on the image surface. Preferably, the following condition can also be satisfied: $1.0<Fno \leq 1.8$.

When the axial distance between the object-side surface of the first lens element and the image surface is TL, the following condition can be satisfied: $2.0 \text{ [mm]}<TL<8.0 \text{ [mm]}$. Therefore, it is favorable for keeping the image system lens assembly compact.

When the axial distance between the object-side surface of the first lens element and the image surface is TL, and a maximum image height of the image system lens assembly (half of a diagonal length of an effective photosensitive area of an image sensor) is ImgH, the following condition can be satisfied: $0.8<TL/ImgH<3.0$. Therefore, it is favorable for reducing the total track length and increasing image surface area.

According to the present disclosure, each of the aforementioned features and conditions can be utilized in numerous combinations so as to achieve corresponding effects.

According to the present disclosure, the lens elements thereof can be made of glass or plastic material. When the lens elements are made of glass material, the distribution of the refractive power of the lens system may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the lens system can also be reduced.

According to the present disclosure, when a lens surface is aspheric, it means that the lens surface has an aspheric shape throughout its optically effective area, or a portion(s) thereof.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, an image surface of the image system lens assembly, based on the corresponding image sensor, can be flat or curved, especially a curved surface being concave facing towards the object side of the image system lens assembly.

According to the present disclosure, an image correction unit, such as a field flattener, can be optionally disposed between the lens element closest to the image side of the image system lens assembly and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the demand of an image capturing unit. In general, a preferable image correction unit is, for example, a thin transparent element having a concave object-side surface and a planar image-side surface, and the thin transparent element is disposed near the image surface.

According to the present disclosure, the image system lens assembly can include at least one stop, such as an aperture stop, a glare stop or a field stop. Said glare stop or said field stop is set for eliminating the stray light and thereby improving the image quality thereof.

According to the present disclosure, an aperture stop can be configured as a front stop or a middle stop. A front stop disposed between an imaged object and the first lens element can provide a longer distance between an exit pupil of the lens system and the image surface to produce a telecentric effect, and thereby improves the image-sensing efficiency of an image sensor (for example, CCD or CMOS). A middle stop disposed between the first lens element and the image surface is favorable for enlarging the view angle of the image system lens assembly and thereby provides a wider field of view for the same.

According to the above description of the present disclosure, the following specific embodiments are provided for further explanation.

1st Embodiment

Figure 1:
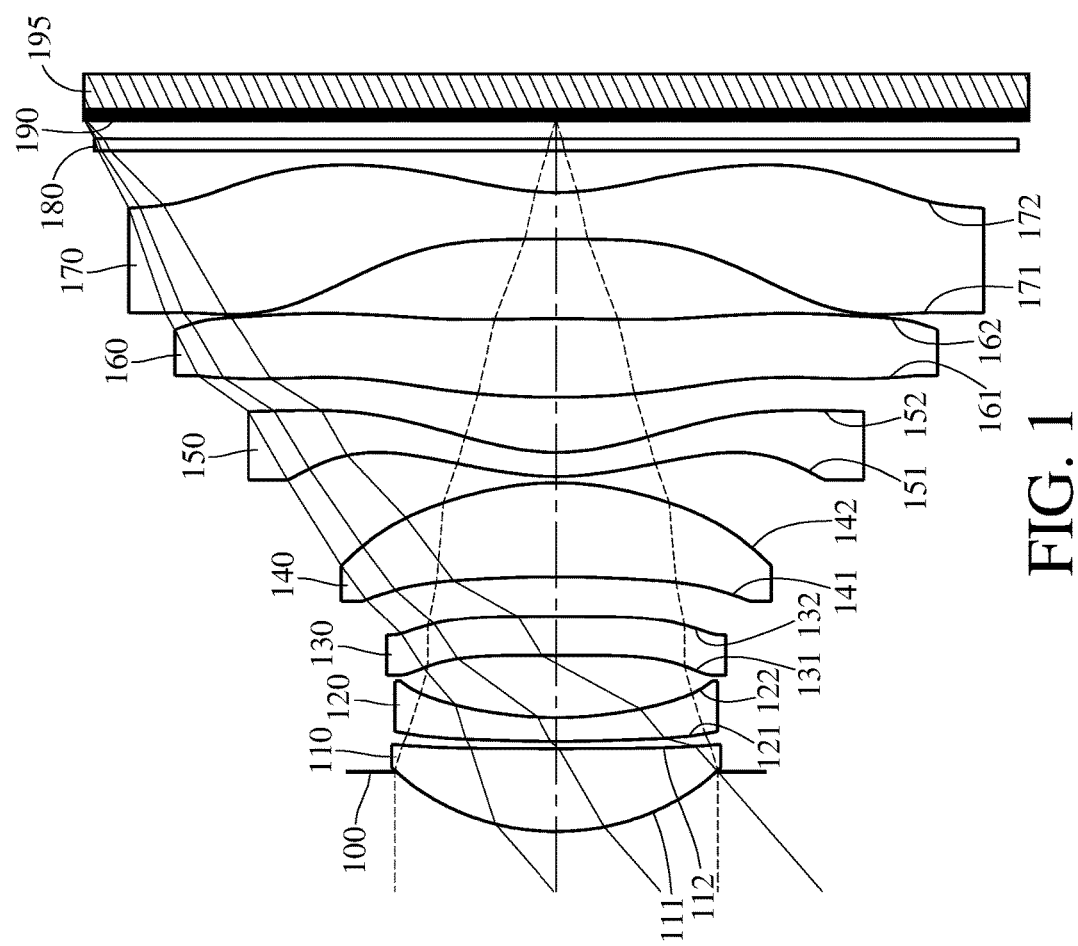
FIG. 1 is a schematic view of an image capturing unit according to the 1st embodiment of the present disclosure.
Figure 2:
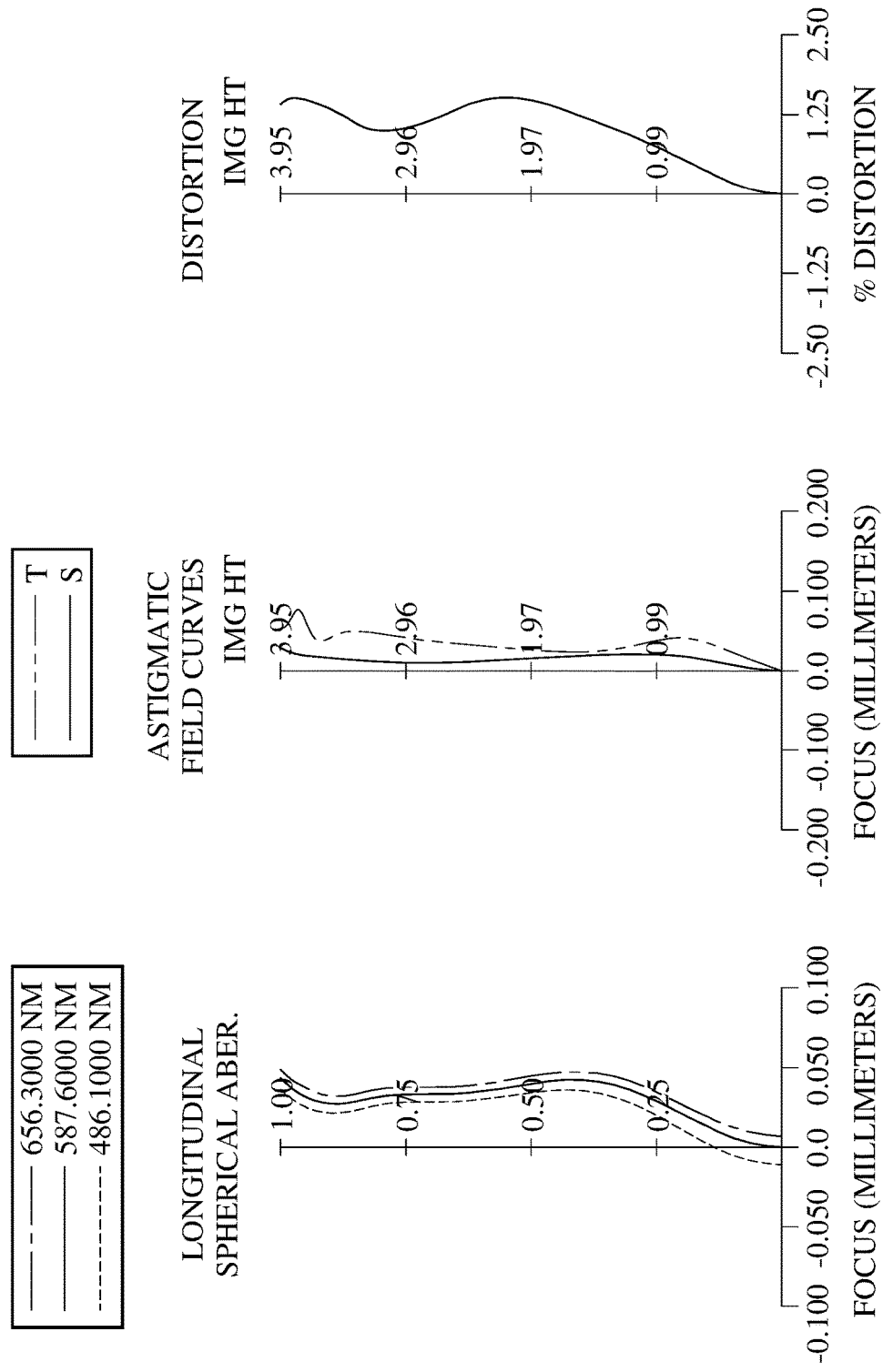
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the image system lens assembly (its reference numeral is omitted) of the present disclosure and an image sensor 195. The image system lens assembly includes, in order from an object side to an image side, an aperture stop 100, a first lens element 110, a second lens element 120, a third lens element 130, a fourth lens element 140, a fifth lens element 150, a sixth lens element 160, a seventh lens element 170, a filter 180 and an image surface 190. The image system lens assembly includes seven lens elements (110, 120, 130, 140, 150, 160 and 170) with no additional lens element disposed between each of the adjacent seven lens elements.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric. The image-side surface 112 of the first lens element 110 has one inflection point.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric. The object-side surface 121 of the second lens element 120 has one inflection point.

The third lens element 130 with positive refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric. The object-side surface 131 of the third lens element 130 has two inflection points. The image-side surface 132 of the third lens element 130 has two inflection points. The object-side surface 131 of the third lens element 130 has two critical points in an off-axis region thereof. The image-side surface 132 of the third lens element 130 has two critical points in an off-axis region thereof.

The fourth lens element 140 with positive refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with negative refractive power has an object-side surface 151 being convex in a paraxial region thereof and an image-side surface 152 being concave in a paraxial region thereof. The fifth lens element 150 is made of plastic material and has the object-side surface 151 and the image-side surface 152 being both aspheric. The object-side surface 151 of the fifth lens element 150 has two inflection points. The image-side surface 152 of the fifth lens element 150 has two inflection points. The object-side surface 151 of the fifth lens element 150 has one critical point in an off-axis region thereof. The image-side surface 152 of the fifth lens element 150 has one critical point in an off-axis region thereof.

The sixth lens element 160 with positive refractive power has an object-side surface 161 being convex in a paraxial region thereof and an image-side surface 162 being convex in a paraxial region thereof. The sixth lens element 160 is made of plastic material and has the object-side surface 161 and the image-side surface 162 being both aspheric. The object-side surface 161 of the sixth lens element 160 has two inflection points. The image-side surface 162 of the sixth lens element 160 has three inflection points. The object-side surface 161 of the sixth lens element 160 has two critical points in an off-axis region thereof. The image-side surface 162 of the sixth lens element 160 has two critical points in an off-axis region thereof.

The seventh lens element 170 with negative refractive power has an object-side surface 171 being concave in a paraxial region thereof and an image-side surface 172 being concave in a paraxial region thereof. The seventh lens element 170 is made of plastic material and has the object-side surface 171 and the image-side surface 172 being both aspheric. The object-side surface 171 of the seventh lens element 170 has two inflection points. The image-side surface 172 of the seventh lens element 170 has three inflection points. The object-side surface 171 of the seventh lens element 170 has two critical points in an off-axis region thereof. The image-side surface 172 of the seventh lens element 170 has one critical point in an off-axis region thereof.

The filter 180 is made of glass material and located between the seventh lens element 170 and the image surface 190, and will not affect the focal length of the image system lens assembly. The image sensor 195 is disposed on or near the image surface 190 of the image system lens assembly.

In this embodiment, among the seven lens elements, one lens element has an Abbe number less than 20. In detail, an Abbe number of the third lens element 130 is less than 20.

In this embodiment, among the seven lens elements, each of three adjacent lens elements has an Abbe number less than 38. In detail, the Abbe numbers of the fifth lens element 150, the sixth lens element 160 and the seventh lens element 170 are all less than 38.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the image system lens assembly of the image capturing unit according to the 1st embodiment, when a focal length of the image system lens assembly is f, an f-number of the image system lens assembly is Fno, and half of a maximum field of view of the image system lens assembly is HFOV, these parameters have the following values: f=4.44 millimeters (mm), Fno=1.64, HFOV=41.1 degrees (deg.).

When an Abbe number of the first lens element 110 is Vd1, the following condition is satisfied: Vd1=56.0.

When an Abbe number of the second lens element 120 is Vd2, the following condition is satisfied: Vd2=26.0.

When the Abbe number of the third lens element 130 is Vd3, the following condition is satisfied: Vd3=19.5.

When an Abbe number of the fourth lens element 140 is Vd4, the following condition is satisfied: Vd4=56.0.

When the Abbe number of the fifth lens element 150 is Vd5, the following condition is satisfied: Vd5=20.4.

When the Abbe number of the sixth lens element 160 is Vd6, the following condition is satisfied: Vd6=28.2.

When the Abbe number of the seventh lens element 170 is Vd7, the following condition is satisfied: Vd7=28.2.

When a sum of Abbe numbers of the seven lens elements is $\Sigma Vd$ (i.e., $\Sigma Vd=Vd1+Vd2+Vd3+Vd4+Vd5+Vd6+Vd7$), the following condition is satisfied: $\Sigma Vd=234.2$.

When a central thickness of the sixth lens element 160 is CT6, and a central thickness of the seventh lens element 170 is CT7, the following condition is satisfied: CT6/CT7=1.70.

When an axial distance between the aperture stop 100 and the image-side surface 172 of the seventh lens element 170 is SD, and an axial distance between the object-side surface 111 of the first lens element 110 and the image-side surface 172 of the seventh lens element 170 is TD, the following condition is satisfied: SD/TD=0.91.

When an axial distance between the sixth lens element 160 and the seventh lens element 170 is T67, and the central thickness of the seventh lens element 170 is CT7, the following condition is satisfied: T67/CT7=1.71. In this embodiment, the axial distance between two adjacent lens elements is the air gap in a paraxial region between the two adjacent lens elements.

When an axial distance between the object-side surface 111 of the first lens element 110 and the image surface 190 is TL, the following condition is satisfied: TL=5.96 [mm].

When the axial distance between the object-side surface 111 of the first lens element 110 and the image surface 190 is TL, and an entrance pupil diameter of the image system lens assembly is EPD, the following condition is satisfied: TL/EPD=2.20.

When the axial distance between the object-side surface 111 of the first lens element 110 and the image surface 190 is TL, and the focal length of the image system lens assembly is f, the following condition is satisfied: TL/f=1.34.

When the axial distance between the object-side surface 111 of the first lens element 110 and the image surface 190 is TL, and a maximum image height of the image system lens assembly is ImgH, the following condition is satisfied: TL/ImgH=1.51.

When a curvature radius of the object-side surface 111 of the first lens element 110 is R1, and the focal length of the image system lens assembly is f, the following condition is satisfied: R1/f=0.48.

When a curvature radius of the object-side surface 121 of the second lens element 120 is R3, and a curvature radius of the image-side surface 122 of the second lens element 120 is R4, the following condition is satisfied: (R3−R4)/(R3+R4)=0.50.

When a curvature radius of the object-side surface 131 of the third lens element 130 is R5, and the focal length of the image system lens assembly is f, the following condition is satisfied: R5/f=14.27.

When a curvature radius of the image-side surface 172 of the seventh lens element 170 is R14, and the focal length of the image system lens assembly is f, the following condition is satisfied: R14/f=0.48.

When the focal length of the image system lens assembly is f, and a focal length of the first lens element 110 is f1, the following condition is satisfied: f/f1=1.10.

When the focal length of the image system lens assembly is f, and a focal length of the second lens element 120 is f2, the following condition is satisfied: f/f2=−0.57.

When the focal length of the image system lens assembly is f, and a focal length of the third lens element 130 is f3, the following condition is satisfied: f/f3=0.03.

When the focal length of the image system lens assembly is f, and a focal length of the fourth lens element 140 is f4, the following condition is satisfied: f/f4=0.81.

When the focal length of the image system lens assembly is f, and a focal length of the fifth lens element 150 is f5, the following condition is satisfied: f/f5=−0.36.

When the focal length of the image system lens assembly is f, and a focal length of the sixth lens element 160 is f6, the following condition is satisfied: f/f6=0.47.

When the focal length of the image system lens assembly is f, and a focal length of the seventh lens element 170 is f7, the following condition is satisfied: f/f7=−1.24.

When the focal length of the image system lens assembly is f, and a composite focal length of the first lens element 110 and the second lens element 120 is f12, the following condition is satisfied: f/f12=0.62.

When the focal length of the image system lens assembly is f, and a composite focal length of the third lens element 130 and the fourth lens element 140 is f34, the following condition is satisfied: f/f34=0.83.

When the focal length of the image system lens assembly is f, a curvature radius of the object-side surface 151 of the fifth lens element 150 is R9, and a curvature radius of the image-side surface 152 of the fifth lens element 150 is R10, the following condition is satisfied: f/|R9|+f/|R10|=4.34.

When the focal length of the image system lens assembly is f, and a curvature radius of the image-side surface 162 of the sixth lens element 160 is R12, the following condition is satisfied: f/R12=−0.36.

When a minimum value among all absolute values of focal lengths of the seven lens elements is |f|min, and a maximum value among all absolute values of focal lengths of the seven lens elements is |f|max, the following condition is satisfied: |f|min/|f|max=0.02. In this embodiment, |f|min=3.57, which is the absolute value of the focal length of the seventh lens element 170; and |f|max=146.89, which is the absolute value of the focal length of the third lens element 130.

When the number of lens element having an Abbe number less than 32 among the seven lens elements is NVd32, the following condition is satisfied: NVd32=5. In this embodiment, the Abbe numbers of the second lens element 120, the third lens element 130, the fifth lens element 150, the sixth lens element 160 and the seventh lens element 170 are all less than 32.

When the number of lens element having an Abbe number less than 35 among the seven lens elements is NVd35, the following condition is satisfied: NVd35=5. In this embodiment, the Abbe numbers of the second lens element 120, the third lens element 130, the fifth lens element 150, the sixth lens element 160 and the seventh lens element 170 are all less than 35.

When the number of lens element having an Abbe number less than 38 among the seven lens elements is NVd38, the following condition is satisfied: NVd38=5. In this embodiment, the Abbe numbers of the second lens element 120, the third lens element 130, the fifth lens element 150, the sixth lens element 160 and the seventh lens element 170 are all less than 38.

When a displacement in parallel with an optical axis from an axial vertex of the image-side surface 142 of the fourth lens element 140 to a maximum effective radius position of the image-side surface 142 of the fourth lens element 140 is Sag42, and a central thickness of the fourth lens element 140 is CT4, the following condition is satisfied: Sag42/CT4=−0.88.

When a maximum effective radius of the object-side surface 111 of the first lens element 110 is Y11, and a maximum effective radius of the image-side surface 172 of the seventh lens element 170 is Y72, the following condition is satisfied: Y11/Y72=0.38.

The detailed optical data of the 1st embodiment are shown in Table 1 and the aspheric surface data are shown in Table 2 below.

TABLE 1

1st Embodiment
f = 4.44 mm, Fno = 1.64, HFOV = 41.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.500 | | | | |
| 2 | Lens 1 | 2.120 | (ASP) | 0.694 | Plastic | 1.545 | 56.0 | 4.05 |
| 3 | | 48.561 | (ASP) | 0.060 | | | | |
| 4 | Lens 2 | 9.556 | (ASP) | 0.200 | Plastic | 1.614 | 26.0 | −7.75 |
| 5 | | 3.150 | (ASP) | 0.520 | | | | |
| 6 | Lens 3 | 63.330 | (ASP) | 0.328 | Plastic | 1.669 | 19.5 | 146.89 |
| 7 | | 177.820 | (ASP) | 0.334 | | | | |
| 8 | Lens 4 | −12.610 | (ASP) | 0.788 | Plastic | 1.544 | 56.0 | 5.50 |
| 9 | | −2.473 | (ASP) | 0.054 | | | | |
| 10 | Lens 5 | 2.388 | (ASP) | 0.201 | Plastic | 1.660 | 20.4 | −12.31 |
| 11 | | 1.784 | (ASP) | 0.463 | | | | |
| 12 | Lens 6 | 9.877 | (ASP) | 0.663 | Plastic | 1.584 | 28.2 | 9.46 |
| 13 | | −12.228 | (ASP) | 0.665 | | | | |
| 14 | Lens 7 | −113.574 | (ASP) | 0.389 | Plastic | 1.584 | 28.2 | −3.57 |
| 15 | | 2.130 | (ASP) | 0.350 | | | | |
| 16 | Filter | Plano | | 0.100 | Glass | 1.517 | 64.2 | — |
| 17 | | Plano | | 0.152 | | | | |
| 18 | Image | Plano | | — | | | | |

Note:
Reference wavelength is 587.6 nm (d-line).
An effective radius of the image-side surface 142 (Surface 9) is 1.800 mm.

TABLE 2

Aspheric Coefficients

| Surface # | 2 | 3 | 4 | 5 | 6 |
|---|---|---|---|---|---|
| k = | 1.8036E−01 | 9.0000E+01 | −3.9112E+01 | −1.9802E+01 | −9.0000E+01 |
| A4 = | −5.4555E−04 | −2.9552E−02 | −8.4469E−02 | 1.7643E−02 | −6.3104E−02 |
| A6 = | 5.4218E−03 | 6.2024E−02 | 1.4725E−01 | 2.1179E−02 | −1.7475E−02 |
| A8 = | −5.6426E−03 | −4.3576E−02 | −1.1673E−01 | −2.7330E−03 | 2.1625E−02 |
| A10 = | 3.3211E−03 | 9.0875E−03 | 4.3431E−02 | −1.4146E−02 | −2.7639E−02 |
| A12 = | −6.8628E−04 | 3.9238E−03 | −2.0588E−03 | 9.9118E−03 | 1.2453E−02 |
| A14 = | — | −1.6358E−03 | −1.7913E−03 | −9.7397E−04 | — |

| Surface # | 7 | 8 | 9 | 10 | 11 |
|---|---|---|---|---|---|
| k = | 9.0000E+01 | 5.3522E+01 | −2.2450E+00 | −1.7064E+01 | −8.4098E+00 |
| A4 = | −5.1541E−02 | −5.7793E−03 | 1.3132E−02 | 1.2959E−02 | 7.6265E−03 |
| A6 = | −2.3378E−03 | 2.1567E−02 | −3.3113E−03 | −1.7434E−02 | −1.4463E−02 |
| A8 = | −2.4486E−03 | −2.3802E−02 | −3.5226E−03 | 4.2730E−03 | 3.8493E−03 |
| A10 = | −3.2641E−03 | 7.7682E−03 | 5.4456E−04 | −6.3317E−04 | −4.2592E−04 |
| A12 = | 3.2379E−03 | −7.0966E−04 | 4.0255E−05 | 4.5430E−05 | 1.7721E−05 |

| Surface # | 12 | 13 | 14 | 15 |
|---|---|---|---|---|
| k = | −1.3335E+01 | −4.3422E+00 | 9.0000E+01 | −6.5771E+00 |
| A4 = | 3.7445E−02 | 6.1925E−02 | −7.1855E−02 | −4.5948E−02 |
| A6 = | −2.1970E−02 | −2.8848E−02 | 1.5117E−02 | 1.2092E−02 |
| A8 = | 4.6489E−03 | 7.4468E−03 | −1.1575E−03 | −2.0735E−03 |

TABLE 2-continued

| Aspheric Coefficients | | | | |
|---|---|---|---|---|
| A10 = | −4.8571E−04 | −1.2378E−03 | 3.0735E−05 | 1.9598E−04 |
| A12 = | 2.5984E−05 | 1.3032E−04 | — | −9.0465E−06 |
| A14 = | −6.4856E−07 | −7.7348E−06 | — | 1.5929E−07 |
| A16 = | 6.1290E−09 | 1.9306E−07 | — | — |

In Table 1, the curvature radius, the thickness and the focal length are shown in millimeters (mm). Surface numbers 0-18 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
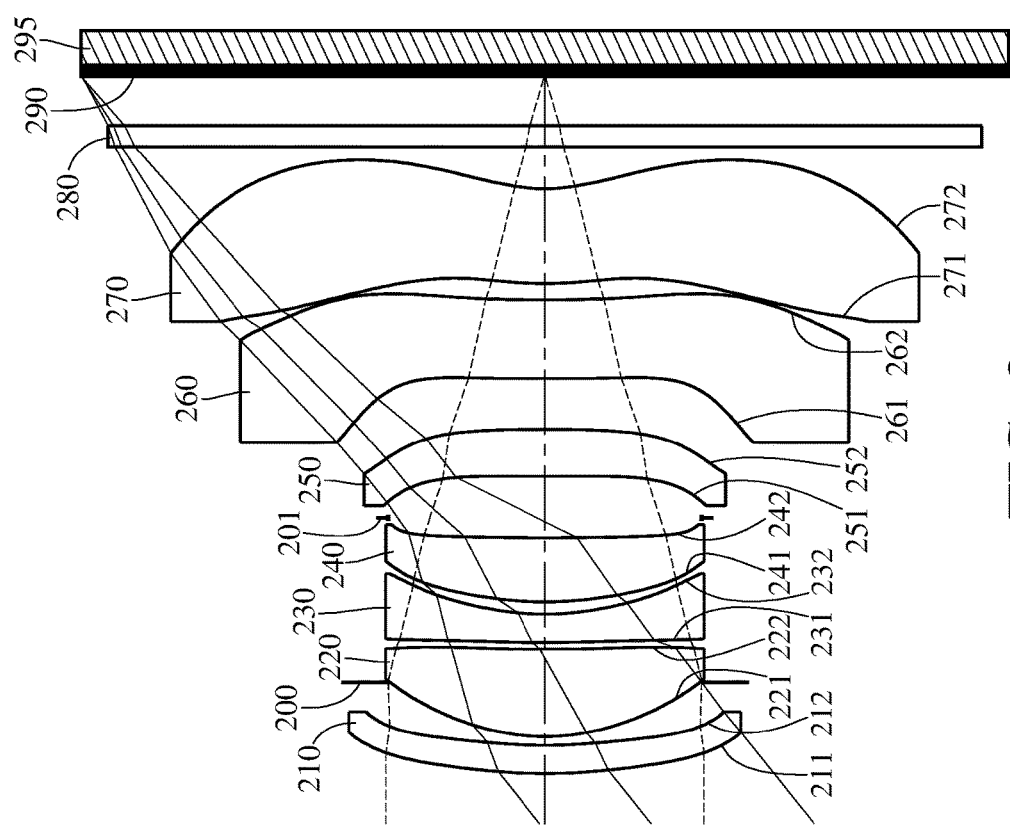
FIG. 3 is a schematic view of an image capturing unit according to the 2nd embodiment of the present disclosure.
Figure 4:
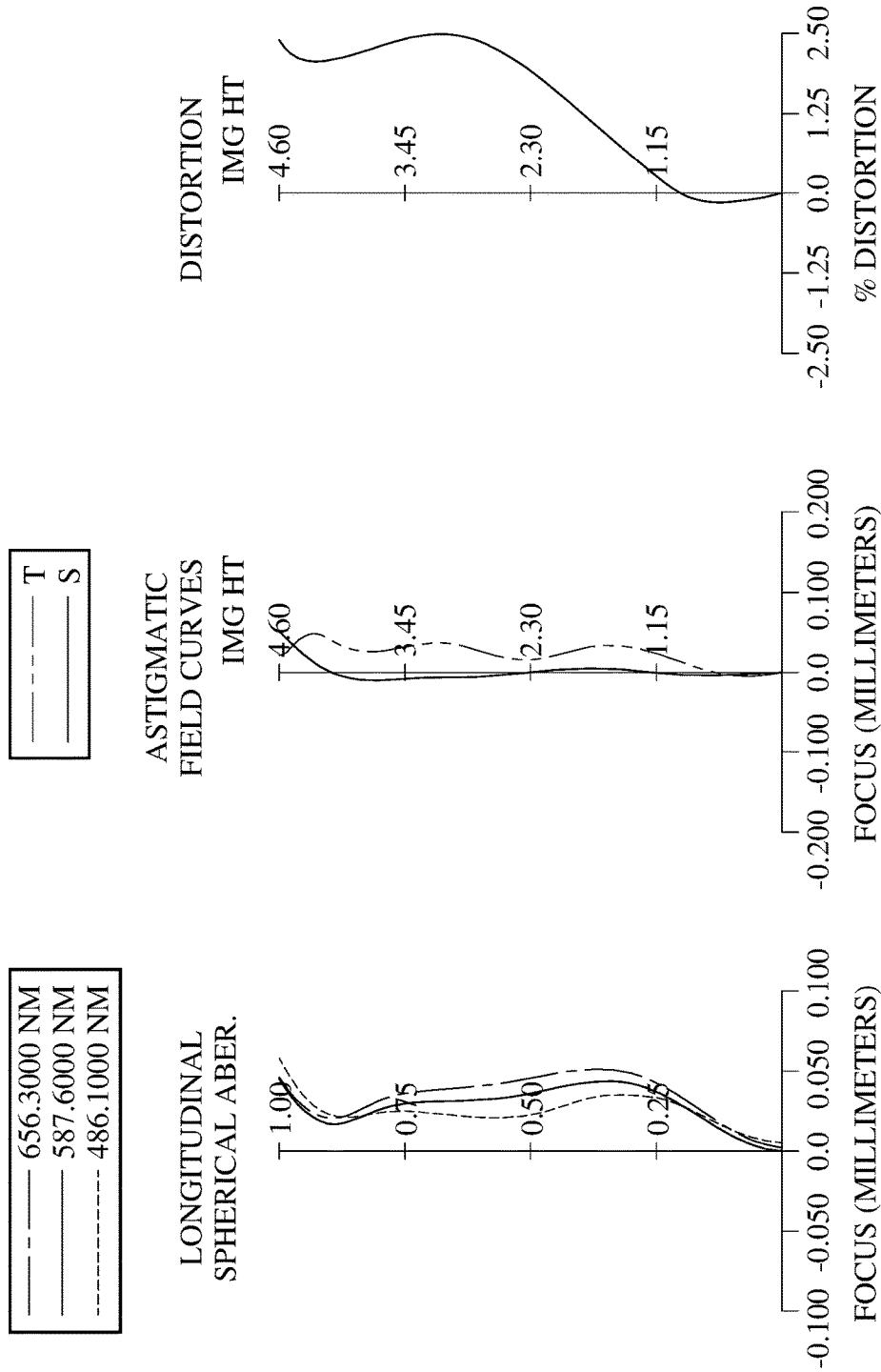
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the image system lens assembly (its reference numeral is omitted) of the present disclosure and an image sensor 295. The image system lens assembly includes, in order from an object side to an image side, a first lens element 210, an aperture stop 200, a second lens element 220, a third lens element 230, a fourth lens element 240, a stop 201, a fifth lens element 250, a sixth lens element 260, a seventh lens element 270, a filter 280 and an image surface 290. The image system lens assembly includes seven lens elements (210, 220, 230, 240, 250, 260 and 270) with no additional lens element disposed between each of the adjacent seven lens elements.

The first lens element 210 with negative refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with positive refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric. The image-side surface 222 of the second lens element 220 has two inflection points. The image-side surface 222 of the second lens element 220 has two critical points in an off-axis region thereof.

The third lens element 230 with negative refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric. The object-side surface 231 of the third lens element 230 has four inflection points. The image-side surface 232 of the third lens element 230 has two inflection points.

The fourth lens element 240 with positive refractive power has an object-side surface 241 being convex in a paraxial region thereof and an image-side surface 242 being concave in a paraxial region thereof. The fourth lens element 240 is made of plastic material and has the object-side surface 241 and the image-side surface 242 being both aspheric.

The fifth lens element 250 with positive refractive power has an object-side surface 251 being convex in a paraxial region thereof and an image-side surface 252 being convex in a paraxial region thereof. The fifth lens element 250 is made of plastic material and has the object-side surface 251 and the image-side surface 252 being both aspheric. The object-side surface 251 of the fifth lens element 250 has one inflection point. The image-side surface 252 of the fifth lens element 250 has one inflection point. The object-side surface 251 of the fifth lens element 250 has one critical point in an off-axis region thereof.

The sixth lens element 260 with negative refractive power has an object-side surface 261 being concave in a paraxial region thereof and an image-side surface 262 being concave in a paraxial region thereof. The sixth lens element 260 is made of plastic material and has the object-side surface 261 and the image-side surface 262 being both aspheric. The object-side surface 261 of the sixth lens element 260 has three inflection points. The image-side surface 262 of the sixth lens element 260 has one inflection point. The object-side surface 261 of the sixth lens element 260 has two critical points in an off-axis region thereof. The image-side surface 262 of the sixth lens element 260 has one critical point in an off-axis region thereof.

The seventh lens element 270 with negative refractive power has an object-side surface 271 being convex in a paraxial region thereof and an image-side surface 272 being concave in a paraxial region thereof. The seventh lens element 270 is made of plastic material and has the object-side surface 271 and the image-side surface 272 being both aspheric. The object-side surface 271 of the seventh lens element 270 has three inflection points. The image-side surface 272 of the seventh lens element 270 has one inflection point. The object-side surface 271 of the seventh lens element 270 has one critical point in an off-axis region thereof. The image-side surface 272 of the seventh lens element 270 has one critical point in an off-axis region thereof.

The filter 280 is made of glass material and located between the seventh lens element 270 and the image surface 290, and will not affect the focal length of the image system lens assembly. The image sensor 295 is disposed on or near the image surface 290 of the image system lens assembly.

In this embodiment, among the seven lens elements, each of four adjacent lens elements has an Abbe number less than 38. In detail, the Abbe numbers of the third lens element 230, the fourth lens element 240, the fifth lens element 250 and the sixth lens element 260 are all less than 38.

The detailed optical data of the 2nd embodiment are shown in Table 3 and the aspheric surface data are shown in Table 4 below.

TABLE 3

2nd Embodiment
f = 5.58 mm, Fno = 1.77, HFOV = 38.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 5.747 | (ASP) | 0.281 | Plastic | 1.639 | 23.3 | −208.44 |
| 2 | | 5.404 | (ASP) | 0.629 | | | | |
| 3 | Ape. Stop | Plano | | −0.542 | | | | |
| 4 | Lens 2 | 2.191 | (ASP) | 0.871 | Plastic | 1.534 | 55.9 | 4.22 |
| 5 | | 66.110 | (ASP) | 0.066 | | | | |
| 6 | Lens 3 | 18.178 | (ASP) | 0.280 | Plastic | 1.656 | 21.3 | −4.59 |
| 7 | | 2.567 | (ASP) | 0.123 | | | | |
| 8 | Lens 4 | 3.431 | (ASP) | 0.634 | Plastic | 1.582 | 30.2 | 6.76 |
| 9 | | 24.787 | (ASP) | 0.199 | | | | |
| 10 | Stop | Plano | | 0.414 | | | | |
| 11 | Lens 5 | 82.769 | (ASP) | 0.468 | Plastic | 1.584 | 28.2 | 24.26 |
| 12 | | −17.070 | (ASP) | 0.507 | | | | |
| 13 | Lens 6 | −109.813 | (ASP) | 0.778 | Plastic | 1.584 | 28.2 | −24.33 |
| 14 | | 16.367 | (ASP) | 0.162 | | | | |
| 15 | Lens 7 | 3.199 | (ASP) | 0.942 | Plastic | 1.511 | 56.8 | −9.76 |
| 16 | | 1.755 | (ASP) | 0.420 | | | | |
| 17 | Filter | Plano | | 0.210 | Glass | 1.517 | 64.2 | — |
| 18 | | Plano | | 0.489 | | | | |
| 19 | Image | Plano | | — | | | | |

Note:
Reference wavelength is 587.6 nm (d-line).
An effective radius of the stop 201 (Surface 10) is 1.554 mm.
An effective radius of the image-side surface 272 (Surface 16) is 3.714 mm.

TABLE 4

Aspheric Coefficients

| Surface # | 1 | 2 | 4 | 5 | 6 |
|---|---|---|---|---|---|
| k = | −5.5116E+01 | −1.9680E+01 | −1.0563E+00 | 3.0586E+01 | 3.5816E+01 |
| A4 = | 2.9188E−02 | 8.0627E−03 | 1.7450E−02 | 1.0623E−01 | 4.0053E−02 |
| A6 = | −3.0935E−02 | −5.7373E−02 | −6.6027E−02 | −2.4218E−01 | −1.7200E−01 |
| A8 = | 1.9629E−02 | 6.9242E−02 | 7.9662E−02 | 2.5482E−01 | 2.3481E−01 |
| A10 = | −5.9996E−03 | −3.9415E−02 | −4.8946E−02 | −1.5424E−01 | −1.6539E−01 |
| A12 = | 9.5201E−04 | 1.3130E−02 | 1.7276E−02 | 5.5304E−02 | 6.5504E−02 |
| A14 = | −6.5229E−05 | −2.4406E−03 | −3.3372E−03 | −1.1140E−02 | −1.4095E−02 |
| A16 = | 1.1948E−06 | 1.9840E−04 | 2.7580E−04 | 9.9249E−04 | 1.3047E−03 |

| Surface # | 7 | 8 | 9 | 11 | 12 |
|---|---|---|---|---|---|
| k = | −2.6226E+00 | 1.8775E+00 | −2.5755E+01 | −9.9586E−01 | −1.0023E+00 |
| A4 = | −5.6087E−02 | −5.4770E−02 | −5.3171E−03 | −2.4281E−02 | 3.6280E−03 |
| A6 = | 2.2270E−02 | 4.4775E−02 | −2.6732E−03 | −2.5380E−03 | −4.8632E−02 |
| A8 = | 6.1433E−02 | −3.6239E−02 | 1.5974E−02 | −1.4579E−02 | 2.8955E−02 |
| A10 = | −7.9226E−02 | 2.9436E−02 | −2.3288E−02 | 1.7861E−02 | −9.3191E−03 |
| A12 = | 4.2830E−02 | −1.5518E−02 | 1.7875E−02 | −1.1441E−02 | 5.8322E−04 |
| A14 = | −1.1486E−02 | 4.5254E−03 | −6.6096E−03 | 3.5908E−03 | 4.1785E−04 |
| A16 = | 1.2348E−03 | −5.4601E−04 | 1.0187E−03 | −4.4087E−04 | −6.9502E−05 |

| Surface # | 13 | 14 | 15 | 16 |
|---|---|---|---|---|
| k = | −4.9990E+01 | 1.8026E+01 | −2.3648E+00 | −6.8213E+00 |
| A4 = | 6.7273E−02 | 1.4435E−02 | −1.4380E−01 | −3.6920E−02 |
| A6 = | −8.7112E−02 | −1.1622E−02 | 5.4436E−02 | 7.9559E−03 |
| A8 = | 4.5981E−02 | 2.4861E−03 | −1.2164E−02 | −1.2208E−03 |
| A10 = | −1.7179E−02 | −3.2974E−04 | 1.6926E−03 | 1.1718E−04 |
| A12 = | 3.6917E−03 | 2.7965E−05 | −1.4266E−04 | −6.7088E−06 |
| A14 = | −3.8862E−04 | −1.1637E−06 | 6.6780E−06 | 2.0278E−07 |
| A16 = | 1.5521E−05 | 1.0178E−08 | −1.3391E−07 | −2.3949E−09 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 5.58 | R5/f | 3.26 |
| Fno | 1.77 | R14/f | 0.31 |
| HFOV [deg.] | 38.7 | f/f1 | −0.03 |
| Vd1 | 23.3 | f/f2 | 1.32 |
| Vd2 | 55.9 | f/f3 | −1.22 |
| Vd3 | 21.3 | f/f4 | 0.83 |
| Vd4 | 30.2 | f/f5 | 0.23 |
| Vd5 | 28.2 | f/f6 | −0.23 |
| Vd6 | 28.2 | f/f7 | −0.57 |
| Vd7 | 56.8 | f/f12 | 1.27 |
| ΣVd | 243.9 | f/f34 | −0.39 |
| CT6/CT7 | 0.83 | f/|R9| + f/|R10| | 0.39 |
| SD/TD | 0.84 | f/R12 | 0.34 |
| T67/CT7 | 0.17 | |f|min/|f|max | 0.02 |
| TL [mm] | 6.93 | NVd32 | 5 |
| TL/EPD | 2.20 | NVd35 | 5 |
| TL/f | 1.24 | NVd38 | 5 |
| TL/ImgH | 1.51 | Sag42/CT4 | 0.21 |
| R1/f | 1.03 | Y11/Y72 | 0.52 |
| (R3 − R4)/(R3 + R4) | −0.94 | — | — |

3rd Embodiment

Figure 5:
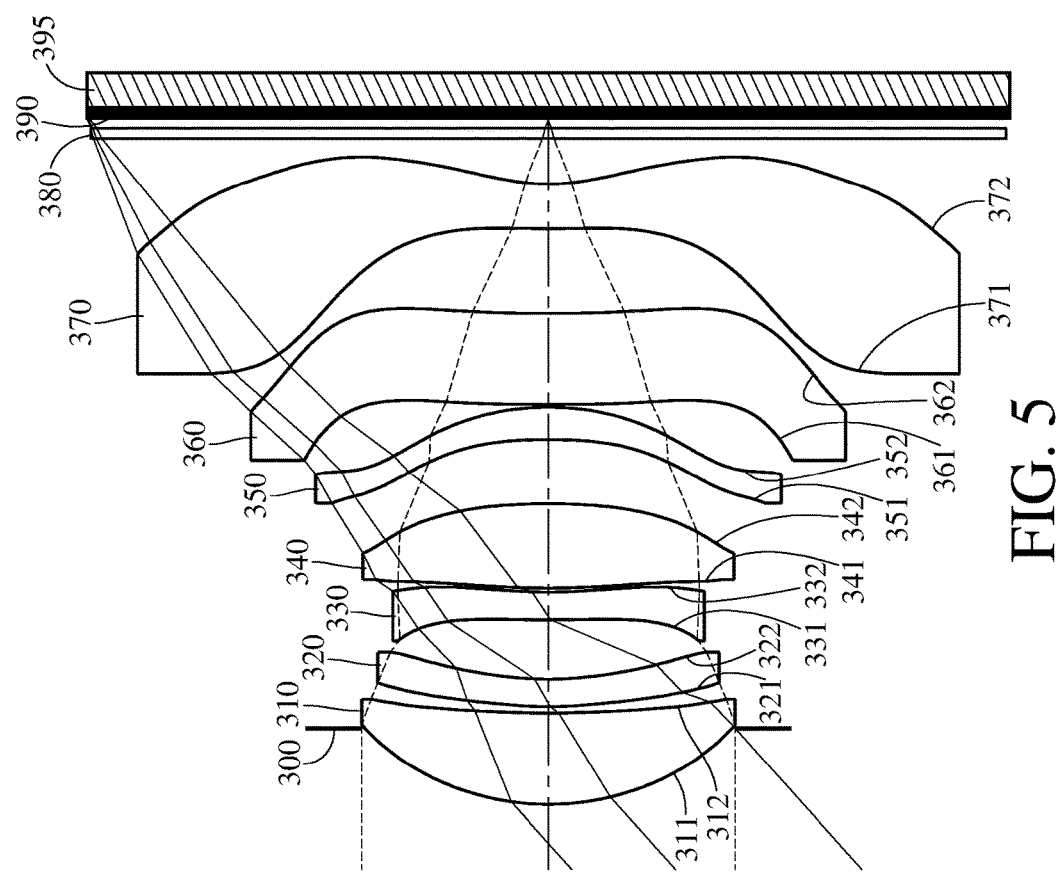
FIG. 5 is a schematic view of an image capturing unit according to the 3rd embodiment of the present disclosure.
Figure 6:
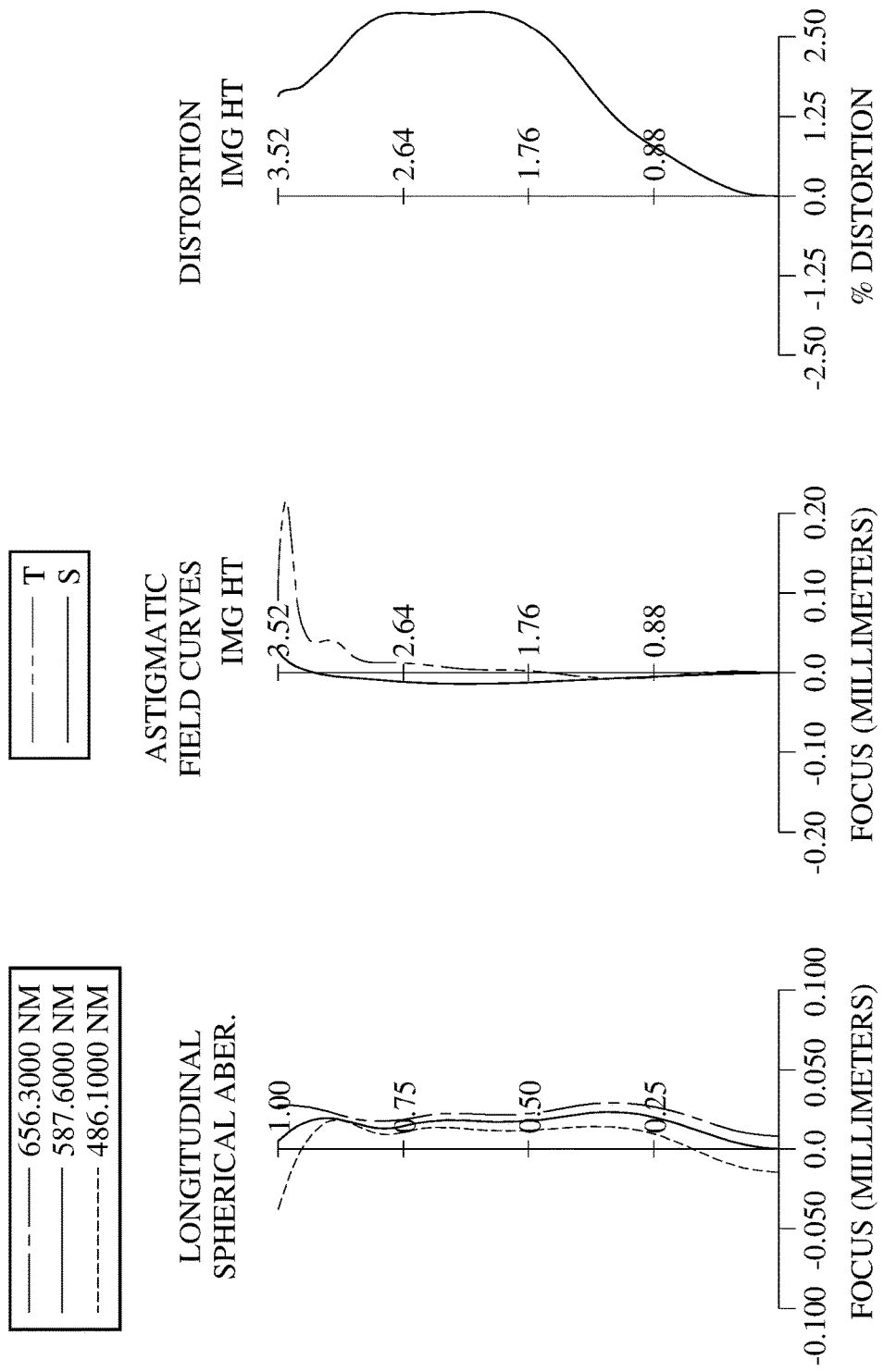
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the image system lens assembly (its reference numeral is omitted) of the present disclosure and an image sensor 395. The image system lens assembly includes, in order from an object side to an image side, an aperture stop 300, a first lens element 310, a second lens element 320, a third lens element 330, a fourth lens element 340, a fifth lens element 350, a sixth lens element 360, a seventh lens element 370, a filter 380 and an image surface 390. The image system lens assembly includes seven lens elements (310, 320, 330, 340, 350, 360 and 370) with no additional lens element disposed between each of the adjacent seven lens elements.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric. The image-side surface 322 of the second lens element 320 has one inflection point.

The third lens element 330 with negative refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric. The object-side surface 331 of the third lens element 330 has one inflection point. The image-side surface 332 of the third lens element 330 has two inflection points. The object-side surface 331 of the third lens element 330 has one critical point in an off-axis region thereof. The image-side surface 332 of the third lens element 330 has one critical point in an off-axis region thereof.

The fourth lens element 340 with positive refractive power has an object-side surface 341 being convex in a paraxial region thereof and an image-side surface 342 being convex in a paraxial region thereof. The fourth lens element 340 is made of plastic material and has the object-side surface 341 and the image-side surface 342 being both aspheric. The object-side surface 341 of the fourth lens element 340 has two inflection points. The image-side surface 342 of the fourth lens element 340 has one inflection point.

The fifth lens element 350 with positive refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric. The object-side surface 351 of the fifth lens element 350 has two inflection points. The image-side surface 352 of the fifth lens element 350 has two inflection points.

The sixth lens element 360 with negative refractive power has an object-side surface 361 being convex in a paraxial region thereof and an image-side surface 362 being concave in a paraxial region thereof. The sixth lens element 360 is made of plastic material and has the object-side surface 361 and the image-side surface 362 being both aspheric. The object-side surface 361 of the sixth lens element 360 has one inflection point. The image-side surface 362 of the sixth lens element 360 has three inflection points. The object-side surface 361 of the sixth lens element 360 has one critical point in an off-axis region thereof. The image-side surface 362 of the sixth lens element 360 has one critical point in an off-axis region thereof.

The seventh lens element 370 with negative refractive power has an object-side surface 371 being convex in a paraxial region thereof and an image-side surface 372 being concave in a paraxial region thereof. The seventh lens element 370 is made of plastic material and has the object-side surface 371 and the image-side surface 372 being both aspheric. The object-side surface 371 of the seventh lens element 370 has three inflection points. The image-side surface 372 of the seventh lens element 370 has one inflection point. The object-side surface 371 of the seventh lens element 370 has one critical point in an off-axis region thereof. The image-side surface 372 of the seventh lens element 370 has one critical point in an off-axis region thereof.

The filter 380 is made of glass material and located between the seventh lens element 370 and the image surface 390, and will not affect the focal length of the image system lens assembly. The image sensor 395 is disposed on or near the image surface 390 of the image system lens assembly.

In this embodiment, among the seven lens elements, one lens element has an Abbe number less than 20. In detail, an Abbe number of the third lens element 330 is less than 20.

In this embodiment, among the seven lens elements, each of three adjacent lens elements has an Abbe number less than 38. In detail, the Abbe numbers of the fifth lens element 350, the sixth lens element 360 and the seventh lens element 370 are all less than 38.

The detailed optical data of the 3rd embodiment are shown in Table 5 and the aspheric surface data are shown in Table 6 below.

TABLE 5

3rd Embodiment
f = 3.85 mm, Fno = 1.35, HFOV = 41.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.583 | | | | |
| 2 | Lens 1 | 2.049 | (ASP) | 0.699 | Plastic | 1.545 | 56.0 | 5.56 |
| 3 | | 5.580 | (ASP) | 0.050 | | | | |
| 4 | Lens 2 | 2.882 | (ASP) | 0.210 | Plastic | 1.614 | 26.0 | −54.91 |
| 5 | | 2.581 | (ASP) | 0.453 | | | | |
| 6 | Lens 3 | 9.261 | (ASP) | 0.212 | Plastic | 1.669 | 19.5 | −8.97 |
| 7 | | 3.607 | (ASP) | 0.031 | | | | |
| 8 | Lens 4 | 5.559 | (ASP) | 0.645 | Plastic | 1.544 | 56.0 | 5.00 |
| 9 | | −5.112 | (ASP) | 0.494 | | | | |
| 10 | Lens 5 | −4.695 | (ASP) | 0.247 | Plastic | 1.582 | 30.2 | 6.52 |
| 11 | | −2.140 | (ASP) | 0.021 | | | | |
| 12 | Lens 6 | 200.000 | (ASP) | 0.696 | Plastic | 1.642 | 22.5 | −39.10 |
| 13 | | 22.262 | (ASP) | 0.646 | | | | |
| 14 | Lens 7 | 7.431 | (ASP) | 0.343 | Plastic | 1.582 | 30.2 | −3.20 |
| 15 | | 1.466 | (ASP) | 0.350 | | | | |
| 16 | Filter | Plano | | 0.080 | Glass | 1.517 | 64.2 | — |
| 17 | | Plano | | 0.075 | | | | |
| 18 | Image | Plano | | — | | | | |

Note:
Reference wavelength is 587.6 nm (d-line).
An effective radius of the image-side surface 332 (Surface 7) is 1.190 mm.

TABLE 6

Aspheric Coefficients

| Surface # | 2 | 3 | 4 | 5 | 6 |
|---|---|---|---|---|---|
| k = | 3.0581E−01 | −8.9967E+01 | −1.7945E+01 | −1.0571E+01 | −6.0311E+01 |
| A4 = | −8.6911E−04 | −9.4735E−02 | −1.4072E−01 | −1.2478E−02 | −1.3906E−01 |
| A6 = | −9.6831E−03 | 2.0040E−01 | 2.5309E−01 | −1.4326E−02 | 8.0068E−02 |
| A8 = | 2.0793E−02 | −1.9109E−01 | −2.0940E−01 | 1.4108E−01 | −1.1697E−01 |
| A10 = | −2.2514E−02 | 9.7610E−02 | 8.7750E−02 | −1.9071E−01 | 9.3628E−02 |
| A12 = | 1.2653E−02 | −1.8309E−02 | −5.0219E−03 | 1.0011E−01 | −4.1704E−02 |
| A14 = | −3.3261E−03 | −4.0661E−03 | −1.0654E−02 | −1.2727E−02 | 5.8130E−03 |
| A16 = | 2.9963E−04 | 1.6598E−03 | 3.1285E−03 | −4.5458E−03 | — |

| Surface # | 7 | 8 | 9 | 10 | 11 |
|---|---|---|---|---|---|
| k = | −4.5124E+01 | −7.6239E+01 | −5.1488E+01 | 5.3301E+00 | −1.0003E+00 |
| A4 = | −7.9871E−02 | −4.3581E−02 | −1.0906E−01 | −2.2086E−01 | −7.0282E−02 |
| A6 = | 8.1382E−02 | 1.0314E−01 | 6.4584E−02 | 2.2497E−01 | 6.6057E−02 |
| A8 = | −1.1291E−01 | −1.2775E−01 | −6.7149E−02 | −1.9005E−01 | −8.2504E−02 |
| A10 = | 6.5586E−02 | 6.2996E−02 | 5.1154E−02 | 1.1218E−01 | 7.2161E−02 |
| A12 = | −1.2374E−02 | −9.9490E−03 | −2.4920E−02 | −3.2196E−02 | −2.7345E−02 |
| A14 = | — | — | 5.4448E−03 | 3.4073E−03 | 4.5134E−03 |
| A16 = | — | — | — | — | −2.6595E−04 |

| Surface # | 12 | 13 | 14 | 15 |
|---|---|---|---|---|
| k = | 9.0000E+01 | 8.9996E+01 | −2.9821E+01 | −6.6546E+00 |
| A4 = | 1.1822E−01 | 5.6715E−02 | −2.5432E−01 | −1.1058E−01 |
| A6 = | −1.4517E−01 | −5.5602E−02 | 1.9065E−01 | 6.6752E−02 |
| A8 = | 7.5047E−02 | 1.0734E−02 | −1.0740E−01 | −2.6449E−02 |
| A10 = | −2.2009E−02 | 2.4406E−03 | 3.3984E−02 | 5.9537E−03 |
| A12 = | 3.0570E−03 | −1.9178E−03 | −5.7295E−03 | −7.3811E−04 |
| A14 = | −1.5422E−04 | 3.9658E−04 | 4.8978E−04 | 4.7009E−05 |
| A16 = | — | −2.7408E−05 | −1.6816E−05 | −1.2022E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 3.85 | R5/f | 2.40 |
| Fno | 1.35 | R14/f | 0.38 |
| HFOV [deg.] | 41.9 | f/f1 | 0.69 |
| Vd1 | 56.0 | f/f2 | −0.07 |
| Vd2 | 26.0 | f/f3 | −0.43 |
| Vd3 | 19.5 | f/f4 | 0.77 |
| Vd4 | 56.0 | f/f5 | 0.59 |
| Vd5 | 30.2 | f/f6 | −0.10 |
| Vd6 | 22.5 | f/f7 | −1.20 |
| Vd7 | 30.2 | f/f12 | 0.65 |
| ΣVd | 240.4 | f/f34 | 0.36 |
| CT6/CT7 | 2.03 | f/|R9| + f/|R10| | 2.62 |
| SD/TD | 0.88 | f/R12 | 0.17 |
| T67/CT7 | 1.88 | |f|min/|f|max | 0.06 |
| TL [mm] | 5.25 | NVd32 | 5 |
| TL/EPD | 1.84 | NVd35 | 5 |
| TL/f | 1.36 | NVd38 | 5 |
| TL/ImgH | 1.49 | Sag42/CT4 | −0.59 |
| R1/f | 0.53 | Y11/Y72 | 0.45 |
| (R3 − R4)/(R3 + R4) | 0.06 | — | — |

4th Embodiment

Figure 7:
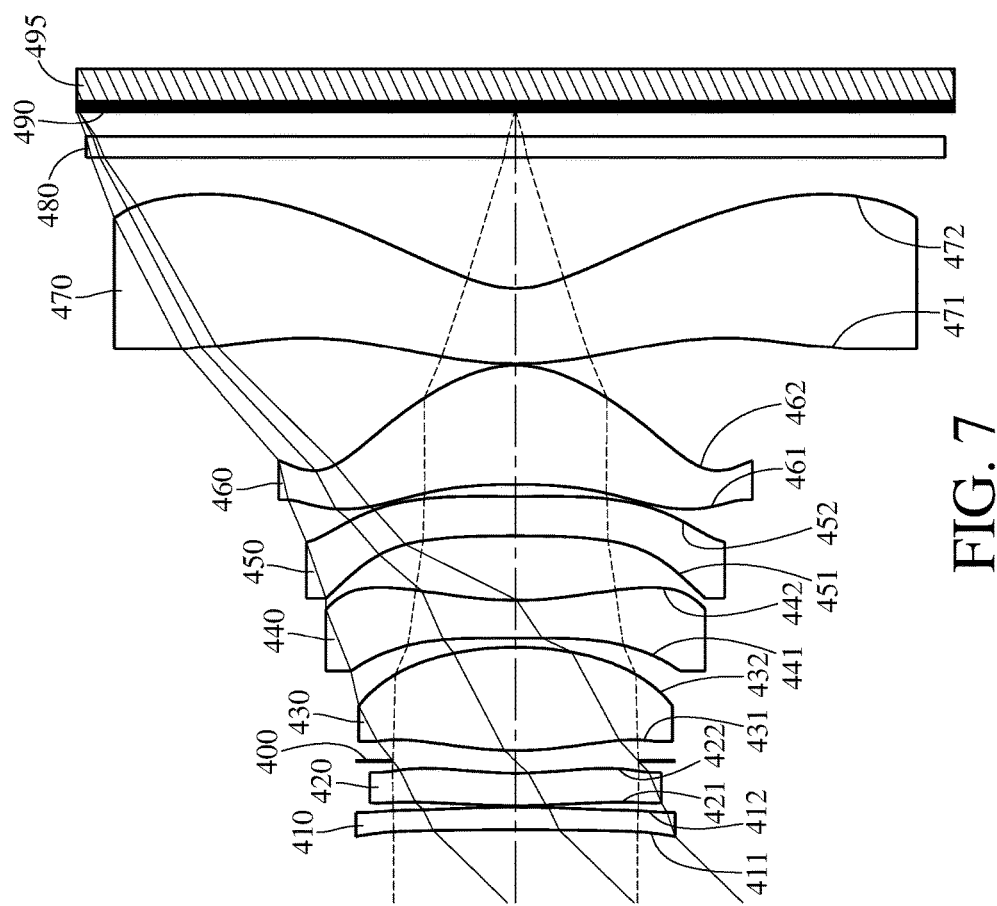
FIG. 7 is a schematic view of an image capturing unit according to the 4th embodiment of the present disclosure.
Figure 8:
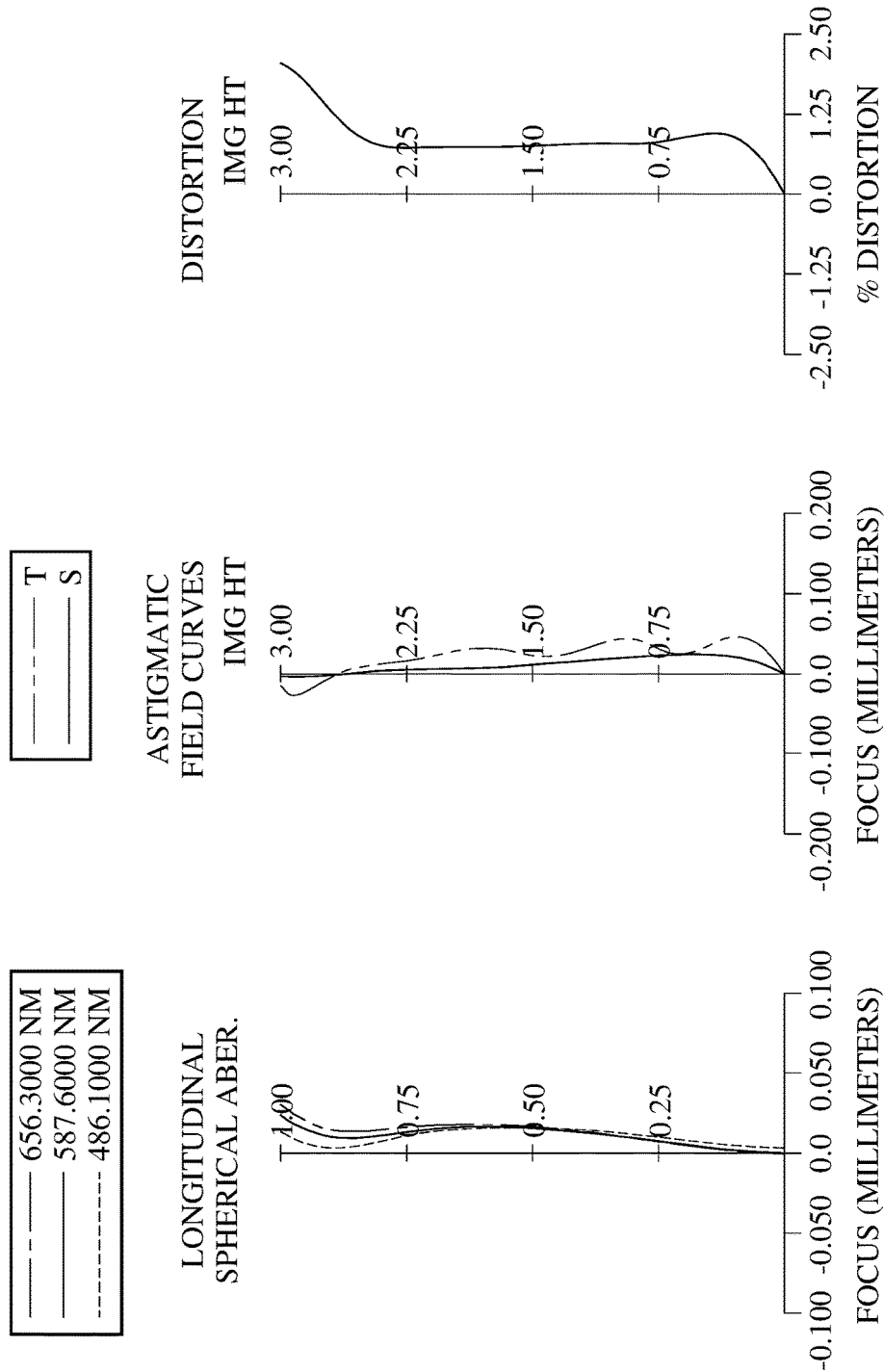
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the image system lens assembly (its reference numeral is omitted) of the present disclosure and an image sensor 495. The image system lens assembly includes, in order from an object side to an image side, a first lens element 410, a second lens element 420, an aperture stop 400, a third lens element 430, a fourth lens element 440, a fifth lens element 450, a sixth lens element 460, a seventh lens element 470, a filter 480 and an image surface 490. The image system lens assembly includes seven lens elements (410, 420, 430, 440, 450, 460 and 470) with no additional lens element disposed between each of the adjacent seven lens elements.

The first lens element 410 with positive refractive power has an object-side surface 411 being concave in a paraxial region thereof and an image-side surface 412 being convex in a paraxial region thereof. The first lens element 410 is made of plastic material and has the object-side surface 411 and the image-side surface 412 being both aspheric. The image-side surface 412 of the first lens element 410 has three inflection points.

The second lens element 420 with negative refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric. The object-side surface 421 of the second lens element 420 has two inflection points. The image-side surface 422 of the second lens element 420 has two inflection points. The object-side surface 421 of the second lens element 420 has two critical points in an off-axis region thereof. The image-side surface 422 of the second lens element 420 has one critical point in an off-axis region thereof.

The third lens element 430 with positive refractive power has an object-side surface 431 being convex in a paraxial region thereof and an image-side surface 432 being convex in a paraxial region thereof. The third lens element 430 is made of plastic material and has the object-side surface 431 and the image-side surface 432 being both aspheric. The object-side surface 431 of the third lens element 430 has one inflection point. The object-side surface 431 of the third lens element 430 has one critical point in an off-axis region thereof.

The fourth lens element 440 with negative refractive power has an object-side surface 441 being concave in a paraxial region thereof and an image-side surface 442 being concave in a paraxial region thereof. The fourth lens element 440 is made of plastic material and has the object-side surface 441 and the image-side surface 442 being both aspheric. The image-side surface 442 of the fourth lens element 440 has one inflection point. The image-side surface 442 of the fourth lens element 440 has one critical point in an off-axis region thereof.

The fifth lens element 450 with negative refractive power has an object-side surface 451 being concave in a paraxial region thereof and an image-side surface 452 being concave in a paraxial region thereof. The fifth lens element 450 is made of plastic material and has the object-side surface 451 and the image-side surface 452 being both aspheric. The object-side surface 451 of the fifth lens element 450 has one inflection point. The image-side surface 452 of the fifth lens element 450 has two inflection points. The image-side surface 452 of the fifth lens element 450 has one critical point in an off-axis region thereof.

The sixth lens element 460 with positive refractive power has an object-side surface 461 being concave in a paraxial region thereof and an image-side surface 462 being convex in a paraxial region thereof. The sixth lens element 460 is made of plastic material and has the object-side surface 461 and the image-side surface 462 being both aspheric. The object-side surface 461 of the sixth lens element 460 has two inflection points. The image-side surface 462 of the sixth lens element 460 has two inflection points. The object-side surface 461 of the sixth lens element 460 has one critical point in an off-axis region thereof. The image-side surface 462 of the sixth lens element 460 has one critical point in an off-axis region thereof.

The seventh lens element 470 with negative refractive power has an object-side surface 471 being convex in a paraxial region thereof and an image-side surface 472 being concave in a paraxial region thereof. The seventh lens element 470 is made of plastic material and has the object-side surface 471 and the image-side surface 472 being both aspheric. The object-side surface 471 of the seventh lens element 470 has three inflection points. The image-side surface 472 of the seventh lens element 470 has one inflection point. The object-side surface 471 of the seventh lens element 470 has one critical point in an off-axis region thereof. The image-side surface 472 of the seventh lens element 470 has one critical point in an off-axis region thereof.

The filter 480 is made of glass material and located between the seventh lens element 470 and the image surface

490, and will not affect the focal length of the image system lens assembly. The image sensor 495 is disposed on or near the image surface 490 of the image system lens assembly.

In this embodiment, among the seven lens elements, each of two lens elements has an Abbe number less than 20. In detail, the Abbe numbers of the first lens element 410 and the fifth lens element 450 are both less than 20.

The detailed optical data of the 4th embodiment are shown in Table 7 and the aspheric surface data are shown in Table 8 below.

TABLE 7

4th Embodiment
f = 2.85 mm, Fno = 1.70, HFOV = 45.8 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Lens 1 | −34.871 | (ASP) | 0.156 | Plastic | 1.669 | 19.5 | 12.05 |
| 2 |  | −6.558 | (ASP) | 0.010 |  |  |  |  |
| 3 | Lens 2 | 5.328 | (ASP) | 0.222 | Plastic | 1.582 | 30.2 | −8.33 |
| 4 |  | 2.500 | (ASP) | 0.084 |  |  |  |  |
| 5 | Ape. Stop | Plano |  | 0.073 |  |  |  |  |
| 6 | Lens 3 | 2.435 | (ASP) | 0.710 | Plastic | 1.544 | 56.0 | 2.21 |
| 7 |  | −2.129 | (ASP) | 0.061 |  |  |  |  |
| 8 | Lens 4 | −202.840 | (ASP) | 0.265 | Plastic | 1.614 | 26.0 | −3.81 |
| 9 |  | 2.367 | (ASP) | 0.443 |  |  |  |  |
| 10 | Lens 5 | −10.852 | (ASP) | 0.271 | Plastic | 1.669 | 19.5 | −9.97 |
| 11 |  | 17.484 | (ASP) | 0.082 |  |  |  |  |
| 12 | Lens 6 | −5.477 | (ASP) | 0.820 | Plastic | 1.544 | 56.0 | 1.43 |
| 13 |  | −0.718 | (ASP) | 0.010 |  |  |  |  |
| 14 | Lens 7 | 2.374 | (ASP) | 0.521 | Plastic | 1.582 | 30.2 | −1.76 |
| 15 |  | 0.658 | (ASP) | 0.900 |  |  |  |  |
| 16 | Filter | Plano |  | 0.145 | Glass | 1.517 | 64.2 | — |
| 17 |  | Plano |  | 0.168 |  |  |  |  |
| 18 | Image | Plano |  | — |  |  |  |  |

Note:
Reference wavelength is 587.6 nm (d-line).

TABLE 8

Aspheric Coefficients

| Surface # | 1 | 2 | 3 | 4 | 6 |
|---|---|---|---|---|---|
| k = | −9.0000E+01 | −9.0000E+01 | −3.9806E+01 | −1.0643E+01 | −9.4487E+00 |
| A4 = | 3.9292E−03 | 4.8520E−02 | −1.4567E−01 | −3.3453E−01 | −5.1960E−02 |
| A6 = | −1.0175E−02 | 5.6861E−02 | 3.7878E−01 | 3.9033E−01 | −7.3333E−02 |
| A8 = | −1.4540E−02 | −1.7879E−01 | −5.9018E−01 | −4.5607E−01 | 2.2118E−02 |
| A10 = | 4.5410E−03 | 9.3495E−02 | 3.0204E−01 | 2.4837E−01 | −6.8945E−03 |

| Surface # | 7 | 8 | 9 | 10 | 11 |
|---|---|---|---|---|---|
| k = | −6.3529E+00 | 9.0000E+01 | 5.3244E−01 | 3.8252E+01 | −8.8565E+01 |
| A4 = | −2.6692E−02 | −1.2010E−01 | −1.7546E−01 | −9.9707E−02 | −2.6103E−01 |
| A6 = | −2.2919E−01 | −2.0549E−01 | 5.1545E−02 | 1.1923E−01 | 3.2334E−01 |
| A8 = | 2.2493E−01 | 3.5342E−01 | 9.6736E−03 | −2.8298E−01 | −3.2475E−01 |
| A10 = | −9.5372E−02 | −2.1489E−01 | −3.5847E−02 | 1.8309E−01 | 1.7025E−01 |
| A12 = | — | 4.4415E−02 | 8.4658E−03 | −3.5912E−02 | −4.1801E−02 |
| A14 = | — | — | — | — | 4.0807E−03 |

| Surface # | 12 | 13 | 14 | 15 |
|---|---|---|---|---|
| k = | 6.7662E+00 | −4.1134E+00 | −8.6798E−01 | −4.3363E+00 |
| A4 = | −2.4494E−01 | −3.0251E−01 | −8.9492E−02 | −2.3257E−02 |
| A6 = | 2.6783E−01 | 3.7173E−01 | 2.3744E−02 | 5.4760E−04 |
| A8 = | −7.2814E−02 | −3.6724E−01 | −7.9564E−03 | 1.0468E−03 |
| A10 = | −1.3804E−02 | 2.3270E−01 | 1.9556E−03 | −3.4010E−04 |
| A12 = | 1.2560E−02 | −6.8859E−02 | −2.3098E−04 | 4.4025E−05 |
| A14 = | −2.2052E−03 | 7.4307E−03 | 9.7659E−06 | −2.1078E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 2.85 | R5/f | 0.85 |
| Fno | 1.70 | R14/f | 0.23 |
| HFOV [deg.] | 45.8 | f/f1 | 0.24 |
| Vd1 | 19.5 | f/f2 | −0.34 |
| Vd2 | 30.2 | f/f3 | 1.29 |
| Vd3 | 56.0 | f/f4 | −0.75 |
| Vd4 | 26.0 | f/f5 | −0.29 |
| Vd5 | 19.5 | f/f6 | 1.99 |
| Vd6 | 56.0 | f/f7 | −1.62 |
| Vd7 | 30.2 | f/f12 | −0.10 |
| ΣV/d | 237.3 | f/f34 | 0.70 |
| CT6/CT7 | 1.57 | f/|R9| + f/|R10| | 0.43 |
| SD/TD | 0.87 | f/R12 | −3.98 |
| T67/CT7 | 0.02 | |f|min/|f|max | 0.12 |
| TL [mm] | 4.94 | NVd32 | 5 |
| TL/EPD | 2.94 | NVd35 | 5 |
| TL/f | 1.73 | NVd38 | 5 |
| TL/ImgH | 1.65 | Sag42/CT4 | −0.24 |
| R1/f | −12.22 | Y11/Y72 | 0.40 |
| (R3 − R4)/(R3 + R4) | 0.36 | — | — |

5th Embodiment

Figure 9:
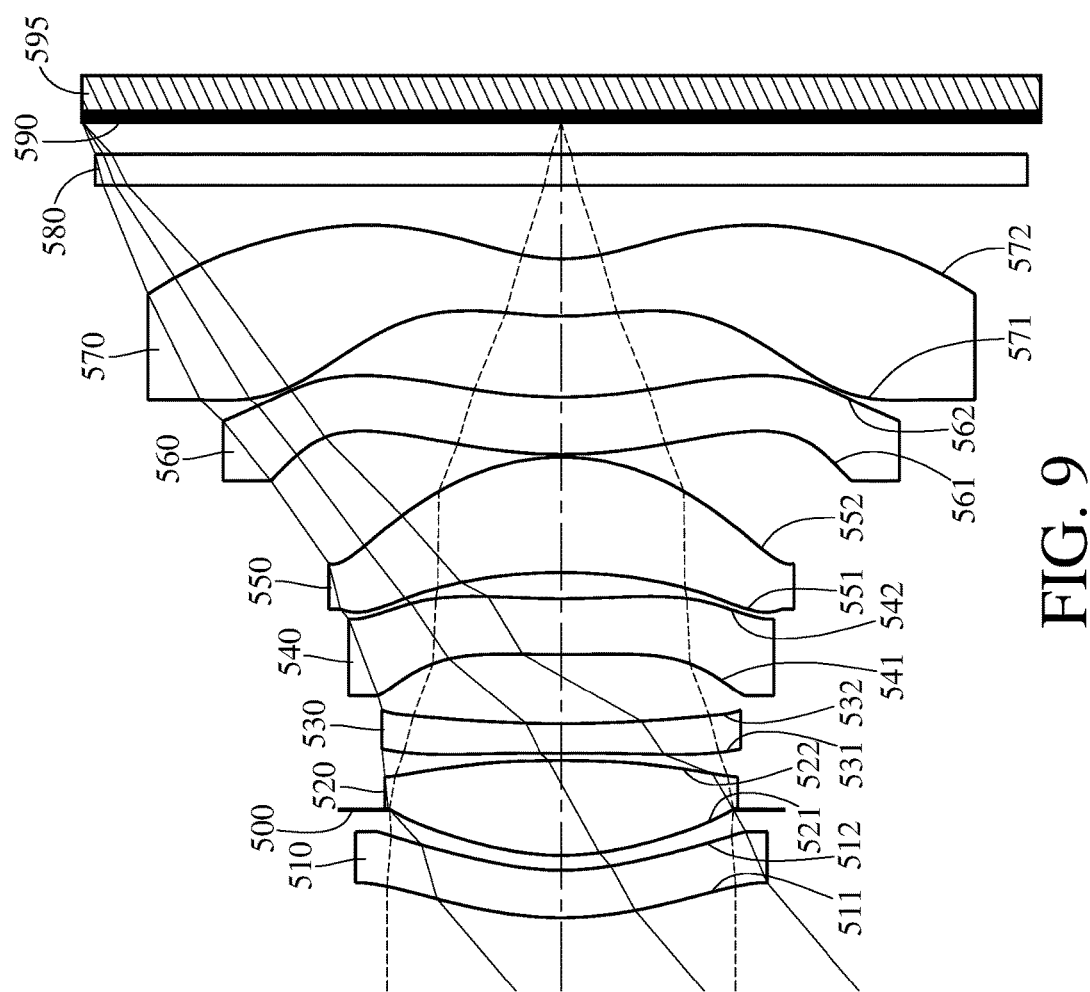
FIG. 9 is a schematic view of an image capturing unit according to the 5th embodiment of the present disclosure.
Figure 10:
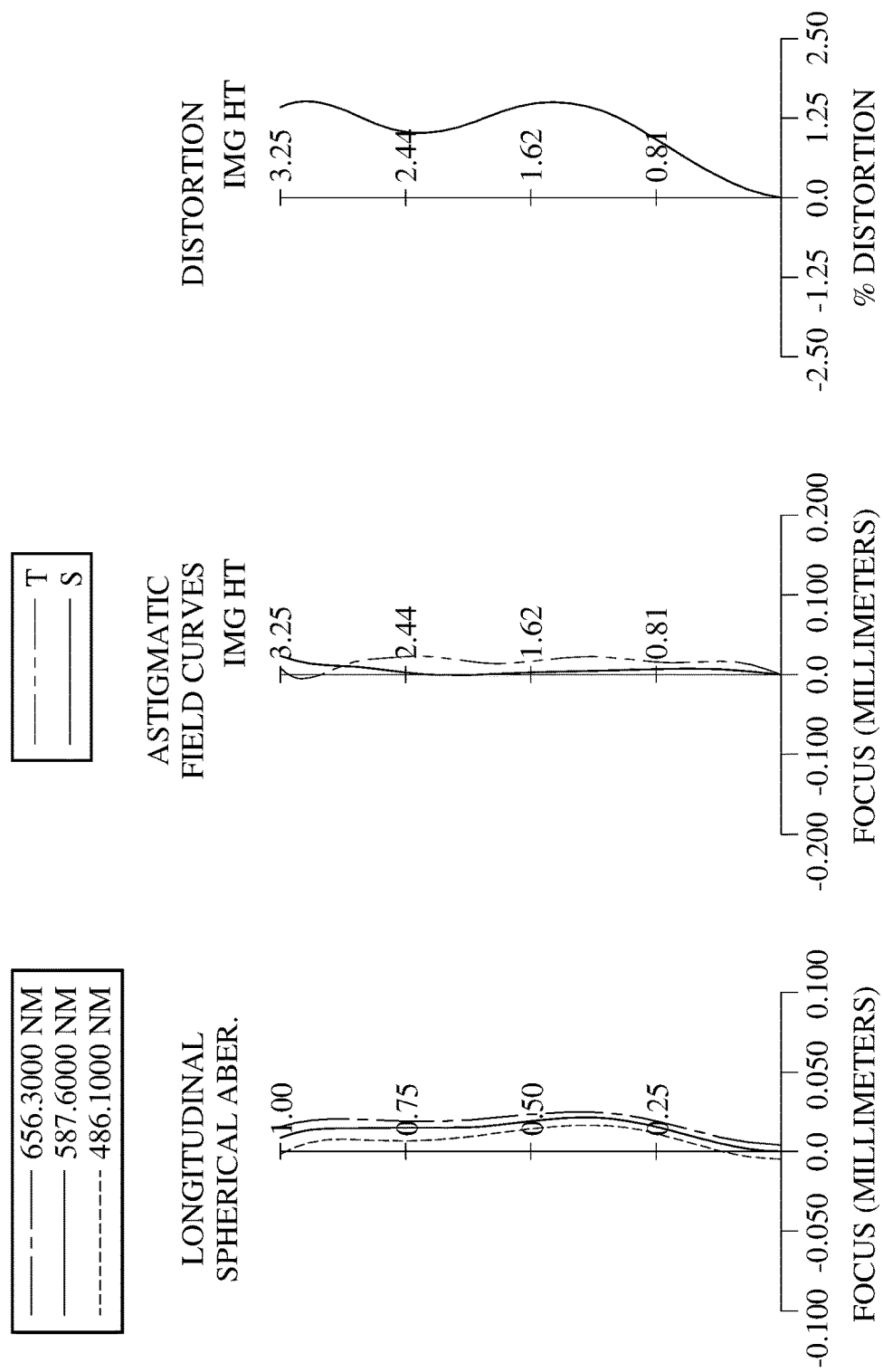
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the image system lens assembly (its reference numeral is omitted) of the present disclosure and an image sensor 595. The image system lens assembly includes, in order from an object side to an image side, a first lens element 510, an aperture stop 500, a second lens element 520, a third lens element 530, a fourth lens element 540, a fifth lens element 550, a sixth lens element 560, a seventh lens element 570, a filter 580 and an image surface 590. The image system lens assembly includes seven lens elements (510, 520, 530, 540, 550, 560 and 570) with no additional lens element disposed between each of the adjacent seven lens elements.

The first lens element 510 with negative refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric. The object-side surface 511 of the first lens element 510 has one inflection point. The image-side surface 512 of the first lens element 510 has one inflection point. The object-side surface 511 of the first lens element 510 has one critical point in an off-axis region thereof.

The second lens element 520 with positive refractive power has an object-side surface 521 being convex in a paraxial region thereof and an image-side surface 522 being convex in a paraxial region thereof. The second lens element 520 is made of plastic material and has the object-side surface 521 and the image-side surface 522 being both aspheric. The image-side surface 522 of the second lens element 520 has one inflection point.

The third lens element 530 with negative refractive power has an object-side surface 531 being concave in a paraxial region thereof and an image-side surface 532 being concave in a paraxial region thereof. The third lens element 530 is made of plastic material and has the object-side surface 531 and the image-side surface 532 being both aspheric. The object-side surface 531 of the third lens element 530 has one inflection point. The object-side surface 531 of the third lens element 530 has one critical point in an off-axis region thereof.

The fourth lens element 540 with negative refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric. The object-side surface 541 of the fourth lens element 540 has two inflection points. The image-side surface 542 of the fourth lens element 540 has two inflection points. The object-side surface 541 of the fourth lens element 540 has one critical point in an off-axis region thereof. The image-side surface 542 of the fourth lens element 540 has two critical points in an off-axis region thereof.

The fifth lens element 550 with positive refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric. The object-side surface 551 of the fifth lens element 550 has one inflection point. The image-side surface 552 of the fifth lens element 550 has one inflection point. The object-side surface 551 of the fifth lens element 550 has one critical point in an off-axis region thereof. The image-side surface 552 of the fifth lens element 550 has one critical point in an off-axis region thereof.

The sixth lens element 560 with positive refractive power has an object-side surface 561 being convex in a paraxial region thereof and an image-side surface 562 being concave in a paraxial region thereof. The sixth lens element 560 is made of plastic material and has the object-side surface 561 and the image-side surface 562 being both aspheric. The object-side surface 561 of the sixth lens element 560 has two inflection points. The image-side surface 562 of the sixth lens element 560 has three inflection points. The object-side surface 561 of the sixth lens element 560 has one critical point in an off-axis region thereof. The image-side surface 562 of the sixth lens element 560 has one critical point in an off-axis region thereof.

The seventh lens element 570 with negative refractive power has an object-side surface 571 being convex in a paraxial region thereof and an image-side surface 572 being concave in a paraxial region thereof. The seventh lens element 570 is made of plastic material and has the object-side surface 571 and the image-side surface 572 being both aspheric. The object-side surface 571 of the seventh lens element 570 has three inflection points. The image-side surface 572 of the seventh lens element 570 has one inflection point. The object-side surface 571 of the seventh lens element 570 has two critical points in an off-axis region thereof. The image-side surface 572 of the seventh lens element 570 has one critical point in an off-axis region thereof.

The filter 580 is made of glass material and located between the seventh lens element 570 and the image surface 590, and will not affect the focal length of the image system lens assembly. The image sensor 595 is disposed on or near the image surface 590 of the image system lens assembly.

In this embodiment, among the seven lens elements, each of two lens elements has an Abbe number less than 20. In detail, the Abbe numbers of the fourth lens element 540 and the sixth lens element 560 are both less than 20.

The detailed optical data of the 5th embodiment are shown in Table 9 and the aspheric surface data are shown in Table 10 below.

TABLE 9

5th Embodiment
f = 3.76 mm, Fno = 1.59, HFOV = 40.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.440 | (ASP) | 0.322 | Plastic | 1.614 | 26.0 | −18.92 |
| 2 | | 1.915 | (ASP) | 0.410 | | | | |
| 3 | Ape. Stop | Plano | | −0.309 | | | | |
| 4 | Lens 2 | 1.845 | (ASP) | 0.643 | Plastic | 1.544 | 56.0 | 2.81 |
| 5 | | −7.798 | (ASP) | 0.049 | | | | |
| 6 | Lens 3 | −130.605 | (ASP) | 0.200 | Plastic | 1.639 | 23.2 | −9.83 |
| 7 | | 6.596 | (ASP) | 0.473 | | | | |
| 8 | Lens 4 | 10.000 | (ASP) | 0.379 | Plastic | 1.669 | 19.5 | −18.42 |
| 9 | | 5.435 | (ASP) | 0.178 | | | | |
| 10 | Lens 5 | −3.642 | (ASP) | 0.781 | Plastic | 1.544 | 56.0 | 4.63 |
| 11 | | −1.601 | (ASP) | 0.020 | | | | |
| 12 | Lens 6 | 3.118 | (ASP) | 0.393 | Plastic | 1.669 | 19.5 | 35.34 |
| 13 | | 3.411 | (ASP) | 0.550 | | | | |
| 14 | Lens 7 | 2.677 | (ASP) | 0.386 | Plastic | 1.582 | 30.2 | −4.01 |
| 15 | | 1.181 | (ASP) | 0.500 | | | | |
| 16 | Filter | Plano | | 0.210 | Glass | 1.517 | 64.2 | — |
| 17 | | Plano | | 0.218 | | | | |
| 18 | Image | Plano | | — | | | | |

Note:
Reference wavelength is 587.6 nm (d-line).

TABLE 10

Aspheric Coefficients

| Surface # | 1 | 2 | 4 | 5 | 6 |
|---|---|---|---|---|---|
| k = | −1.1295E+00 | −3.3090E+00 | −1.0905E+00 | −8.0462E+01 | −9.0000E+01 |
| A4 = | −3.5787E−02 | −6.1801E−02 | −6.2998E−02 | −9.0767E−02 | −9.9471E−02 |
| A6 = | −5.5050E−03 | −2.5790E−02 | −1.3052E−02 | 1.0475E−01 | 2.1855E−01 |
| A8 = | 1.7269E−02 | 1.0299E−01 | 4.6925E−02 | −5.5722E−02 | −1.4071E−01 |
| A10 = | −1.6848E−02 | −9.2257E−02 | −1.6789E−02 | −1.3784E−02 | −7.7470E−03 |
| A12 = | 6.1493E−03 | 4.2224E−02 | 2.2772E−03 | 3.0240E−02 | 4.7554E−02 |
| A14 = | −8.8348E−04 | −8.7108E−03 | — | −8.7906E−03 | −1.4587E−02 |

| Surface # | 7 | 8 | 9 | 10 | 11 |
|---|---|---|---|---|---|
| k = | −8.2430E+01 | −3.5222E+01 | −4.7210E+00 | −6.4424E+00 | −7.2506E−01 |
| A4 = | −4.7808E−02 | −1.7545E−01 | −1.3861E−01 | −5.2252E−02 | −9.9064E−02 |
| A6 = | 1.2240E−01 | 3.8363E−02 | 4.0823E−02 | 8.2807E−02 | 2.5437E−01 |
| A8 = | −1.2054E−01 | −1.0213E−01 | −1.9594E−02 | −1.0883E−01 | −3.6928E−01 |
| A10 = | 5.9297E−02 | 1.4624E−01 | −2.5238E−02 | 5.8296E−02 | 3.1622E−01 |
| A12 = | −2.4354E−02 | −1.3013E−01 | 4.0826E−02 | −9.5670E−03 | −1.5467E−01 |
| A14 = | 8.8452E−03 | 6.6723E−02 | −1.6999E−02 | — | 3.9701E−02 |
| A16 = | | −1.2654E−02 | 2.3449E−03 | — | −4.0358E−03 |

| Surface # | 12 | 13 | 14 | 15 |
|---|---|---|---|---|
| k = | −4.8735E+01 | 6.5409E−01 | −1.5493E+00 | −4.0869E+00 |
| A4 = | 1.0865E−01 | 7.9513E−03 | −2.8470E−01 | −1.5172E−01 |
| A6 = | −1.3823E−01 | −8.5411E−02 | 1.0987E−01 | 7.3366E−02 |
| A8 = | 8.2329E−02 | 6.2370E−02 | −3.2557E−02 | −2.4780E−02 |
| A10 = | −2.8137E−02 | −2.4777E−02 | 8.8401E−03 | 5.4969E−03 |
| A12 = | 4.6637E−03 | 5.3295E−03 | −1.6072E−03 | −7.3520E−04 |
| A14 = | −2.8668E−04 | −5.7458E−04 | 1.5570E−04 | 5.2962E−05 |
| A16 = | — | 2.4183E−05 | −6.0805E−06 | −1.5701E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 3.76 | R5/f | −34.74 |
| Fno | 1.59 | R14/f | 0.31 |
| HFOV [deg.] | 40.4 | f/f1 | −0.20 |
| Vd1 | 26.0 | f/f2 | 1.34 |
| Vd2 | 56.0 | f/f3 | −0.38 |
| Vd3 | 23.2 | f/f4 | −0.20 |
| Vd4 | 19.5 | f/f5 | 0.81 |
| Vd5 | 56.0 | f/f6 | 0.11 |
| Vd6 | 19.5 | f/f7 | −0.94 |
| Vd7 | 30.2 | f/f12 | 1.09 |
| ΣVd | 230.3 | f/f34 | −0.61 |
| CT6/CT7 | 1.02 | f/|R9| + f/|R10| | 3.38 |
| SD/TD | 0.84 | f/R12 | 1.10 |
| T67/CT7 | 1.42 | |f|min/|f|max | 0.08 |
| TL [mm] | 5.40 | NVd32 | 5 |
| TL/EPD | 2.29 | NVd35 | 5 |
| TL/f | 1.44 | NVd38 | 5 |
| TL/ImgH | 1.66 | Sag42/CT4 | −0.36 |
| R1/f | 0.65 | Y11/Y72 | 0.50 |
| (R3 − R4)/(R3 + R4) | −1.62 | — | — |

6th Embodiment

Figure 11:
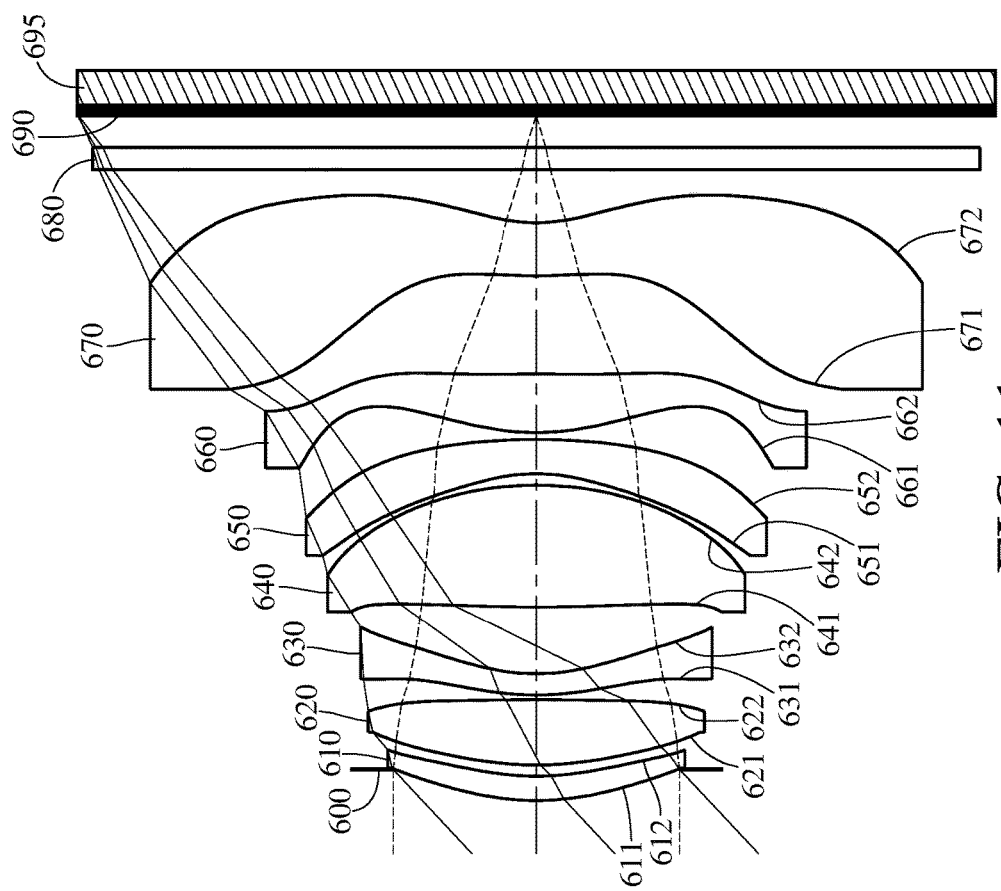
FIG. 11 is a schematic view of an image capturing unit according to the 6th embodiment of the present disclosure.
Figure 12:
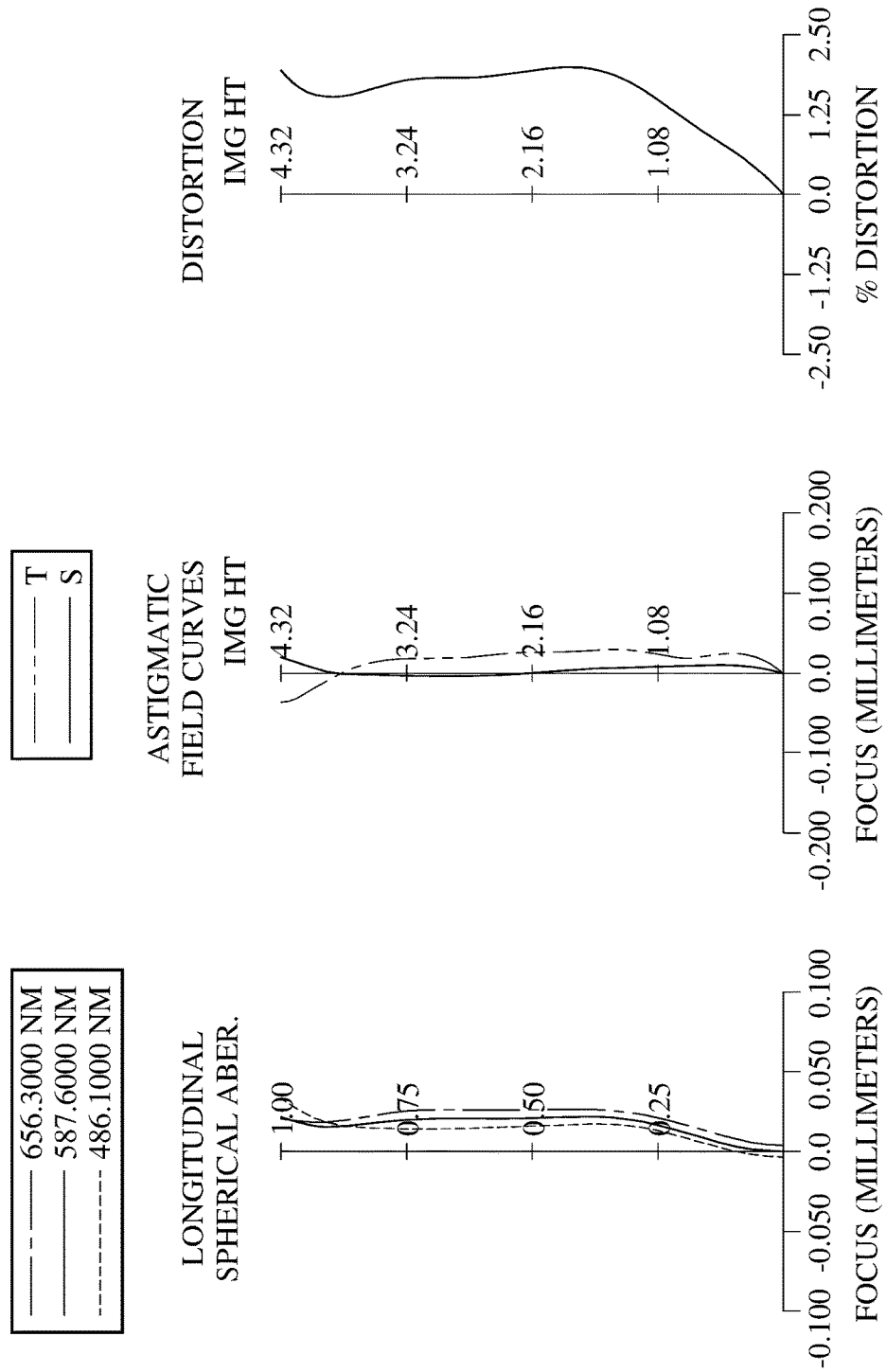
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the image system lens assembly (its reference numeral is omitted) of the present disclosure and an image sensor 695. The image system lens assembly includes, in order from an object side to an image side, an aperture stop 600, a first lens element 610, a second lens element 620, a third lens element 630, a fourth lens element 640, a fifth lens element 650, a sixth lens element 660, a seventh lens element 670, a filter 680 and an image surface 690. The image system lens assembly includes seven lens elements (610, 620, 630, 640, 650, 660 and 670) with no additional lens element disposed between each of the adjacent seven lens elements.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with positive refractive power has an object-side surface 621 being convex in a paraxial region thereof and an image-side surface 622 being convex in a paraxial region thereof. The second lens element 620 is made of plastic material and has the object-side surface 621 and the image-side surface 622 being both aspheric. The image-side surface 622 of the second lens element 620 has one inflection point.

The third lens element 630 with negative refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric. The object-side surface 631 of the third lens element 630 has two inflection points. The image-side surface 632 of the third lens element 630 has two inflection points. The object-side surface 631 of the third lens element 630 has two critical points in an off-axis region thereof.

The fourth lens element 640 with positive refractive power has an object-side surface 641 being convex in a paraxial region thereof and an image-side surface 642 being convex in a paraxial region thereof. The fourth lens element 640 is made of plastic material and has the object-side surface 641 and the image-side surface 642 being both aspheric. The object-side surface 641 of the fourth lens element 640 has one inflection point. The object-side surface 641 of the fourth lens element 640 has one critical point in an off-axis region thereof.

The fifth lens element 650 with negative refractive power has an object-side surface 651 being concave in a paraxial region thereof and an image-side surface 652 being convex in a paraxial region thereof. The fifth lens element 650 is made of plastic material and has the object-side surface 651 and the image-side surface 652 being both aspheric. The object-side surface 651 of the fifth lens element 650 has two inflection points. The image-side surface 652 of the fifth lens element 650 has one inflection point.

The sixth lens element 660 with positive refractive power has an object-side surface 661 being convex in a paraxial region thereof and an image-side surface 662 being convex in a paraxial region thereof. The sixth lens element 660 is made of plastic material and has the object-side surface 661 and the image-side surface 662 being both aspheric. The object-side surface 661 of the sixth lens element 660 has two inflection points. The image-side surface 662 of the sixth lens element 660 has three inflection points. The object-side surface 661 of the sixth lens element 660 has one critical point in an off-axis region thereof. The image-side surface 662 of the sixth lens element 660 has three critical points in an off-axis region thereof.

The seventh lens element 670 with negative refractive power has an object-side surface 671 being convex in a paraxial region thereof and an image-side surface 672 being concave in a paraxial region thereof. The seventh lens element 670 is made of plastic material and has the object-side surface 671 and the image-side surface 672 being both aspheric. The object-side surface 671 of the seventh lens element 670 has two inflection points. The image-side surface 672 of the seventh lens element 670 has one inflection point. The object-side surface 671 of the seventh lens element 670 has one critical point in an off-axis region thereof. The image-side surface 672 of the seventh lens element 670 has one critical point in an off-axis region thereof.

The filter 680 is made of glass material and located between the seventh lens element 670 and the image surface 690, and will not affect the focal length of the image system lens assembly. The image sensor 695 is disposed on or near the image surface 690 of the image system lens assembly.

In this embodiment, among the seven lens elements, each of two lens elements has an Abbe number less than 20. In detail, the Abbe numbers of the third lens element 630 and the fifth lens element 650 are both less than 20.

In this embodiment, among the seven lens elements, each of three adjacent lens elements has an Abbe number less than 38. In detail, the Abbe numbers of the fifth lens element 650, the sixth lens element 660 and the seventh lens element 670 are all less than 38.

The detailed optical data of the 6th embodiment are shown in Table 11 and the aspheric surface data are shown in Table 12 below.

TABLE 11

6th Embodiment
f = 4.53 mm, Fno = 1.68, HFOV = 43.0 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Ape. Stop | Plano |  | −0.292 |  |  |  |  |
| 2 | Lens 1 | 2.522 | (ASP) | 0.229 | Plastic | 1.582 | 30.2 | 131.38 |
| 3 |  | 2.521 | (ASP) | 0.105 |  |  |  |  |
| 4 | Lens 2 | 3.180 | (ASP) | 0.614 | Plastic | 1.544 | 56.0 | 5.17 |
| 5 |  | −22.711 | (ASP) | 0.044 |  |  |  |  |
| 6 | Lens 3 | 2.605 | (ASP) | 0.200 | Plastic | 1.669 | 19.5 | −10.76 |
| 7 |  | 1.853 | (ASP) | 0.633 |  |  |  |  |
| 8 | Lens 4 | 15.044 | (ASP) | 1.147 | Plastic | 1.544 | 56.0 | 5.28 |
| 9 |  | −3.455 | (ASP) | 0.108 |  |  |  |  |
| 10 | Lens 5 | −1.673 | (ASP) | 0.323 | Plastic | 1.669 | 19.5 | −3.71 |
| 11 |  | −5.536 | (ASP) | 0.064 |  |  |  |  |
| 12 | Lens 6 | 2.338 | (ASP) | 0.550 | Plastic | 1.639 | 23.2 | 3.38 |
| 13 |  | −25.456 | (ASP) | 0.929 |  |  |  |  |
| 14 | Lens 7 | 4.060 | (ASP) | 0.500 | Plastic | 1.582 | 30.2 | −4.18 |
| 15 |  | 1.453 | (ASP) | 0.500 |  |  |  |  |
| 16 | Filter | Plano |  | 0.210 | Glass | 1.517 | 64.2 | — |
| 17 |  | Plano |  | 0.296 |  |  |  |  |
| 18 | Image | Plano |  | — |  |  |  |  |

Note:
Reference wavelength is 587.6 nm (d-line).

TABLE 12

Aspheric Coefficients

| Surface # | 2 | 3 | 4 | 5 | 6 |
|---|---|---|---|---|---|
| k = | −5.7427E+00 | −8.4774E+00 | −2.5134E−01 | −9.0000E+01 | −1.0616E+00 |
| A4 = | 6.0629E−03 | −1.5499E−02 | −3.6893E−02 | 2.1249E−02 | −8.4579E−02 |
| A6 = | 3.7462E−03 | 1.8304E−03 | 1.7389E−02 | −1.7030E−02 | 5.6666E−02 |
| A8 = | −5.3937E−03 | −7.1907E−03 | −1.8146E−02 | 5.1627E−03 | −6.1805E−02 |
| A10 = | 4.1690E−04 | 5.0022E−03 | 1.1557E−02 | −6.9868E−03 | 3.7459E−02 |
| A12 = | 8.5467E−04 | 6.8144E−04 | −7.9283E−03 | 5.6842E−03 | −1.3261E−02 |
| A14 = | −6.8930E−06 | −6.3557E−04 | −1.2863E−03 | −2.0694E−03 | 2.8051E−03 |
| A16 = | −7.1609E−05 | 4.6798E−05 | 2.8253E−04 | 2.8336E−04 | −2.6506E−04 |

| Surface # | 7 | 8 | 9 | 10 | 11 |
|---|---|---|---|---|---|
| k = | −2.4155E+00 | 6.4008E+01 | −9.8254E−01 | −1.5722E+00 | 3.7469E+00 |
| A4 = | −7.4544E−02 | −1.6915E−02 | −6.9941E−02 | 8.8835E−02 | 2.9536E−02 |
| A6 = | 7.0694E−02 | 8.5630E−03 | 1.2947E−02 | −8.4325E−02 | −4.1317E−02 |
| A8 = | −6.3486E−02 | −9.0150E−03 | −1.3137E−01 | −5.3588E−02 | 2.3746E−02 |
| A10 = | 3.6112E−02 | 6.3347E−03 | 7.1364E−02 | 4.0148E−02 | −7.9963E−03 |
| A12 = | −1.1938E−02 | −2.6787E−03 | −2.1456E−02 | −1.3770E−02 | 1.5473E−03 |
| A14 = | 2.1984E−03 | 5.7541E−04 | 3.3613E−03 | 2.3186E−03 | −1.6526E−04 |
| A16 = | −1.7358E−04 | −5.7384E−05 | −2.1560E−04 | −1.5393E−04 | 7.9630E−06 |

| Surface # | 12 | 13 | 14 | 15 |
|---|---|---|---|---|
| k = | −4.1048E+00 | 4.3474E+01 | −9.0000E+01 | −6.6276E+00 |
| A4 = | −2.0735E−02 | 5.8403E−02 | −1.1075E−01 | −5.3289E−02 |
| A6 = | 4.7411E−03 | −3.9546E−02 | 7.3162E−03 | 1.1608E−02 |
| A8 = | −5.7311E−03 | 9.8290E−03 | 4.7709E−03 | −1.3835E−03 |
| A10 = | 7.2394E−04 | −2.0420E−03 | −1.1354E−03 | 9.6077E−05 |
| A12 = | 3.5927E−04 | 4.2075E−04 | 1.1136E−04 | −4.4322E−06 |
| A14 = | −1.2389E−04 | −5.0790E−05 | −5.4136E−06 | 1.4640E−07 |
| A16 = | 1.0875E−05 | 2.3550E−06 | 1.0991E−07 | −2.7685E−09 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 4.53 | R5/f | 0.57 |
| Fno | 1.68 | R14/f | 0.32 |
| HFOV [deg.] | 43.0 | f/f1 | 0.03 |
| Vd1 | 30.2 | f/f2 | 0.88 |
| Vd2 | 56.0 | f/f3 | −0.42 |
| Vd3 | 19.5 | f/f4 | 0.86 |
| Vd4 | 56.0 | f/f5 | −1.22 |
| Vd5 | 19.5 | f/f6 | 1.34 |
| Vd6 | 23.2 | f/f7 | −1.08 |
| Vd7 | 30.2 | f/f12 | 0.88 |
| ΣVd | 234.6 | f/f34 | 0.51 |
| CT6/CT7 | 1.10 | f/|R9| + f/|R10| | 3.53 |
| SD/TD | 0.95 | f/R12 | −0.18 |
| T67/CT7 | 1.86 | |f|min/|f|max | 0.03 |
| TL [mm] | 6.45 | NVd32 | 5 |
| TL/EPD | 2.39 | NVd35 | 5 |
| TL/f | 1.42 | NVd38 | 5 |
| TL/ImgH | 1.49 | Sag42/CT4 | −0.73 |
| R1/f | 0.56 | Y11/Y72 | 0.37 |
| (R3 − R4)/(R3 + R4) | −1.33 | — | — |

7th Embodiment

Figure 13:
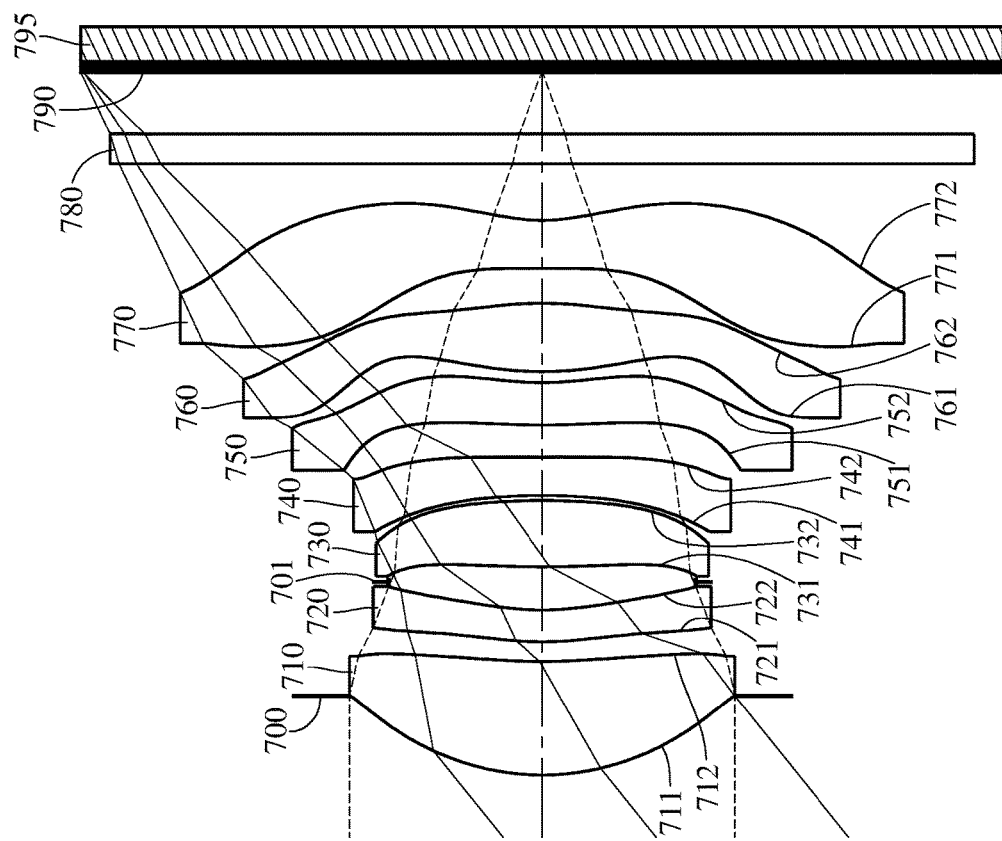
FIG. 13 is a schematic view of an image capturing unit according to the 7th embodiment of the present disclosure.
Figure 14:
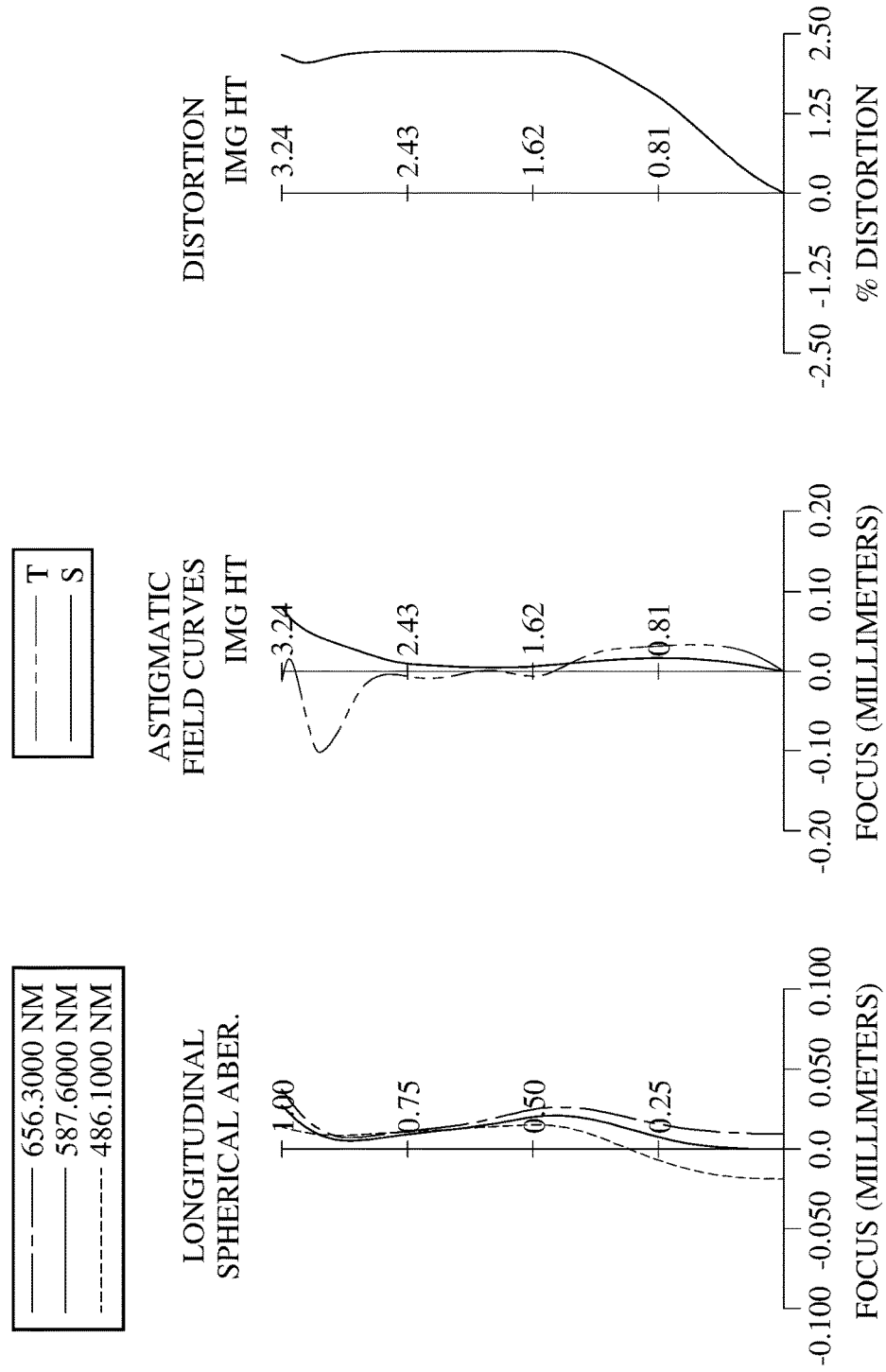
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the image system lens assembly (its reference numeral is omitted) of the present disclosure and an image sensor 795. The image system lens assembly includes, in order from an object side to an image side, an aperture stop 700, a first lens element 710, a second lens element 720, a stop 701, a third lens element 730, a fourth lens element 740, a fifth lens element 750, a sixth lens element 760, a seventh lens element 770, a filter 780 and an image surface 790. The image system lens assembly includes seven lens elements (710, 720, 730, 740, 750, 760 and 770) with no additional lens element disposed between each of the adjacent seven lens elements.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric. The object-side surface 711 of the first lens element 710 has one inflection point. The image-side surface 712 of the first lens element 710 has one inflection point. The image-side surface 712 of the first lens element 710 has one critical point in an off-axis region thereof.

The second lens element 720 with negative refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric. The object-side surface 721 of the second lens element 720 has two inflection points.

The third lens element 730 with positive refractive power has an object-side surface 731 being convex in a paraxial region thereof and an image-side surface 732 being convex in a paraxial region thereof. The third lens element 730 is made of plastic material and has the object-side surface 731 and the image-side surface 732 being both aspheric. The object-side surface 731 of the third lens element 730 has one inflection point. The object-side surface 731 of the third lens element 730 has one critical point in an off-axis region thereof.

The fourth lens element 740 with negative refractive power has an object-side surface 741 being concave in a paraxial region thereof and an image-side surface 742 being concave in a paraxial region thereof. The fourth lens element 740 is made of plastic material and has the object-side surface 741 and the image-side surface 742 being both aspheric. The image-side surface 742 of the fourth lens element 740 has two inflection points. The image-side surface 742 of the fourth lens element 740 has two critical points in an off-axis region thereof.

The fifth lens element 750 with negative refractive power has an object-side surface 751 being convex in a paraxial region thereof and an image-side surface 752 being concave in a paraxial region thereof. The fifth lens element 750 is made of plastic material and has the object-side surface 751 and the image-side surface 752 being both aspheric. The object-side surface 751 of the fifth lens element 750 has one inflection point. The image-side surface 752 of the fifth lens element 750 has three inflection points. The object-side surface 751 of the fifth lens element 750 has one critical point in an off-axis region thereof. The image-side surface 752 of the fifth lens element 750 has one critical point in an off-axis region thereof.

The sixth lens element 760 with positive refractive power has an object-side surface 761 being convex in a paraxial region thereof and an image-side surface 762 being convex in a paraxial region thereof. The sixth lens element 760 is made of plastic material and has the object-side surface 761 and the image-side surface 762 being both aspheric. The object-side surface 761 of the sixth lens element 760 has three inflection points. The image-side surface 762 of the sixth lens element 760 has six inflection points. The object-side surface 761 of the sixth lens element 760 has one critical point in an off-axis region thereof.

The seventh lens element 770 with negative refractive power has an object-side surface 771 being convex in a paraxial region thereof and an image-side surface 772 being concave in a paraxial region thereof. The seventh lens element 770 is made of plastic material and has the object-side surface 771 and the image-side surface 772 being both aspheric. The object-side surface 771 of the seventh lens element 770 has three inflection points. The image-side surface 772 of the seventh lens element 770 has two inflection points. The object-side surface 771 of the seventh lens element 770 has two critical points in an off-axis region thereof. The image-side surface 772 of the seventh lens element 770 has one critical point in an off-axis region thereof.

The filter 780 is made of glass material and located between the seventh lens element 770 and the image surface 790, and will not affect the focal length of the image system lens assembly. The image sensor 795 is disposed on or near the image surface 790 of the image system lens assembly.

In this embodiment, among the seven lens elements, each of three lens elements has an Abbe number less than 20. In detail, the Abbe numbers of the second lens element 720, the fourth lens element 740 and the fifth lens element 750 are all less than 20.

In this embodiment, among the seven lens elements, each of four adjacent lens elements has an Abbe number less than 38. In detail, the Abbe numbers of the fourth lens element 740, the fifth lens element 750, the sixth lens element 760 and the seventh lens element 770 are all less than 38.

The detailed optical data of the 7th embodiment are shown in Table 13 and the aspheric surface data are shown in Table 14 below.

TABLE 13

7th Embodiment
f = 3.92 mm, Fno = 1.44, HFOV = 38.9 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Ape. Stop | Plano |  | −0.560 |  |  |  |  |
| 2 | Lens 1 | 1.808 | (ASP) | 0.806 | Plastic | 1.545 | 56.1 | 5.18 |
| 3 |  | 4.239 | (ASP) | 0.139 |  |  |  |  |
| 4 | Lens 2 | 2.320 | (ASP) | 0.225 | Plastic | 1.669 | 19.5 | −41.45 |
| 5 |  | 2.058 | (ASP) | 0.197 |  |  |  |  |
| 6 | Stop | Plano |  | 0.107 |  |  |  |  |
| 7 | Lens 3 | 7.890 | (ASP) | 0.469 | Plastic | 1.544 | 56.0 | 5.29 |
| 8 |  | −4.429 | (ASP) | 0.035 |  |  |  |  |
| 9 | Lens 4 | −4.312 | (ASP) | 0.270 | Plastic | 1.669 | 19.5 | −5.61 |
| 10 |  | 29.770 | (ASP) | 0.228 |  |  |  |  |
| 11 | Lens 5 | 4.954 | (ASP) | 0.304 | Plastic | 1.669 | 19.5 | −5.67 |
| 12 |  | 2.096 | (ASP) | 0.077 |  |  |  |  |
| 13 | Lens 6 | 2.383 | (ASP) | 0.484 | Plastic | 1.639 | 23.5 | 1.89 |
| 14 |  | −2.249 | (ASP) | 0.245 |  |  |  |  |
| 15 | Lens 7 | 48.176 | (ASP) | 0.340 | Plastic | 1.584 | 28.2 | −2.30 |
| 16 |  | 1.306 | (ASP) | 0.400 |  |  |  |  |
| 17 | Filter | Plano |  | 0.210 | Glass | 1.517 | 64.2 | — |
| 18 |  | Plano |  | 0.439 |  |  |  |  |
| 19 | Image | Plano |  | — |  |  |  |  |

Note:
Reference wavelength is 587.6 nm (d-line).
An effective radius of the stop 701 (Surface 6) is 1.086 mm.
An effective radius of the object-side surface 741 (Surface 9) is 1.182 mm.

TABLE 14

Aspheric Coefficients

| Surface # | 2 | 3 | 4 | 5 | 7 |
|---|---|---|---|---|---|
| k = | −1.0159E+00 | −2.8585E+01 | −4.9104E+00 | −6.8794E+00 | 3.6709E+01 |
| A4 = | 2.1848E−02 | −1.0209E−01 | −2.5870E−01 | −1.3775E−01 | −4.2867E−02 |
| A6 = | −1.6048E−02 | 1.3975E−01 | 2.4120E−01 | 1.4557E−01 | −6.6918E−02 |
| A8 = | 4.3318E−02 | −1.3436E−01 | −1.4140E−01 | −1.4234E−01 | 5.8656E−02 |
| A10 = | −4.8210E−02 | 8.4958E−02 | 8.5647E−02 | 1.8637E−01 | −1.0250E−01 |
| A12 = | 2.5967E−02 | −3.2516E−02 | −4.5910E−02 | −1.4328E−01 | 7.3853E−02 |
| A14 = | −5.6994E−03 | 5.0441E−03 | 1.1567E−02 | 4.2327E−02 | −2.1354E−02 |

| Surface # | 8 | 9 | 10 | 11 | 12 |
|---|---|---|---|---|---|
| k = | −1.1783E+01 | 4.8180E+00 | 0.0000E+00 | 4.1643E+00 | −9.0454E+00 |
| A4 = | 1.4230E−01 | 1.0383E−01 | −5.4918E−02 | −2.5693E−01 | −3.5064E−01 |
| A6 = | −8.5812E−01 | −7.1440E−01 | −9.4420E−02 | 4.6403E−01 | 4.2418E−01 |
| A8 = | 1.7547E+00 | 1.4665E+00 | 1.6461E−01 | −7.0368E−01 | −5.0627E−01 |
| A10 = | −1.9618E+00 | −1.4092E+00 | −9.6119E−02 | 6.0560E−01 | 3.5973E−01 |
| A12 = | 1.0898E+00 | 5.4601E−01 | 4.0024E−03 | −2.8969E−01 | −1.3773E−01 |
| A14 = | −2.3707E−01 | 1.5713E−02 | 8.1313E−03 | 6.5483E−02 | 2.7092E−02 |
| A16 = | — | −4.3769E−02 | — | −4.7373E−03 | −2.1737E−03 |

| Surface # | 13 | 14 | 15 | 16 |
|---|---|---|---|---|
| k = | 9.9022E−03 | −2.6688E+01 | −6.2843E+01 | −7.7941E+00 |
| A4 = | −6.3406E−02 | 9.6870E−02 | −2.9625E−01 | −2.1059E−01 |
| A6 = | −1.1293E−01 | −2.7847E−02 | 7.8742E−02 | 1.4970E−01 |
| A8 = | 2.0034E−01 | −4.3097E−02 | 4.9195E−02 | −7.7040E−02 |
| A10 = | −2.7104E−01 | 1.2654E−02 | −3.6874E−02 | 2.7206E−02 |
| A12 = | 1.7606E−01 | 8.4069E−03 | 1.0862E−02 | −6.3081E−03 |
| A14 = | −5.6172E−02 | −4.8906E−03 | −1.8140E−03 | 9.1389E−04 |
| A16 = | 8.5885E−03 | 8.9315E−04 | 1.8337E−04 | −7.7459E−05 |
| A18 = | −4.6651E−04 | −5.5293E−05 | −1.0737E−05 | 3.4147E−06 |
| A20 = | −7.9672E−06 | −2.0900E−07 | 2.8588E−07 | −5.8205E−08 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 3.92 | R5/f | 2.01 |
| Fno | 1.44 | R14/f | 0.33 |
| HFOV [deg.] | 38.9 | f/f1 | 0.76 |
| Vd1 | 56.1 | f/f2 | −0.09 |
| Vd2 | 19.5 | f/f3 | 0.74 |
| Vd3 | 56.0 | f/f4 | −0.70 |
| Vd4 | 19.5 | f/f5 | −0.69 |
| Vd5 | 19.5 | f/f6 | 2.07 |
| Vd6 | 23.5 | f/f7 | −1.70 |
| Vd7 | 28.2 | f/f12 | 0.71 |
| ΣVd | 222.1 | f/f34 | 0.07 |
| CT6/CT7 | 1.42 | f/|R9| + f/|R10| | 2.66 |
| SD/TD | 0.86 | f/R12 | −1.74 |
| T67/CT7 | 0.72 | |f|min/|f|max | 0.05 |
| TL [mm] | 4.97 | NVd32 | 5 |
| TL/EPD | 1.83 | NVd35 | 5 |
| TL/f | 1.27 | NVd38 | 5 |
| TL/ImgH | 1.54 | Sag42/CT4 | −0.57 |
| R1/f | 0.46 | Y11/Y72 | 0.53 |
| (R3 − R4)/(R3 + R4) | 0.06 | — | — |

8th Embodiment

Figure 15:
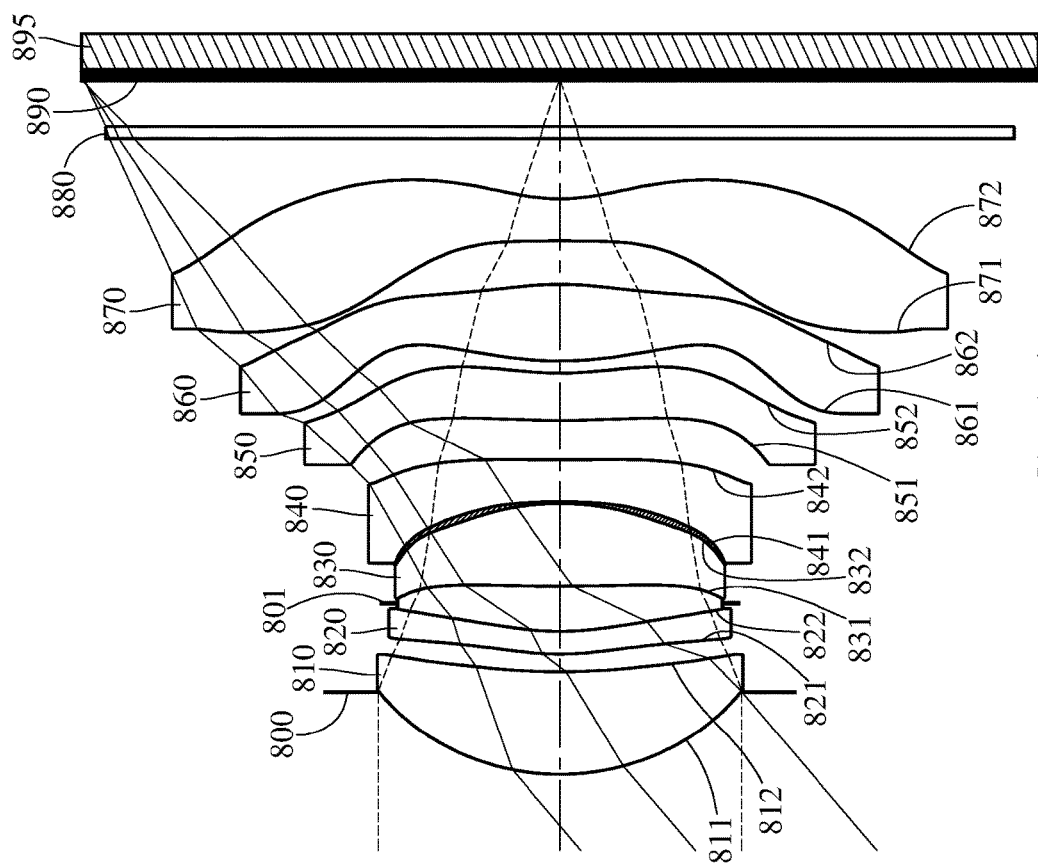
FIG. 15 is a schematic view of an image capturing unit according to the 8th embodiment of the present disclosure.
Figure 16:
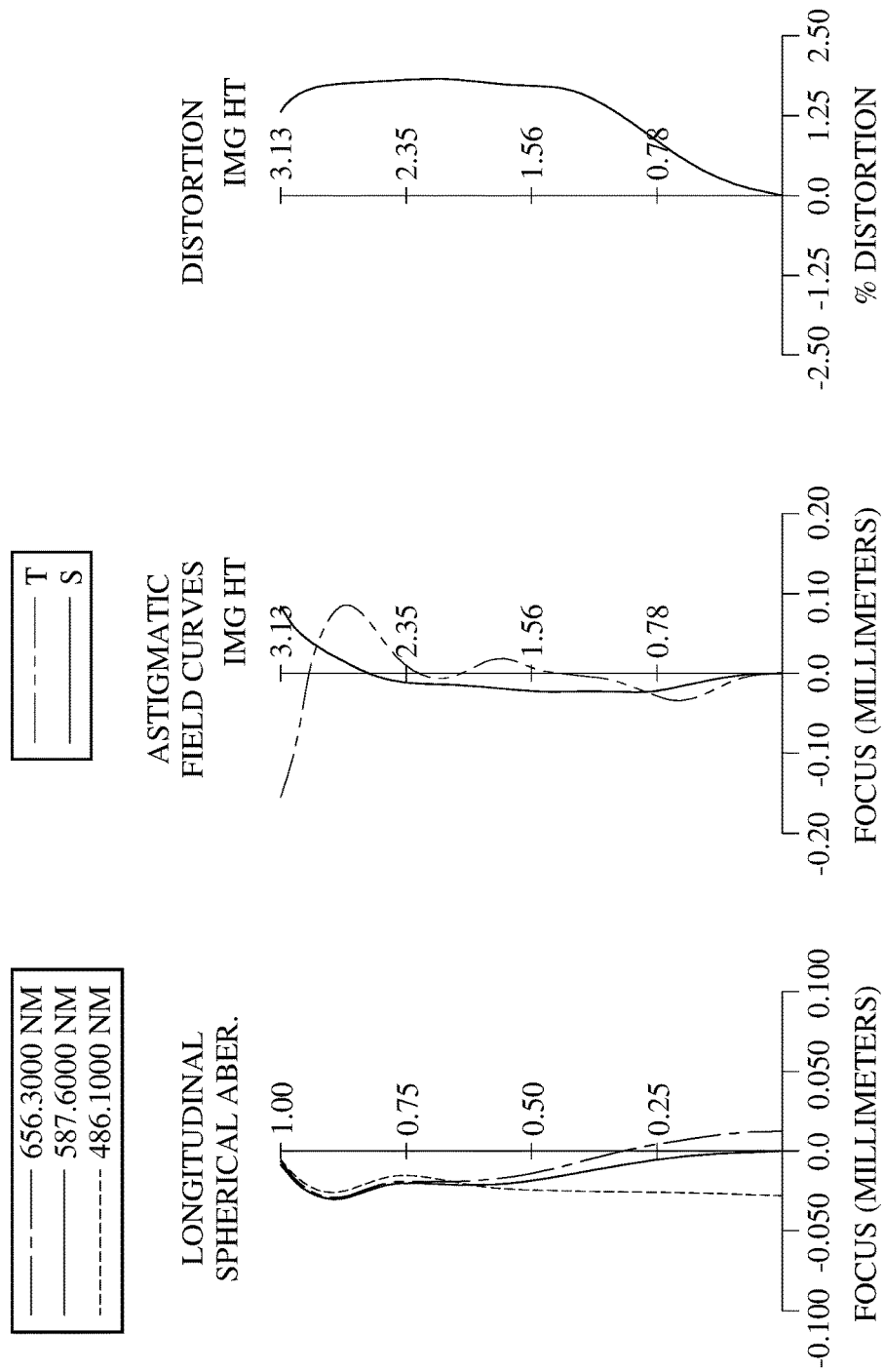
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the image system lens assembly (its reference numeral is omitted) of the present disclosure and an image sensor 895. The image system lens assembly includes, in order from an object side to an image side, an aperture stop 800, a first lens element 810, a second lens element 820, a stop 801, a third lens element 830, a fourth lens element 840, a fifth lens element 850, a sixth lens element 860, a seventh lens element 870, a filter 880 and an image surface 890. The image system lens assembly includes seven lens elements (810, 820, 830, 840, 850, 860 and 870) with no additional lens element disposed between each of the adjacent seven lens elements.

The first lens element 810 with positive refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric.

The second lens element 820 with negative refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric. The object-side surface 821 of the second lens element 820 has two inflection points. The image-side surface 822 of the second lens element 820 has four inflection points.

The third lens element 830 with positive refractive power has an object-side surface 831 being convex in a paraxial region thereof and an image-side surface 832 being convex in a paraxial region thereof. The third lens element 830 is made of plastic material and has the object-side surface 831 and the image-side surface 832 being both aspheric. The object-side surface 831 of the third lens element 830 has one inflection point. The image-side surface 832 of the third lens element 830 has one inflection point. The object-side surface 831 of the third lens element 830 has one critical point in an off-axis region thereof.

The fourth lens element 840 with negative refractive power has an object-side surface 841 being concave in a paraxial region thereof and an image-side surface 842 being concave in a paraxial region thereof. The fourth lens element 840 is made of plastic material and has the object-side surface 841 and the image-side surface 842 being both aspheric. The image-side surface 842 of the fourth lens element 840 has two inflection points. The image-side surface 842 of the fourth lens element 840 has one critical point in an off-axis region thereof. The image-side surface 832 of the third lens element 830 and the object-side surface 841 of the fourth lens element 840 are cemented to each other.

The fifth lens element 850 with negative refractive power has an object-side surface 851 being convex in a paraxial region thereof and an image-side surface 852 being concave in a paraxial region thereof. The fifth lens element 850 is made of plastic material and has the object-side surface 851 and the image-side surface 852 being both aspheric. The object-side surface 851 of the fifth lens element 850 has one inflection point. The image-side surface 852 of the fifth lens element 850 has three inflection points. The object-side surface 851 of the fifth lens element 850 has one critical point in an off-axis region thereof. The image-side surface 852 of the fifth lens element 850 has one critical point in an off-axis region thereof.

The sixth lens element 860 with positive refractive power has an object-side surface 861 being convex in a paraxial region thereof and an image-side surface 862 being convex in a paraxial region thereof. The sixth lens element 860 is made of plastic material and has the object-side surface 861 and the image-side surface 862 being both aspheric. The object-side surface 861 of the sixth lens element 860 has two inflection points. The image-side surface 862 of the sixth lens element 860 has six inflection points. The object-side surface 861 of the sixth lens element 860 has one critical point in an off-axis region thereof.

The seventh lens element 870 with negative refractive power has an object-side surface 871 being concave in a paraxial region thereof and an image-side surface 872 being concave in a paraxial region thereof. The seventh lens element 870 is made of plastic material and has the object-side surface 871 and the image-side surface 872 being both aspheric. The object-side surface 871 of the seventh lens element 870 has two inflection points. The image-side surface 872 of the seventh lens element 870 has two inflection points. The object-side surface 871 of the seventh lens element 870 has one critical point in an off-axis region thereof. The image-side surface 872 of the seventh lens element 870 has one critical point in an off-axis region thereof.

The filter 880 is made of glass material and located between the seventh lens element 870 and the image surface 890, and will not affect the focal length of the image system lens assembly. The image sensor 895 is disposed on or near the image surface 890 of the image system lens assembly.

In this embodiment, among the seven lens elements, each of three lens elements has an Abbe number less than 20. In detail, the Abbe numbers of the second lens element 820, the fourth lens element 840 and the fifth lens element 850 are all less than 20.

In this embodiment, among the seven lens elements, each of four adjacent lens elements has an Abbe number less than 38. In detail, the Abbe numbers of the fourth lens element 840, the fifth lens element 850, the sixth lens element 860 and the seventh lens element 870 are all less than 38.

The detailed optical data of the 8th embodiment are shown in Table 15 and the aspheric surface data are shown in Table 16 below.

TABLE 15

8th embodiment
f = 3.64 mm, Fno = 1.52, HFOV = 40.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.544 | | | | |
| 2 | Lens 1 | 1.612 | (ASP) | 0.677 | Plastic | 1.545 | 56.1 | 4.82 |
| 3 | | 3.556 | (ASP) | 0.118 | | | | |
| 4 | Lens 2 | 1.964 | (ASP) | 0.149 | Plastic | 1.669 | 19.5 | −282.26 |
| 5 | | 1.885 | (ASP) | 0.184 | | | | |
| 6 | Stop | Plano | | 0.113 | | | | |
| 7 | Lens 3 | 11.665 | (ASP) | 0.543 | Plastic | 1.559 | 40.4 | 3.38 |
| 8 | | −2.219 | (ASP) | 0.013 | Cemented | 1.485 | 53.2 | |
| 9 | Lens 4 | −4.528 | (ASP) | 0.275 | Plastic | 1.669 | 19.5 | −5.32 |
| 10 | | 17.097 | (ASP) | 0.262 | | | | |
| 11 | Lens 5 | 4.699 | (ASP) | 0.312 | Plastic | 1.669 | 19.5 | −6.00 |
| 12 | | 2.107 | (ASP) | 0.080 | | | | |
| 13 | Lens 6 | 2.385 | (ASP) | 0.503 | Plastic | 1.639 | 23.5 | 1.86 |
| 14 | | −2.176 | (ASP) | 0.287 | | | | |
| 15 | Lens 7 | −226.627 | (ASP) | 0.276 | Plastic | 1.584 | 28.2 | −2.01 |
| 16 | | 1.179 | (ASP) | 0.400 | | | | |
| 17 | Filter | Plano | | 0.080 | Glass | 1.517 | 64.2 | — |
| 18 | | Plano | | 0.299 | | | | |
| 19 | Image | Plano | | — | | | | |

Note:
Reference wavelength is 587.6 nm (d-line).
An effective radius of the stop 801 (Surface 6) is 1.070 mm.
An effective radius of the image-side surface 842 (Surface 10) is 1.260 mm.
An effective radius of the image-side surface 862 (Surface 14) is 2.100 mm.

TABLE 16

Aspheric Coefficients

| Surface # | 2 | 3 | 4 | 5 | 7 |
|---|---|---|---|---|---|
| k = | −6.1810E−01 | −1.6993E+01 | −5.0545E+00 | −8.0358E+00 | 7.1161E+01 |
| A4 = | 8.4019E−03 | −1.1332E−01 | −2.8179E−01 | −1.2949E−01 | −5.1764E−02 |
| A6 = | 4.1504E−02 | 2.6103E−01 | 1.9979E−01 | −1.2124E−02 | −1.5240E−02 |
| A8 = | −4.2061E−02 | −4.2369E−01 | −1.9298E−01 | 2.0103E−01 | −1.6010E−01 |
| A10 = | 2.1521E−02 | 4.6701E−01 | 7.2934E−02 | −4.0085E−02 | 3.8492E−01 |
| A12 = | 3.1476E−03 | −2.7774E−01 | −1.5879E−01 | −1.8123E−01 | −3.9107E−01 |
| A14 = | −3.0345E−03 | 6.5232E−02 | 7.0531E−02 | 1.0074E−01 | 1.3451E−01 |

| Surface # | 8 | 9 | 10 | 11 | 12 |
|---|---|---|---|---|---|
| k = | −2.0854E+00 | 1.6274E+01 | 0.0000E+00 | 5.0428E+00 | −9.6634E+00 |
| A4 = | −5.9816E−01 | −3.8837E−01 | −1.4914E−01 | −2.9104E−01 | −3.7609E−01 |
| A6 = | 2.0787E+00 | 4.9556E−01 | 1.9448E−01 | 5.2982E−01 | 4.9556E−01 |
| A8 = | −3.9683E+00 | 1.3043E−01 | −3.3447E−01 | −7.6640E−01 | −5.7399E−01 |
| A10 = | 5.0114E+00 | −1.1128E+00 | 3.4183E−01 | 6.2931E−01 | 3.8057E−01 |
| A12 = | −3.6527E+00 | 1.5397E+00 | −1.9182E−01 | −3.0311E−01 | −1.3586E−01 |
| A14 = | 1.0513E+00 | −1.0747E+00 | 4.4813E−02 | 7.5575E−02 | 2.5059E−02 |
| A16 = | — | 2.9861E−01 | — | −7.1192E−03 | −1.9029E−03 |

| Surface # | 13 | 14 | 15 | 16 |
|---|---|---|---|---|
| k = | −1.7457E−02 | −2.4231E+01 | −2.2849E+01 | −7.5982E+00 |
| A4 = | −6.0236E−02 | 1.2236E−01 | −3.4214E−01 | −2.2880E−01 |
| A6 = | −1.5744E−01 | −6.6330E−02 | 1.2594E−01 | 1.6842E−01 |
| A8 = | 3.5163E−01 | −5.8317E−03 | 2.6802E−02 | −8.8772E−02 |
| A10 = | −4.9382E−01 | −1.5979E−02 | −2.9476E−02 | 3.2541E−02 |
| A12 = | 3.4771E−01 | 2.3960E−02 | 8.7008E−03 | −7.9734E−03 |
| A14 = | −1.3134E−01 | −1.0220E−02 | −1.2826E−03 | 1.2512E−03 |
| A16 = | 2.7491E−02 | 1.9753E−03 | 9.4277E−05 | −1.1941E−04 |

TABLE 16-continued

| Aspheric Coefficients | | | | |
|---|---|---|---|---|
| A18 = | −3.0155E−03 | −1.7426E−04 | −2.3106E−06 | 6.3022E−06 |
| A20 = | 1.3516E−04 | 5.2516E−06 | −4.8427E−08 | −1.4177E−07 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 3.64 | R5/f | 3.21 |
| Fno | 1.52 | R14/f | 0.32 |
| HFOV [deg.] | 40.5 | f/f1 | 0.75 |
| Vd1 | 56.1 | f/f2 | −0.01 |
| Vd2 | 19.5 | f/f3 | 1.07 |
| Vd3 | 40.4 | f/f4 | −0.68 |
| Vd4 | 19.5 | f/f5 | −0.61 |
| Vd5 | 19.5 | f/f6 | 1.95 |
| Vd6 | 23.5 | f/f7 | −1.81 |
| Vd7 | 28.2 | f/f12 | 0.77 |
| ΣVd | 206.6 | f/f34 | 0.01 |
| CT6/CT7 | 1.82 | f/|R9| + f/|R10| | 2.50 |
| SD/TD | 0.86 | f/R12 | −1.67 |
| T67/CT7 | 1.04 | |f|min/|f|max | 0.01 |
| TL [mm] | 4.57 | NVd32 | 5 |
| TL/EPD | 1.91 | NVd35 | 5 |
| TL/f | 1.26 | NVd38 | 5 |
| TL/ImgH | 1.46 | Sag42/CT4 | −0.58 |
| R1/f | 0.44 | Y11/Y72 | 0.47 |
| (R3 − R4)/(R3 + R4) | 0.02 | — | — |

9th Embodiment

Figure 17:
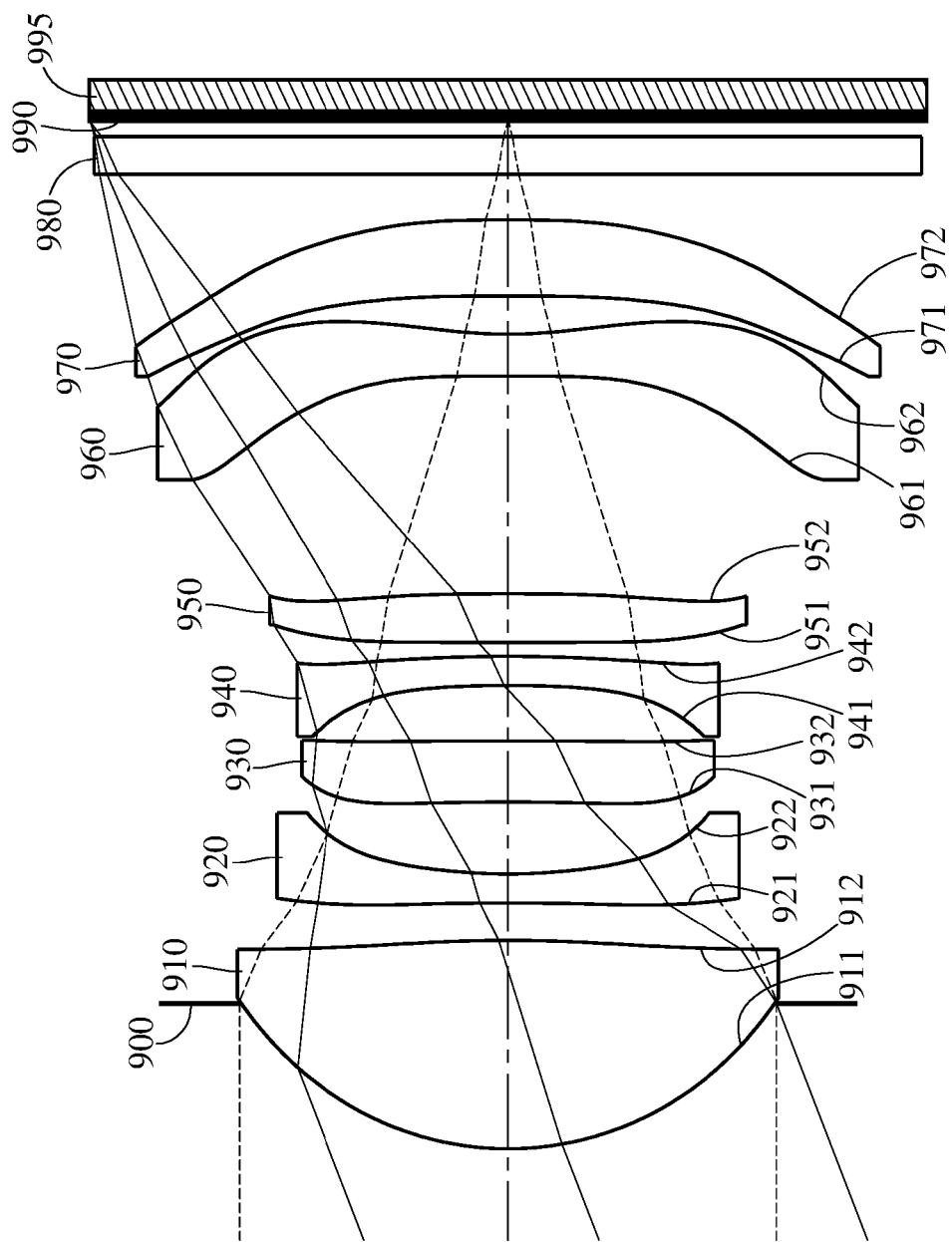
FIG. 17 is a schematic view of an image capturing unit according to the 9th embodiment of the present disclosure.
Figure 18:
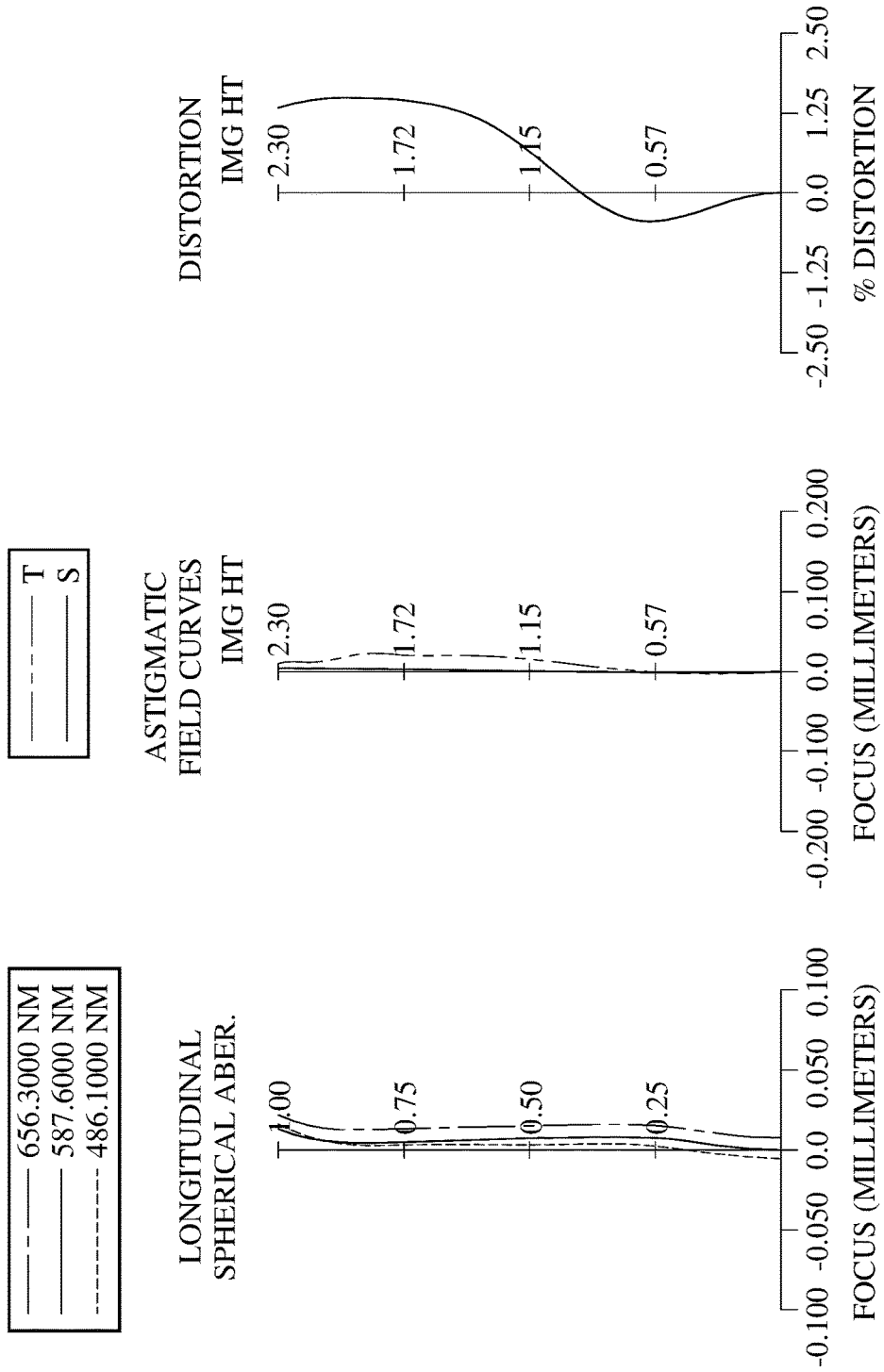
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the image system lens assembly (its reference numeral is omitted) of the present disclosure and an image sensor 995. The image system lens assembly includes, in order from an object side to an image side, an aperture stop 900, a first lens element 910, a second lens element 920, a third lens element 930, a fourth lens element 940, a fifth lens element 950, a sixth lens element 960, a seventh lens element 970, a filter 980 and an image surface 990. The image system lens assembly includes seven lens elements (910, 920, 930, 940, 950, 960 and 970) with no additional lens element disposed between each of the adjacent seven lens elements.

The first lens element 910 with positive refractive power has an object-side surface 911 being convex in a paraxial region thereof and an image-side surface 912 being convex in a paraxial region thereof. The first lens element 910 is made of glass material and has the object-side surface 911 and the image-side surface 912 being both aspheric. The image-side surface 912 of the first lens element 910 has one inflection point.

The second lens element 920 with negative refractive power has an object-side surface 921 being concave in a paraxial region thereof and an image-side surface 922 being concave in a paraxial region thereof. The second lens element 920 is made of plastic material and has the object-side surface 921 and the image-side surface 922 being both aspheric. The object-side surface 921 of the second lens element 920 has one inflection point. The object-side surface 921 of the second lens element 920 has one critical point in an off-axis region thereof.

The third lens element 930 with negative refractive power has an object-side surface 931 being concave in a paraxial region thereof and an image-side surface 932 being convex in a paraxial region thereof. The third lens element 930 is made of plastic material and has the object-side surface 931 and the image-side surface 932 being both aspheric. The object-side surface 931 of the third lens element 930 has one inflection point. The image-side surface 932 of the third lens element 930 has one inflection point. The object-side surface 931 of the third lens element 930 has one critical point in an off-axis region thereof. The image-side surface 932 of the third lens element 930 has one critical point in an off-axis region thereof.

The fourth lens element 940 with negative refractive power has an object-side surface 941 being concave in a paraxial region thereof and an image-side surface 942 being convex in a paraxial region thereof. The fourth lens element 940 is made of plastic material and has the object-side surface 941 and the image-side surface 942 being both aspheric. The image-side surface 942 of the fourth lens element 940 has one inflection point. The image-side surface 942 of the fourth lens element 940 has one critical point in an off-axis region thereof.

The fifth lens element 950 with positive refractive power has an object-side surface 951 being convex in a paraxial region thereof and an image-side surface 952 being convex in a paraxial region thereof. The fifth lens element 950 is made of plastic material and has the object-side surface 951 and the image-side surface 952 being both aspheric. The object-side surface 951 of the fifth lens element 950 has two inflection points. The image-side surface 952 of the fifth lens element 950 has one inflection point. The image-side surface 952 of the fifth lens element 950 has one critical point in an off-axis region thereof.

The sixth lens element 960 with negative refractive power has an object-side surface 961 being planar in a paraxial region thereof and an image-side surface 962 being concave in a paraxial region thereof. The sixth lens element 960 is made of plastic material and has the object-side surface 961 and the image-side surface 962 being both aspheric. The object-side surface 961 of the sixth lens element 960 has one inflection point. The image-side surface 962 of the sixth lens element 960 has two inflection points. The image-side surface 962 of the sixth lens element 960 has one critical point in an off-axis region thereof.

The seventh lens element 970 with positive refractive power has an object-side surface 971 being concave in a paraxial region thereof and an image-side surface 972 being convex in a paraxial region thereof. The seventh lens element 970 is made of plastic material and has the object-side surface 971 and the image-side surface 972 being both aspheric. The object-side surface 971 of the seventh lens element 970 has one inflection point. The image-side surface 972 of the seventh lens element 970 has three inflection points.

The filter 980 is made of glass material and located between the seventh lens element 970 and the image surface 990, and will not affect the focal length of the image system lens assembly. The image sensor 995 is disposed on or near the image surface 990 of the image system lens assembly.

In this embodiment, among the seven lens elements, each of two lens elements has an Abbe number less than 20. In detail, the Abbe numbers of the fifth lens element 950 and the seventh lens element 970 are both less than 20.

In this embodiment, among the seven lens elements, each of four adjacent lens elements has an Abbe number less than 38. In detail, the Abbe numbers of the second lens element 920, the third lens element 930, the fourth lens element 940 and the fifth lens element 950 are all less than 38.

The detailed optical data of the 9th embodiment are shown in Table 17 and the aspheric surface data are shown in Table 18 below.

TABLE 17

9th embodiment
f = 5.90 mm, Fno = 2.00, HFOV = 21.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.797 | | | | |
| 2 | Lens 1 | 1.693 | (ASP) | 1.144 | Glass | 1.518 | 63.5 | 2.79 |
| 3 | | −7.597 | (ASP) | 0.208 | | | | |
| 4 | Lens 2 | −47.255 | (ASP) | 0.160 | Plastic | 1.614 | 26.0 | −4.40 |
| 5 | | 2.869 | (ASP) | 0.395 | | | | |
| 6 | Lens 3 | −16.484 | (ASP) | 0.335 | Plastic | 1.582 | 30.2 | −30.94 |
| 7 | | −194.932 | (ASP) | 0.305 | | | | |
| 8 | Lens 4 | −7.040 | (ASP) | 0.160 | Plastic | 1.639 | 23.5 | −99.10 |
| 9 | | −7.991 | (ASP) | 0.076 | | | | |
| 10 | Lens 5 | 52.892 | (ASP) | 0.267 | Plastic | 1.669 | 19.5 | 28.86 |
| 11 | | −30.341 | (ASP) | 1.198 | | | | |
| 12 | Lens 6 | ∞ | (ASP) | 0.231 | Plastic | 1.511 | 56.8 | −5.06 |
| 13 | | 2.584 | (ASP) | 0.209 | | | | |
| 14 | Lens 7 | −203.252 | (ASP) | 0.418 | Plastic | 1.669 | 19.5 | 29.55 |
| 15 | | −18.029 | (ASP) | 0.250 | | | | |
| 16 | Filter | Plano | | 0.210 | Glass | 1.517 | 64.2 | — |
| 17 | | Plano | | 0.085 | | | | |
| 18 | Image | Plano | | — | | | | |

Note:
Reference wavelength is 587.6 nm (d-line).
An effective radius of the image-side surface 952 (Surface 11) is 1.310 mm.

TABLE 18

Aspheric Coefficients

| Surface # | 2 | 3 | 4 | 5 | 6 |
|---|---|---|---|---|---|
| k = | −2.0655E−01 | −5.1216E+01 | 9.0000E+01 | −1.1923E+01 | 7.8783E+01 |
| A4 = | 9.0627E−04 | 6.0717E−03 | −1.2975E−01 | −1.0451E−01 | −2.5761E−02 |
| A6 = | 4.1231E−03 | 2.8119E−02 | 3.7254E−01 | 3.8708E−01 | 1.2940E−01 |
| A8 = | −3.8051E−03 | −3.2431E−02 | −4.1725E−01 | −3.3534E−01 | −3.9405E−03 |
| A10 = | 2.2990E−03 | 1.8361E−02 | 2.5679E−01 | 1.7516E−01 | −3.5480E−02 |
| A12 = | −4.6370E−04 | −5.7022E−03 | −8.5998E−02 | −3.1904E−02 | 1.8943E−02 |
| A14 = | — | 7.6152E−04 | 1.2420E−02 | — | 2.4793E−04 |

| Surface # | 7 | 8 | 9 | 10 | 11 |
|---|---|---|---|---|---|
| k = | −9.0000E+01 | 2.2947E+01 | −1.5029E+01 | 9.0000E+01 | 8.8132E+00 |
| A4 = | −2.6961E−02 | −2.8298E−02 | 3.9245E−02 | −4.8160E−02 | −7.2722E−02 |
| A6 = | 3.1710E−02 | −2.9460E−01 | −1.4466E−01 | 1.2037E−01 | 6.7858E−02 |
| A8 = | 4.5403E−02 | 5.3811E−01 | 3.5274E−01 | −4.2596E−02 | −4.3196E−02 |
| A10 = | −7.9923E−02 | −6.9435E−01 | −4.5334E−01 | −3.3463E−02 | 4.9167E−02 |
| A12 = | 3.4569E−02 | 4.8062E−01 | 2.9114E−01 | 2.9253E−02 | −3.1340E−02 |
| A14 = | −1.9680E−03 | −1.3178E−01 | −7.0313E−02 | −5.8908E−03 | 7.5795E−03 |

| Surface # | 12 | 13 | 14 | 15 |
|---|---|---|---|---|
| k = | −3.6735E+01 | −2.3425E+00 | −9.0000E+01 | −4.3069E+01 |
| A4 = | −1.4580E−01 | −1.6010E−01 | −1.6022E−01 | −2.1992E−01 |
| A6 = | −6.1088E−02 | 4.0189E−02 | 2.1321E−01 | 2.2302E−01 |
| A8 = | 1.6256E−01 | 1.6555E−01 | −1.7035E−01 | −1.2488E−01 |
| A10 = | −1.1708E−01 | −2.1999E−02 | 7.1405E−02 | 3.3137E−02 |
| A12 = | 4.0165E−02 | 9.0453E−03 | −1.5484E−02 | −2.6981E−03 |
| A14 = | −6.4712E−03 | −1.7797E−03 | 1.5851E−03 | −3.6230E−04 |
| A16 = | 3.8825E−04 | 1.4181E−04 | −5.4648E−05 | 5.6540E−05 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 5.90 | R5/f | −2.79 |
| Fno | 2.00 | R14/f | −3.06 |
| HFOV [deg.] | 21.0 | f/f1 | 2.11 |
| Vd1 | 63.5 | f/f2 | −1.34 |
| Vd2 | 26.0 | f/f3 | −0.19 |
| Vd3 | 30.2 | f/f4 | −0.06 |
| Vd4 | 23.5 | f/f5 | 0.20 |
| Vd5 | 19.5 | f/f6 | −1.17 |
| Vd6 | 56.8 | f/f7 | 0.20 |
| Vd7 | 19.5 | f/f12 | 1.23 |
| ΣVd | 238.9 | f/f34 | −0.25 |
| CT6/CT7 | 0.55 | f/|R9| + f/|R10| | 0.31 |
| SD/TD | 0.84 | f/R12 | 2.28 |
| T67/CT7 | 0.50 | |f|min/|f|max | 0.03 |
| TL [mm] | 5.65 | NVd32 | 5 |
| TL/EPD | 1.92 | NVd35 | 5 |
| TL/f | 0.96 | NVd38 | 5 |
| TL/ImgH | 2.46 | Sag42/CT4 | −0.23 |
| R1/f | 0.29 | Y11/Y72 | 0.73 |
| (R3 − R4)/(R3 + R4) | 1.13 | — | — |

10th Embodiment

Figure 19:
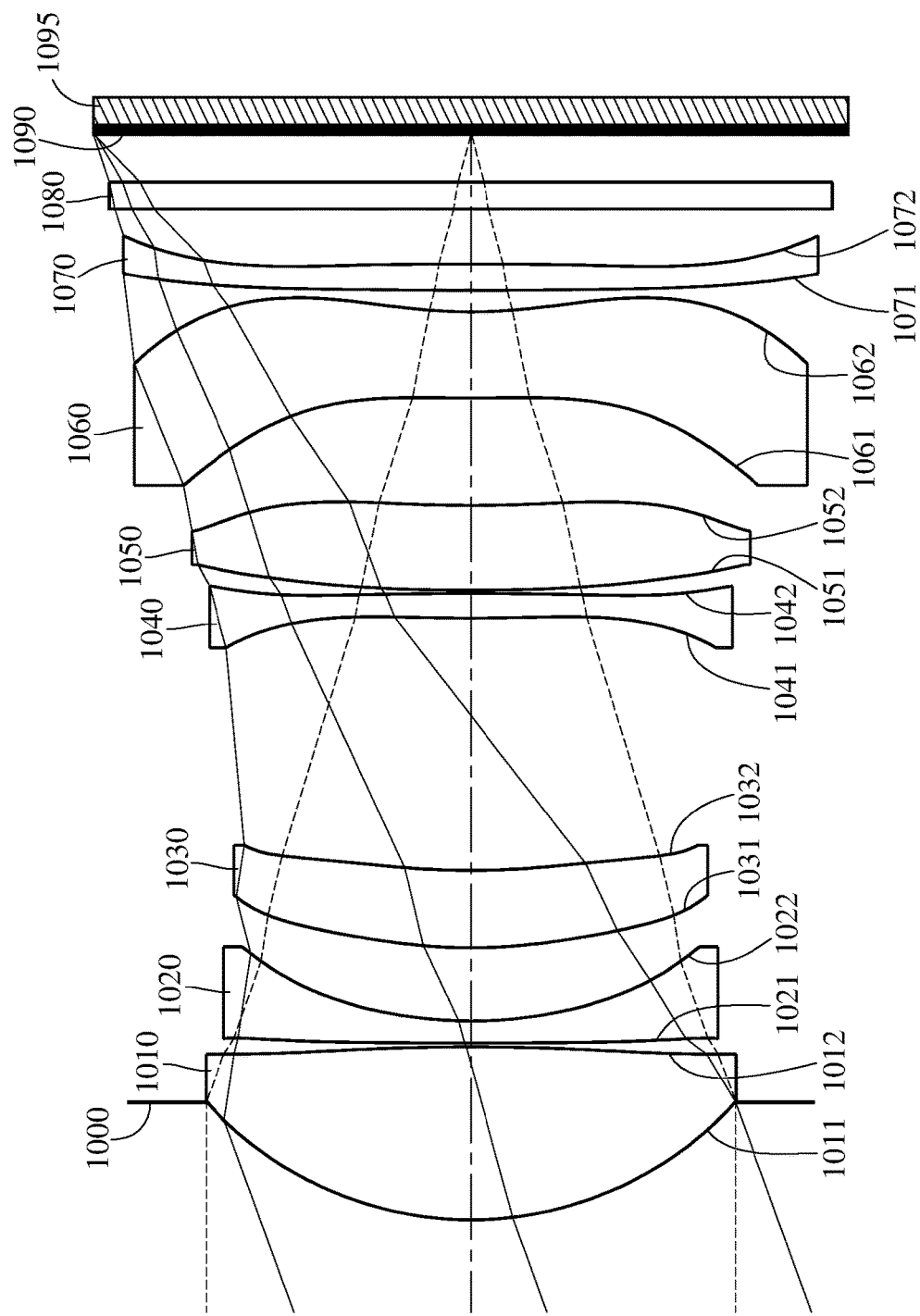
FIG. 19 is a schematic view of an image capturing unit according to the 10th embodiment of the present disclosure.
Figure 20:
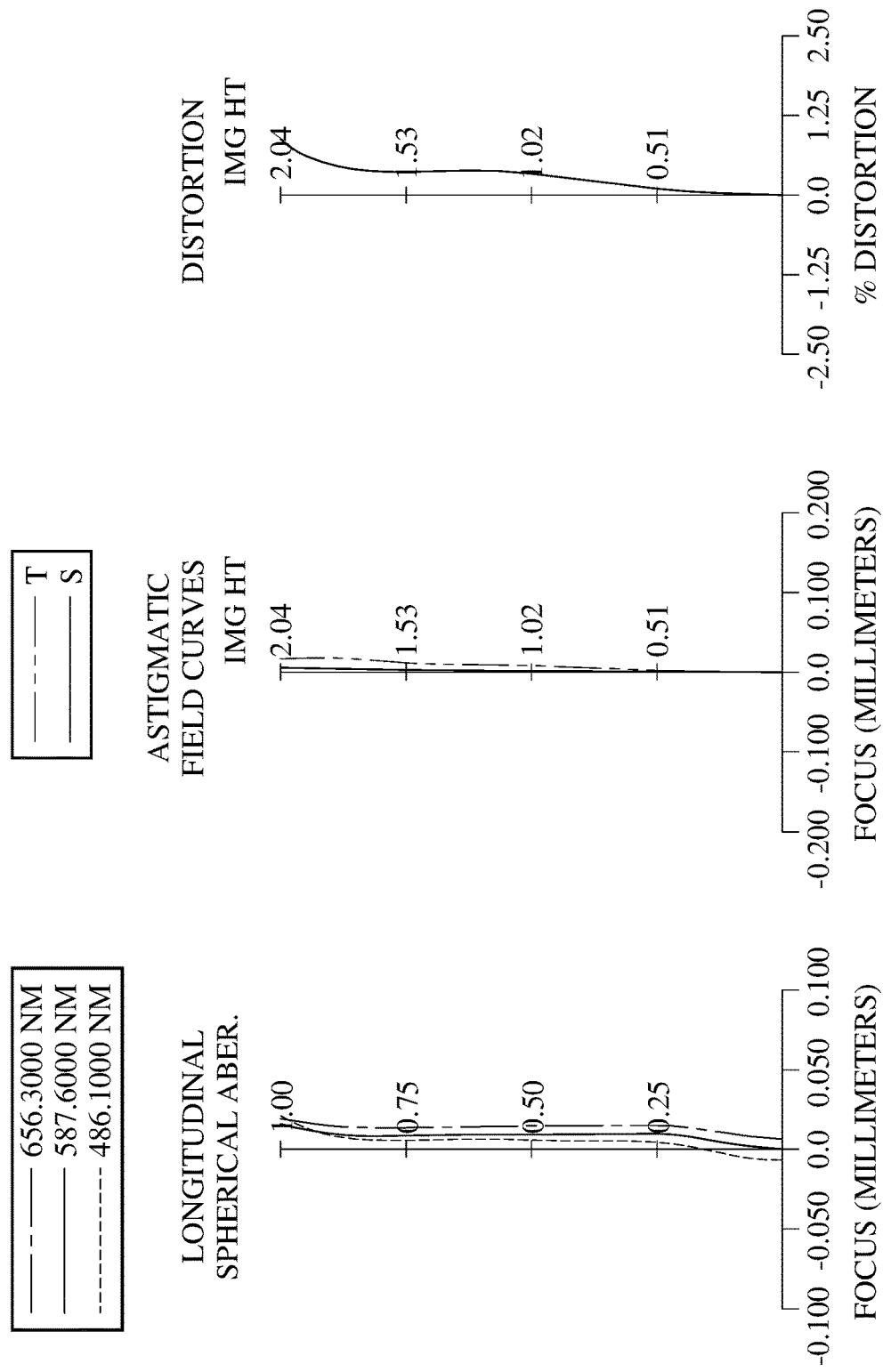
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the image system lens assembly (its reference numeral is omitted) of the present disclosure and an image sensor 1095. The image system lens assembly includes, in order from an object side to an image side, an aperture stop 1000, a first lens element 1010, a second lens element 1020, a third lens element 1030, a fourth lens element 1040, a fifth lens element 1050, a sixth lens element 1060, a seventh lens element 1070, a filter 1080 and an image surface 1090. The image system lens assembly includes seven lens elements (1010, 1020, 1030, 1040, 1050, 1060 and 1070) with no additional lens element disposed between each of the adjacent seven lens elements.

The first lens element 1010 with positive refractive power has an object-side surface 1011 being convex in a paraxial region thereof and an image-side surface 1012 being convex in a paraxial region thereof. The first lens element 1010 is made of plastic material and has the object-side surface 1011 and the image-side surface 1012 being both aspheric. The image-side surface 1012 of the first lens element 1010 has two inflection points.

The second lens element 1020 with negative refractive power has an object-side surface 1021 being convex in a paraxial region thereof and an image-side surface 1022 being concave in a paraxial region thereof. The second lens element 1020 is made of plastic material and has the object-side surface 1021 and the image-side surface 1022 being both aspheric. The object-side surface 1021 of the second lens element 1020 has one inflection point. The image-side surface 1022 of the second lens element 1020 has one inflection point. The object-side surface 1021 of the second lens element 1020 has one critical point in an off-axis region thereof.

The third lens element 1030 with positive refractive power has an object-side surface 1031 being convex in a paraxial region thereof and an image-side surface 1032 being concave in a paraxial region thereof. The third lens element 1030 is made of plastic material and has the object-side surface 1031 and the image-side surface 1032 being both aspheric. The image-side surface 1032 of the third lens element 1030 has two inflection points.

The fourth lens element 1040 with positive refractive power has an object-side surface 1041 being convex in a paraxial region thereof and an image-side surface 1042 being convex in a paraxial region thereof. The fourth lens element 1040 is made of plastic material and has the object-side surface 1041 and the image-side surface 1042 being both aspheric. The object-side surface 1041 of the fourth lens element 1040 has one inflection point. The image-side surface 1042 of the fourth lens element 1040 has two inflection points. The object-side surface 1041 of the fourth lens element 1040 has one critical point in an off-axis region thereof. The image-side surface 1042 of the fourth lens element 1040 has one critical point in an off-axis region thereof.

The fifth lens element 1050 with negative refractive power has an object-side surface 1051 being convex in a paraxial region thereof and an image-side surface 1052 being concave in a paraxial region thereof. The fifth lens element 1050 is made of plastic material and has the object-side surface 1051 and the image-side surface 1052 being both aspheric. The image-side surface 1052 of the fifth lens element 1050 has two inflection points. The image-side surface 1052 of the fifth lens element 1050 has one critical point in an off-axis region thereof.

The sixth lens element 1060 with negative refractive power has an object-side surface 1061 being convex in a paraxial region thereof and an image-side surface 1062 being concave in a paraxial region thereof. The sixth lens element 1060 is made of plastic material and has the object-side surface 1061 and the image-side surface 1062 being both aspheric. The object-side surface 1061 of the sixth lens element 1060 has one inflection point. The image-side surface 1062 of the sixth lens element 1060 has one inflection point. The object-side surface 1061 of the sixth lens element 1060 has one critical point in an off-axis region thereof. The image-side surface 1062 of the sixth lens element 1060 has one critical point in an off-axis region thereof.

The seventh lens element 1070 with positive refractive power has an object-side surface 1071 being convex in a paraxial region thereof and an image-side surface 1072 being convex in a paraxial region thereof. The seventh lens element 1070 is made of plastic material and has the object-side surface 1071 and the image-side surface 1072 being both aspheric. The image-side surface 1072 of the seventh lens element 1070 has one inflection point. The image-side surface 1072 of the seventh lens element 1070 has one critical point in an off-axis region thereof.

The filter 1080 is made of glass material and located between the seventh lens element 1070 and the image surface 1090, and will not affect the focal length of the image system lens assembly. The image sensor 1095 is disposed on or near the image surface 1090 of the image system lens assembly.

In this embodiment, among the seven lens elements, one lens element has an Abbe number less than 20. In detail, an Abbe number of the seventh lens element 1070 is less than 20.

In this embodiment, among the seven lens elements, each of six adjacent lens elements has an Abbe number less than 38. In detail, the Abbe numbers of the second lens element 1020, the third lens element 1030, the fourth lens element 1040, the fifth lens element 1050, the sixth lens element 1060 and the seventh lens element 1070 are all less than 38.

The detailed optical data of the 10th embodiment are shown in Table 19 and the aspheric surface data are shown in Table 20 below.

TABLE 19

10th embodiment
f = 5.55 mm, Fno = 1.93, HFOV = 20.0 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Ape. Stop | Plano |  | −0.638 |  |  |  |  |
| 2 | Lens 1 | 1.910 | (ASP) | 0.942 | Plastic | 1.545 | 56.0 | 3.15 |
| 3 |  | −13.930 | (ASP) | 0.020 |  |  |  |  |
| 4 | Lens 2 | 29.362 | (ASP) | 0.120 | Plastic | 1.614 | 26.0 | −4.16 |
| 5 |  | 2.347 | (ASP) | 0.398 |  |  |  |  |
| 6 | Lens 3 | 2.878 | (ASP) | 0.420 | Plastic | 1.582 | 30.2 | 15.41 |
| 7 |  | 4.009 | (ASP) | 1.372 |  |  |  |  |
| 8 | Lens 4 | 9.614 | (ASP) | 0.134 | Plastic | 1.584 | 28.2 | 11.57 |
| 9 |  | −22.682 | (ASP) | 0.017 |  |  |  |  |
| 10 | Lens 5 | 11.309 | (ASP) | 0.464 | Plastic | 1.614 | 26.0 | −22.11 |
| 11 |  | 6.072 | (ASP) | 0.583 |  |  |  |  |
| 12 | Lens 6 | 15.152 | (ASP) | 0.467 | Plastic | 1.582 | 30.2 | −5.16 |
| 13 |  | 2.481 | (ASP) | 0.118 |  |  |  |  |
| 14 | Lens 7 | 31.620 | (ASP) | 0.145 | Plastic | 1.669 | 19.5 | 35.23 |
| 15 |  | −92.259 | (ASP) | 0.300 |  |  |  |  |
| 16 | Filter | Plano |  | 0.145 | Glass | 1.517 | 64.2 | — |
| 17 |  | Plano |  | 0.258 |  |  |  |  |
| 18 | Image | Plano |  | — |  |  |  |  |

Note:
Reference wavelength is 587.6 nm (d-line).
An effective radius of the image-side surface 1032 (Surface 7) is 1.230 mm.

TABLE 20

Aspheric Coefficients

| Surface # | 2 | 3 | 4 | 5 | 6 |
|---|---|---|---|---|---|
| k = | −3.1013E−01 | 8.1962E+01 | 9.0000E+01 | −6.2037E+00 | −2.7056E+01 |
| A4 = | 2.1881E−03 | −1.6443E−02 | −4.1687E−02 | 3.6526E−02 | 7.2653E−02 |
| A6 = | 3.5610E−03 | 4.8906E−02 | 9.1543E−02 | 3.9555E−02 | −1.3816E−01 |
| A8 = | −5.1948E−03 | −3.5229E−02 | −8.4550E−02 | −2.9674E−02 | 1.7035E−01 |
| A10 = | 5.8231E−03 | 1.0993E−02 | 4.0337E−02 | 5.0454E−03 | −1.2203E−01 |
| A12 = | −3.0208E−03 | 5.2297E−04 | −8.2060E−03 | 1.1503E−02 | 5.4797E−02 |
| A14 = | 6.6089E−04 | −6.6536E−04 | −2.7827E−05 | −5.5157E−03 | −9.9734E−03 |

| Surface # | 7 | 8 | 9 | 10 | 11 |
|---|---|---|---|---|---|
| k = | −4.5778E+01 | −9.0000E+01 | 6.9967E+01 | 2.9185E+01 | −8.1172E+01 |
| A4 = | 1.2319E−02 | −7.9036E−02 | 4.3000E−03 | 7.2177E−03 | −4.9020E−02 |
| A6 = | −7.2921E−02 | −1.4750E−02 | 1.3545E−02 | 2.3074E−02 | −1.5699E−02 |
| A8 = | 8.1958E−02 | 2.0815E−02 | −6.4030E−03 | −3.3748E−02 | 1.4764E−02 |
| A10 = | −4.0077E−02 | −5.7094E−03 | 6.7760E−03 | 1.5334E−02 | −7.8240E−03 |
| A12 = | 7.9919E−03 | −2.0883E−04 | −2.3282E−03 | −2.2553E−03 | 1.9580E−03 |
| A14 = | 2.1191E−03 | — | — | — | — |

| Surface # | 12 | 13 | 14 | 15 |
|---|---|---|---|---|
| k = | 7.8857E+01 | −1.8865E+00 | 3.4255E+01 | −8.2360E+01 |
| A4 = | −2.0603E−01 | −1.6607E−01 | −1.3542E−02 | −3.8778E−02 |
| A6 = | 7.8691E−02 | 6.5637E−02 | 5.1778E−03 | 4.2051E−02 |
| A8 = | −2.2819E−02 | −2.2293E−02 | 1.0369E−02 | −8.5547E−03 |
| A10 = | 1.0142E−02 | 3.6860E−03 | −1.0762E−02 | −4.0461E−03 |
| A12 = | −7.8240E−03 | 4.5540E−05 | 4.3924E−03 | 2.7258E−03 |
| A14 = | 3.3180E−03 | −8.2339E−05 | −8.3901E−04 | −5.8890E−04 |
| A16 = | −5.0404E−04 | 5.1111E−06 | 6.1958E−05 | 4.5467E−05 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 5.55 | R5/f | 0.52 |
| Fno | 1.93 | R14/f | −16.64 |
| HFOV [deg.] | 20.0 | f/f1 | 1.76 |
| Vd1 | 56.0 | f/f2 | −1.33 |
| Vd2 | 26.0 | f/f3 | 0.36 |
| Vd3 | 30.2 | f/f4 | 0.48 |
| Vd4 | 28.2 | f/f5 | −0.25 |
| Vd5 | 26.0 | f/f6 | −1.07 |
| Vd6 | 30.2 | f/f7 | 0.16 |
| Vd7 | 19.5 | f/f12 | 0.70 |
| ΣVd | 216.1 | f/f34 | 0.77 |
| CT6/CT7 | 3.22 | f/|R9| + f/|R10| | 1.40 |
| SD/TD | 0.88 | f/R12 | 2.23 |
| T67/CT7 | 0.81 | |f|min/|f|max | 0.09 |
| TL [mm] | 5.90 | NVd32 | 6 |
| TL/EPD | 2.05 | NVd35 | 6 |
| TL/f | 1.06 | NVd38 | 6 |
| TL/ImgH | 2.89 | Sag42/CT4 | 0.29 |
| R1/f | 0.34 | Y11/Y72 | 0.76 |
| (R3 − R4)/(R3 + R4) | 0.85 | — | — |

11th Embodiment

Figure 21:
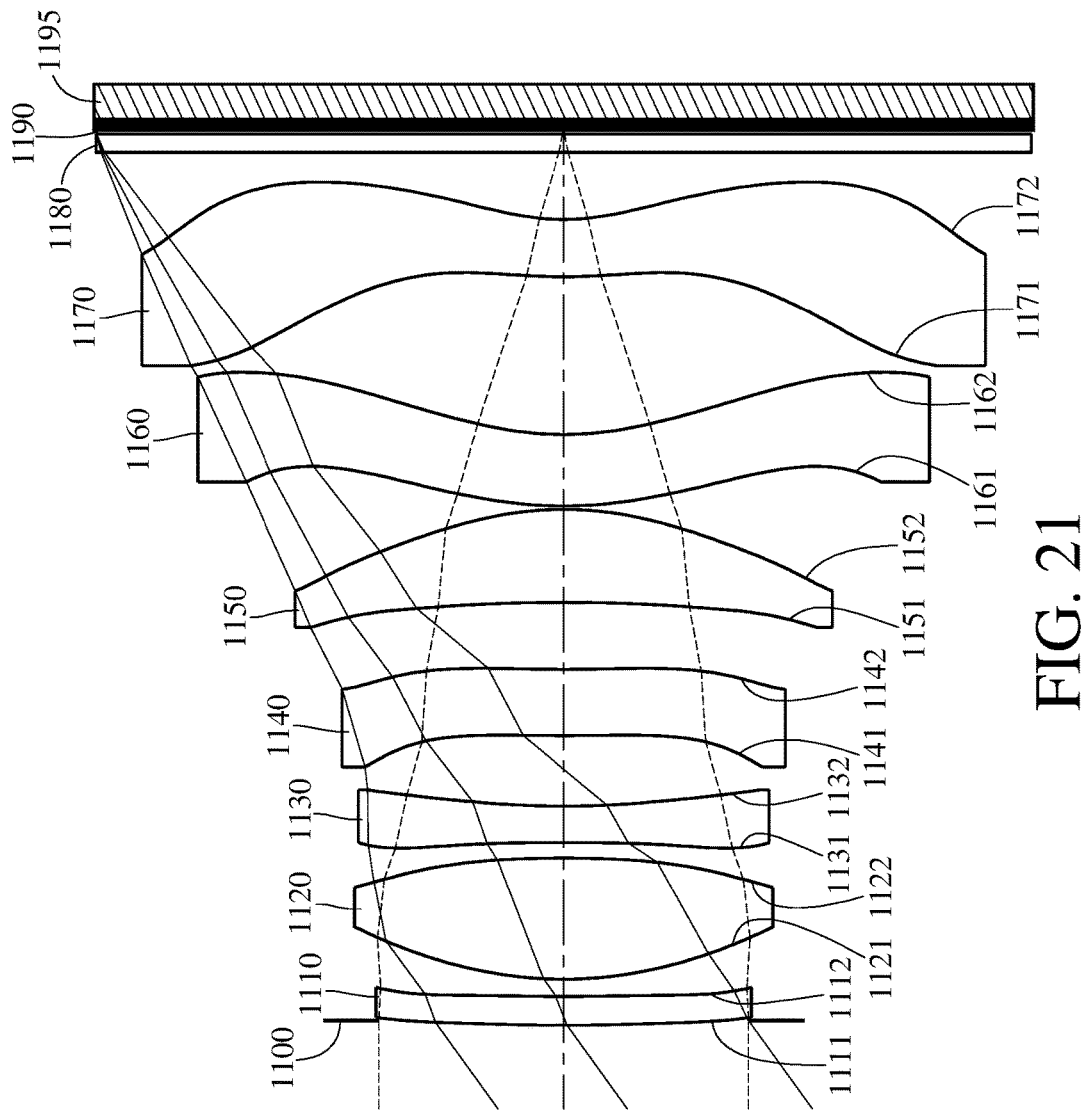
FIG. 21 is a schematic view of an image capturing unit according to the 11th embodiment of the present disclosure.
Figure 22:
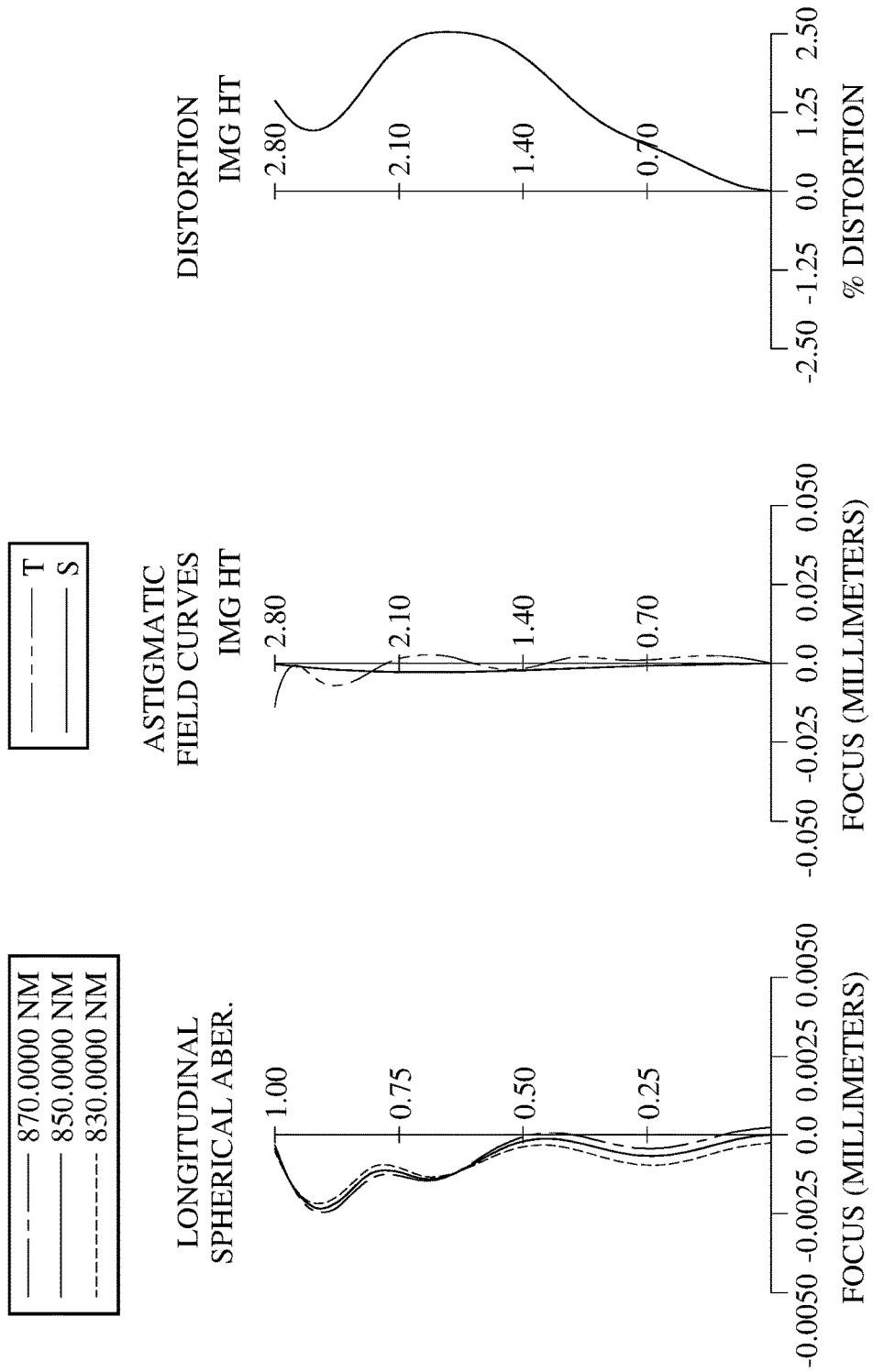
FIG. 22 shows spherical aberration curves, astigmatic field curves and a distortion curve of the image capturing unit according to the 11th embodiment.

FIG. 21 is a schematic view of an image capturing unit according to the 11th embodiment of the present disclosure. FIG. 22 shows, in order from left to right, spherical aberration curves, astigmatic field curves and a distortion curve of the image capturing unit according to the 11th embodiment. In FIG. 21, the image capturing unit includes the image system lens assembly (its reference numeral is omitted) of the present disclosure and an image sensor 1195. The image system lens assembly includes, in order from an object side to an image side, an aperture stop 1100, a first lens element 1110, a second lens element 1120, a third lens element 1130, a fourth lens element 1140, a fifth lens element 1150, a sixth lens element 1160, a seventh lens element 1170, a filter 1180 and an image surface 1190. The image system lens assembly includes seven lens elements (1110, 1120, 1130, 1140, 1150, 1160 and 1170) with no additional lens element disposed between each of the adjacent seven lens elements.

The first lens element 1110 with positive refractive power has an object-side surface 1111 being convex in a paraxial region thereof and an image-side surface 1112 being concave in a paraxial region thereof. The first lens element 1110 is made of plastic material and has the object-side surface 1111 and the image-side surface 1112 being both aspheric. The image-side surface 1112 of the first lens element 1110 has two inflection points.

The second lens element 1120 with positive refractive power has an object-side surface 1121 being convex in a paraxial region thereof and an image-side surface 1122 being convex in a paraxial region thereof. The second lens element 1120 is made of plastic material and has the object-side surface 1121 and the image-side surface 1122 being both aspheric. The image-side surface 1122 of the second lens element 1120 has two inflection points.

The third lens element 1130 with negative refractive power has an object-side surface 1131 being concave in a paraxial region thereof and an image-side surface 1132 being concave in a paraxial region thereof. The third lens element 1130 is made of plastic material and has the object-side surface 1131 and the image-side surface 1132 being both aspheric. The object-side surface 1131 of the third lens element 1130 has one inflection point. The object-side surface 1131 of the third lens element 1130 has one critical point in an off-axis region thereof.

The fourth lens element 1140 with negative refractive power has an object-side surface 1141 being convex in a paraxial region thereof and an image-side surface 1142 being concave in a paraxial region thereof. The fourth lens element 1140 is made of plastic material and has the object-side surface 1141 and the image-side surface 1142 being both aspheric. The object-side surface 1141 of the fourth lens element 1140 has one inflection point. The image-side surface 1142 of the fourth lens element 1140 has two inflection points. The object-side surface 1141 of the fourth lens element 1140 has one critical point in an off-axis region thereof. The image-side surface 1142 of the fourth lens element 1140 has one critical point in an off-axis region thereof.

The fifth lens element 1150 with positive refractive power has an object-side surface 1151 being concave in a paraxial region thereof and an image-side surface 1152 being convex in a paraxial region thereof. The fifth lens element 1150 is made of plastic material and has the object-side surface 1151 and the image-side surface 1152 being both aspheric. The object-side surface 1151 of the fifth lens element 1150 has one inflection point. The image-side surface 1152 of the fifth lens element 1150 has one inflection point.

The sixth lens element 1160 with negative refractive power has an object-side surface 1161 being convex in a paraxial region thereof and an image-side surface 1162 being concave in a paraxial region thereof. The sixth lens element 1160 is made of plastic material and has the object-side surface 1161 and the image-side surface 1162 being both aspheric. The object-side surface 1161 of the sixth lens element 1160 has one inflection point. The image-side surface 1162 of the sixth lens element 1160 has one inflection point. The object-side surface 1161 of the sixth lens element 1160 has one critical point in an off-axis region thereof. The image-side surface 1162 of the sixth lens element 1160 has one critical point in an off-axis region thereof.

The seventh lens element 1170 with negative refractive power has an object-side surface 1171 being convex in a paraxial region thereof and an image-side surface 1172 being concave in a paraxial region thereof. The seventh lens element 1170 is made of plastic material and has the object-side surface 1171 and the image-side surface 1172 being both aspheric. The object-side surface 1171 of the seventh lens element 1170 has three inflection points. The image-side surface 1172 of the seventh lens element 1170 has two inflection points. The object-side surface 1171 of the seventh lens element 1170 has one critical point in an off-axis region thereof. The image-side surface 1172 of the seventh lens element 1170 has one critical point in an off-axis region thereof.

The filter 1180 is made of glass material and located between the seventh lens element 1170 and the image surface 1190, and will not affect the focal length of the image system lens assembly. The image sensor 1195 is disposed on or near the image surface 1190 of the image system lens assembly.

In this embodiment, among the seven lens elements, each of three lens elements has an Abbe number less than 20. In detail, the Abbe numbers of the third lens element 1130, the fourth lens element 1140 and the sixth lens element 1160 are all less than 20.

The detailed optical data of the 11th embodiment are shown in Table 21 and the aspheric surface data are shown in Table 22 below.

TABLE 21

11th embodiment
f = 3.84 mm, Fno = 1.74, HFOV = 35.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.028 | | | | |
| 2 | Lens 1 | 10.773 | (ASP) | 0.172 | Plastic | 1.619 | 23.5 | 90.81 |
| 3 | | 13.245 | (ASP) | 0.102 | | | | |
| 4 | Lens 2 | 2.310 | (ASP) | 0.727 | Plastic | 1.536 | 56.0 | 3.38 |
| 5 | | −7.537 | (ASP) | 0.093 | | | | |
| 6 | Lens 3 | −18.972 | (ASP) | 0.217 | Plastic | 1.645 | 19.5 | −6.15 |
| 7 | | 5.039 | (ASP) | 0.421 | | | | |
| 8 | Lens 4 | 13.808 | (ASP) | 0.396 | Plastic | 1.645 | 19.5 | −63.95 |
| 9 | | 10.228 | (ASP) | 0.399 | | | | |
| 10 | Lens 5 | −11.363 | (ASP) | 0.559 | Plastic | 1.536 | 56.0 | 4.49 |
| 11 | | −2.022 | (ASP) | 0.020 | | | | |
| 12 | Lens 6 | 2.462 | (ASP) | 0.426 | Plastic | 1.645 | 19.5 | −17.35 |
| 13 | | 1.881 | (ASP) | 0.945 | | | | |
| 14 | Lens 7 | 3.152 | (ASP) | 0.343 | Plastic | 1.567 | 30.2 | −4.53 |
| 15 | | 1.361 | (ASP) | 0.400 | | | | |
| 16 | Filter | Plano | | 0.110 | Glass | 1.510 | 64.2 | — |
| 17 | | Plano | | 0.020 | | | | |
| 18 | Image | Plano | | — | | | | |

Note:
Reference wavelength is 850.0 nm.
An effective radius of the image-side surface 1132 (Surface 7) is 1.170 mm.

TABLE 22

Aspheric Coefficients

| Surface # | 2 | 3 | 4 | 5 | 6 |
|---|---|---|---|---|---|
| k = | −9.0000E+01 | 2.4780E+01 | −3.9310E−01 | −1.0000E+00 | −7.6089E+01 |
| A4 = | −4.3476E−02 | −9.6334E−02 | −5.8074E−02 | −4.2722E−02 | −4.8582E−02 |
| A6 = | 3.2514E−02 | 1.3802E−01 | 9.4171E−02 | −3.6418E−02 | 3.5629E−02 |
| A8 = | 1.8044E−02 | −8.2906E−02 | −9.0646E−02 | 6.9053E−02 | −1.0936E−02 |
| A10 = | −2.3518E−02 | 4.0058E−02 | 4.1808E−02 | −4.9220E−02 | 3.1687E−02 |
| A12 = | 1.2135E−02 | −7.4787E−03 | −7.3805E−03 | 2.1758E−02 | −1.9746E−02 |
| A14 = | −3.1341E−03 | −1.2239E−03 | — | −4.3843E−03 | 3.8000E−03 |

| Surface # | 7 | 8 | 9 | 10 | 11 |
|---|---|---|---|---|---|
| k = | −6.6831E+01 | 1.0832E+01 | −3.1830E+01 | 1.0801E+01 | −1.1808E+00 |
| A4 = | 9.0039E−03 | −1.3527E−01 | −1.1683E−01 | −2.0664E−02 | 1.9062E−02 |
| A6 = | 3.4348E−03 | 5.1732E−02 | 6.1926E−02 | 3.6897E−02 | 2.1988E−02 |
| A8 = | −2.6602E−02 | −8.8109E−02 | −5.2373E−02 | −1.8098E−02 | −2.4093E−02 |
| A10 = | 3.6923E−02 | 8.5054E−02 | 2.2336E−02 | −1.3480E−03 | 1.9126E−02 |
| A12 = | −2.2295E−02 | −6.9986E−02 | −2.3465E−03 | 1.4198E−03 | −1.1273E−02 |
| A14 = | 5.2648E−03 | 3.9570E−02 | 2.4678E−04 | — | 3.2006E−03 |
| A16 = | — | −8.4269E−03 | 1.2889E−04 | — | −3.0622E−04 |

| Surface # | 12 | 13 | 14 | 15 |
|---|---|---|---|---|
| k = | −1.2014E−01 | −1.0208E+00 | −1.8692E+00 | −1.1735E+00 |
| A4 = | −6.9035E−02 | −1.0752E−01 | −2.9222E−01 | −2.9991E−01 |
| A6 = | 3.2335E−02 | 6.5865E−02 | 1.6105E−01 | 1.8270E−01 |
| A8 = | −2.3157E−02 | −3.7530E−02 | −6.1555E−02 | −7.5160E−02 |
| A10 = | 8.2877E−03 | 1.3324E−02 | 1.6046E−02 | 1.9621E−02 |
| A12 = | −1.5846E−03 | −2.7962E−03 | −2.5995E−03 | −3.1289E−03 |
| A14 = | 1.2663E−04 | 3.2090E−04 | 2.3901E−04 | 2.7456E−04 |
| A16 = | — | −1.5607E−05 | −9.7520E−06 | −1.0025E−05 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 3.84 | R5/f | −4.94 |
| Fno | 1.74 | R14/f | 0.35 |
| HFOV [deg.] | 35.7 | f/f1 | 0.04 |
| Vd1 | 23.5 | f/f2 | 1.13 |
| Vd2 | 56.0 | f/f3 | −0.62 |
| Vd3 | 19.5 | f/f4 | −0.06 |
| Vd4 | 19.5 | f/f5 | 0.86 |
| Vd5 | 56.0 | f/f6 | −0.22 |
| Vd6 | 19.5 | f/f7 | −0.85 |
| Vd7 | 30.2 | f/f12 | 1.17 |
| ΣVd | 224.1 | f/f34 | −0.70 |
| CT6/CT7 | 1.24 | f/|R9| + f/|R10| | 2.24 |
| SD/TD | 0.99 | f/R12 | 2.04 |
| T67/CT7 | 2.76 | |f|min/|f|max | 0.04 |
| TL [mm] | 5.35 | NVd32 | 5 |
| TL/EPD | 2.42 | NVd35 | 5 |
| TL/f | 1.39 | NVd38 | 5 |
| TL/ImgH | 1.91 | Sag42/CT4 | −0.30 |
| R1/f | 2.81 | Y11/Y72 | 0.44 |
| (R3 − R4)/(R3 + R4) | −1.88 | — | — |

12th Embodiment

Figure 23:
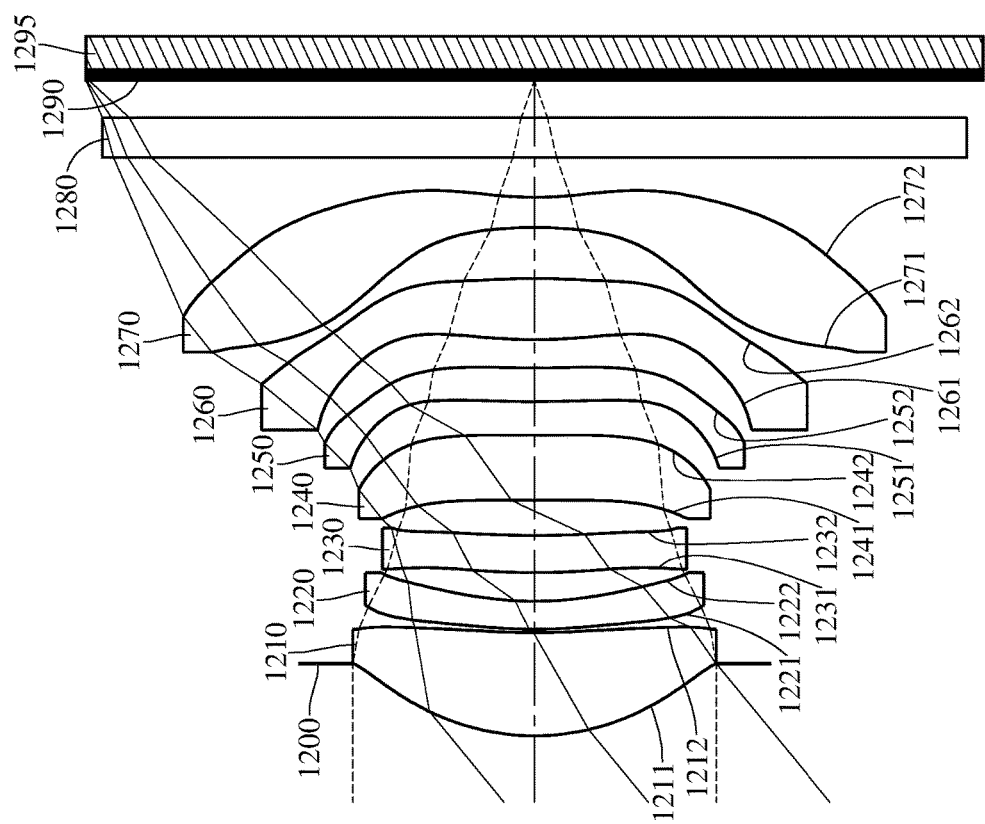
FIG. 23 is a schematic view of an image capturing unit according to the 12th embodiment of the present disclosure.
Figure 24:
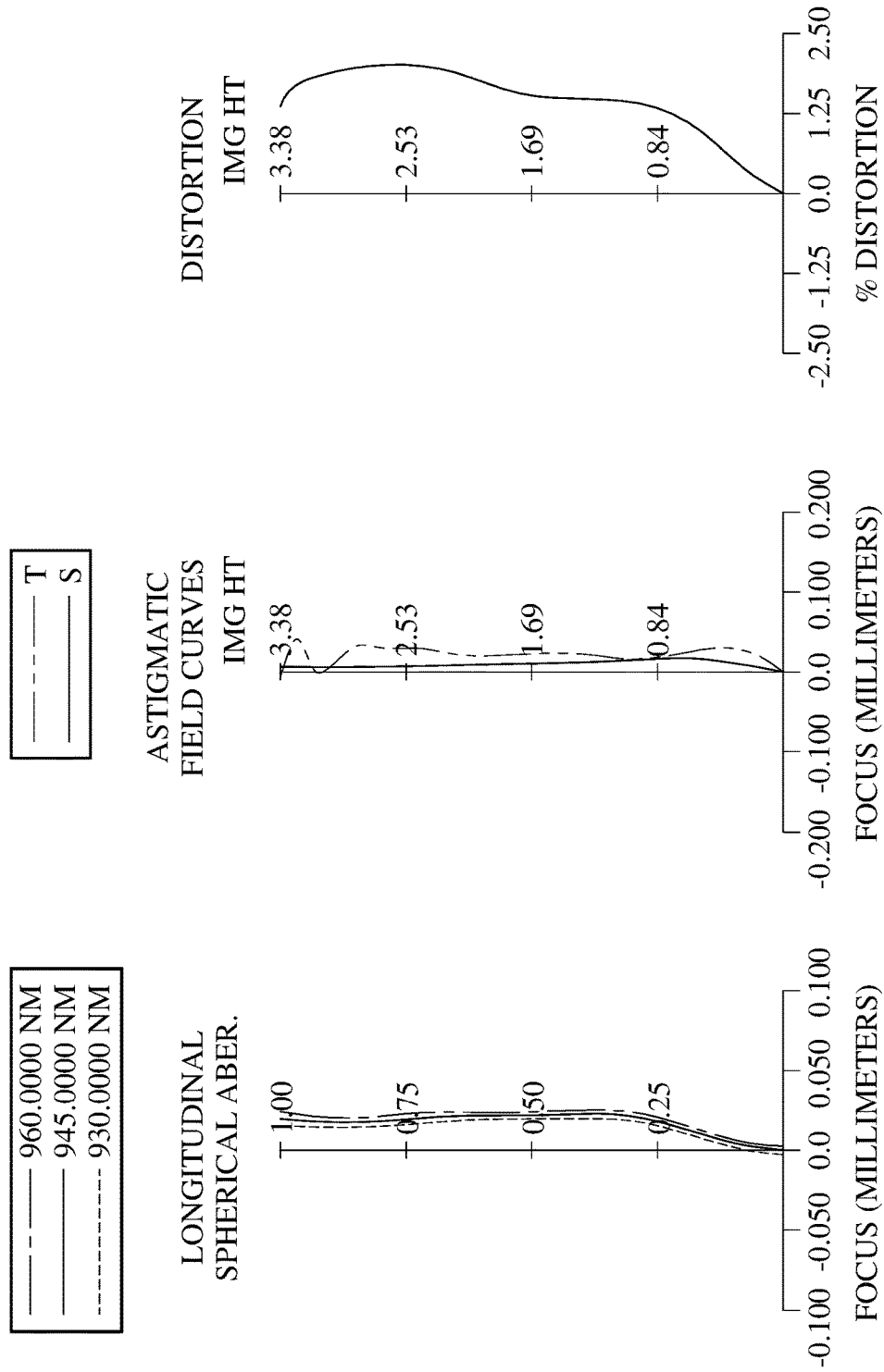
FIG. 24 shows spherical aberration curves, astigmatic field curves and a distortion curve of the image capturing unit according to the 12th embodiment.

FIG. 23 is a schematic view of an image capturing unit according to the 12th embodiment of the present disclosure. FIG. 24 shows, in order from left to right, spherical aberration curves, astigmatic field curves and a distortion curve of the image capturing unit according to the 12th embodiment. In FIG. 23, the image capturing unit includes the image system lens assembly (its reference numeral is omitted) of the present disclosure and an image sensor 1295. The image system lens assembly includes, in order from an object side to an image side, an aperture stop 1200, a first lens element 1210, a second lens element 1220, a third lens element 1230, a fourth lens element 1240, a fifth lens element 1250, a sixth lens element 1260, a seventh lens element 1270, a filter 1280 and an image surface 1290. The image system lens assembly includes seven lens elements (1210, 1220, 1230, 1240, 1250, 1260 and 1270) with no additional lens element disposed between each of the adjacent seven lens elements.

The first lens element 1210 with positive refractive power has an object-side surface 1211 being convex in a paraxial region thereof and an image-side surface 1212 being concave in a paraxial region thereof. The first lens element 1210 is made of plastic material and has the object-side surface 1211 and the image-side surface 1212 being both aspheric. The object-side surface 1211 of the first lens element 1210 has one inflection point. The image-side surface 1212 of the first lens element 1210 has one inflection point. The image-side surface 1212 of the first lens element 1210 has one critical point in an off-axis region thereof.

The second lens element 1220 with negative refractive power has an object-side surface 1221 being convex in a paraxial region thereof and an image-side surface 1222 being concave in a paraxial region thereof. The second lens element 1220 is made of plastic material and has the object-side surface 1221 and the image-side surface 1222 being both aspheric.

The third lens element 1230 with positive refractive power has an object-side surface 1231 being convex in a paraxial region thereof and an image-side surface 1232 being concave in a paraxial region thereof. The third lens element 1230 is made of plastic material and has the object-side surface 1231 and the image-side surface 1232 being both aspheric. The object-side surface 1231 of the third lens element 1230 has two inflection points. The image-side surface 1232 of the third lens element 1230 has two inflection points. The object-side surface 1231 of the third lens element 1230 has two critical points in an off-axis region thereof.

The fourth lens element 1240 with negative refractive power has an object-side surface 1241 being convex in a paraxial region thereof and an image-side surface 1242 being concave in a paraxial region thereof. The fourth lens element 1240 is made of plastic material and has the object-side surface 1241 and the image-side surface 1242 being both aspheric. The object-side surface 1241 of the fourth lens element 1240 has two inflection points. The image-side surface 1242 of the fourth lens element 1240 has one inflection point. The object-side surface 1241 of the fourth lens element 1240 has one critical point in an off-axis region thereof. The image-side surface 1242 of the fourth lens element 1240 has one critical point in an off-axis region thereof.

The fifth lens element 1250 with positive refractive power has an object-side surface 1251 being convex in a paraxial region thereof and an image-side surface 1252 being concave in a paraxial region thereof. The fifth lens element 1250 is made of plastic material and has the object-side surface 1251 and the image-side surface 1252 being both aspheric. The object-side surface 1251 of the fifth lens element 1250 has one inflection point. The image-side surface 1252 of the fifth lens element 1250 has three inflection points. The object-side surface 1251 of the fifth lens element 1250 has one critical point in an off-axis region thereof. The image-side surface 1252 of the fifth lens element 1250 has one critical point in an off-axis region thereof.

The sixth lens element 1260 with positive refractive power has an object-side surface 1261 being convex in a paraxial region thereof and an image-side surface 1262 being convex in a paraxial region thereof. The sixth lens element 1260 is made of plastic material and has the object-side surface 1261 and the image-side surface 1262 being both aspheric. The object-side surface 1261 of the sixth lens element 1260 has one inflection point. The image-side surface 1262 of the sixth lens element 1260 has six inflection points. The object-side surface 1261 of the sixth lens element 1260 has one critical point in an off-axis region thereof.

The seventh lens element 1270 with negative refractive power has an object-side surface 1271 being concave in a paraxial region thereof and an image-side surface 1272 being concave in a paraxial region thereof. The seventh lens element 1270 is made of plastic material and has the object-side surface 1271 and the image-side surface 1272 being both aspheric. The object-side surface 1271 of the seventh lens element 1270 has two inflection points. The image-side surface 1272 of the seventh lens element 1270 has one inflection point. The image-side surface 1272 of the seventh lens element 1270 has one critical point in an off-axis region thereof.

The filter 1280 is made of glass material and located between the seventh lens element 1270 and the image surface 1290, and will not affect the focal length of the image system lens assembly. The image sensor 1295 is disposed on or near the image surface 1290 of the image system lens assembly.

In this embodiment, among the seven lens elements, each of four lens elements has an Abbe number less than 20. In detail, the Abbe numbers of the second lens element 1220, the third lens element 1230, the fifth lens element 1250 and the sixth lens element 1260 are all less than 20.

In this embodiment, each of the seven lens elements of the image system lens assembly has an Abbe number less than 38.

The detailed optical data of the 12th embodiment are shown in Table 23 and the aspheric surface data are shown in Table 24 below.

TABLE 23

12th embodiment
f = 4.03 mm, Fno = 1.47, HFOV = 39.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.543 | | | | |
| 2 | Lens 1 | 1.802 | (ASP) | 0.778 | Plastic | 1.565 | 30.2 | 4.47 |
| 3 | | 5.330 | (ASP) | 0.026 | | | | |
| 4 | Lens 2 | 3.724 | (ASP) | 0.211 | Plastic | 1.643 | 19.3 | −17.89 |
| 5 | | 2.750 | (ASP) | 0.216 | | | | |
| 6 | Lens 3 | 5.760 | (ASP) | 0.285 | Plastic | 1.643 | 19.3 | 30.27 |
| 7 | | 8.023 | (ASP) | 0.265 | | | | |
| 8 | Lens 4 | 55.498 | (ASP) | 0.490 | Plastic | 1.565 | 30.2 | −162.81 |
| 9 | | 34.495 | (ASP) | 0.253 | | | | |
| 10 | Lens 5 | 6.691 | (ASP) | 0.256 | Plastic | 1.643 | 19.3 | 39.88 |
| 11 | | 8.918 | (ASP) | 0.213 | | | | |
| 12 | Lens 6 | 4.937 | (ASP) | 0.460 | Plastic | 1.643 | 19.3 | 3.57 |
| 13 | | −4.133 | (ASP) | 0.390 | | | | |
| 14 | Lens 7 | −3.165 | (ASP) | 0.227 | Plastic | 1.616 | 23.5 | −2.29 |
| 15 | | 2.617 | (ASP) | 0.300 | | | | |
| 16 | Filter | Plano | | 0.300 | Glass | 1.508 | 64.2 | — |
| 17 | | Plano | | 0.281 | | | | |
| 18 | Image | Plano | | — | | | | |

Note:
Reference wavelength is 945.0 nm.
An effective radius of the image-side surface 1232 (Surface 7) is 1.080 mm.

TABLE 24

Aspheric Coefficients

| Surface # | 2 | 3 | 4 | 5 | 6 |
|---|---|---|---|---|---|
| k = | −3.7153E−01 | 1.1197E+01 | 4.1482E−01 | 3.6442E−01 | −3.2900E+01 |
| A4 = | 2.0786E−03 | −1.2073E−01 | −1.1958E−01 | −1.2722E−02 | 1.0144E−02 |
| A6 = | 1.2547E−02 | 9.0657E−02 | 6.1992E−02 | −7.7384E−02 | −7.4602E−02 |
| A8 = | −1.9681E−02 | −3.8142E−02 | 2.9713E−02 | 1.3358E−02 | 4.7142E−02 |
| A10 = | 1.5743E−02 | −6.4085E−03 | −5.5035E−02 | −1.2592E−01 | −4.3060E−02 |
| A12 = | −6.4771E−03 | 1.0669E−02 | 3.1801E−02 | 4.7586E−02 | −3.1865E−02 |
| A14 = | 4.7303E−04 | −2.9733E−03 | −5.5790E−03 | — | 8.2042E−02 |
| A16 = | — | — | — | — | −3.1227E−02 |

| Surface # | 7 | 8 | 9 | 10 | 11 |
|---|---|---|---|---|---|
| k = | −1.0901E+01 | −9.9000E+01 | 9.0000E+01 | 3.0086E+00 | −3.4626E+01 |
| A4 = | −2.1410E−02 | −7.6493E−02 | −1.1174E−01 | −1.5859E−01 | −1.2572E−01 |
| A6 = | 4.7601E−03 | 2.2964E−02 | 8.6164E−02 | 1.5162E−01 | −2.1019E−01 |
| A8 = | −1.0353E−01 | −9.1881E−02 | −1.9607E−01 | −1.4574E−01 | 6.1541E−01 |
| A10 = | 2.3485E−01 | 9.7758E−02 | 1.7758E−01 | 8.3808E−02 | −7.1763E−01 |
| A12 = | −2.9485E−01 | −5.0742E−02 | −9.4195E−02 | −1.1894E−01 | 4.0447E−01 |
| A14 = | 2.1705E−01 | 1.2569E−02 | 3.1289E−02 | 8.9652E−02 | −1.0790E−01 |
| A16 = | −5.9300E−02 | — | −5.6110E−03 | −2.1607E−02 | 1.0837E−02 |

| Surface # | 12 | 13 | 14 | 15 |
|---|---|---|---|---|
| k = | −3.1334E+01 | −4.6884E+00 | −9.7093E−01 | −1.4472E+01 |
| A4 = | 1.4474E−01 | 3.5858E−01 | 1.5623E−02 | −1.1419E−01 |
| A6 = | −4.9976E−01 | −7.1477E−01 | −3.3173E−01 | −3.3134E−02 |
| A8 = | 4.0281E−01 | 6.7386E−01 | 3.0171E−01 | 8.1420E−02 |
| A10 = | 5.0031E−03 | −4.4227E−01 | −1.1988E−01 | −4.8803E−02 |
| A12 = | −3.1579E−01 | 2.0374E−01 | 2.5354E−02 | 1.5854E−02 |
| A14 = | 2.9644E−01 | −6.1095E−02 | −2.7809E−03 | −3.1317E−03 |
| A16 = | −1.3222E−01 | 1.1078E−02 | 1.0532E−04 | 3.7530E−04 |
| A18 = | 3.0107E−02 | −1.0926E−03 | 6.0632E−06 | −2.5026E−05 |
| A20 = | −2.8231E−03 | 4.4748E−05 | −4.9950E−07 | 7.0974E−07 |

In the 12th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 12th embodiment, so an explanation in this regard will not be provided again.

Moreover, these parameters can be calculated from Table 23 and Table 24 as the following values and satisfy the following conditions:

| 12th Embodiment | | | |
|---|---|---|---|
| f [mm] | 4.03 | R5/f | 1.43 |
| Fno | 1.47 | R14/f | 0.65 |
| HFOV [deg.] | 39.5 | f/f1 | 0.90 |
| Vd1 | 30.2 | f/f2 | −0.23 |
| Vd2 | 19.3 | f/f3 | 0.13 |
| Vd3 | 19.3 | f/f4 | −0.02 |
| Vd4 | 30.2 | f/f5 | 0.10 |
| Vd5 | 19.3 | f/f6 | 1.13 |
| Vd6 | 19.3 | f/f7 | −1.76 |
| Vd7 | 23.5 | f/f12 | 0.74 |
| ΣVd | 161.2 | f/f34 | 0.11 |
| CT6/CT7 | 2.03 | f/|R9| + f/|R10| | 1.05 |
| SD/TD | 0.87 | f/R12 | −0.97 |
| T67/CT7 | 1.72 | |f|min/|f|max | 0.01 |
| TL [mm] | 4.95 | NVd32 | 7 |
| TL/EPD | 1.81 | NVd35 | 7 |
| TL/f | 1.23 | NVd38 | 7 |
| TL/ImgH | 1.47 | Sag42/CT4 | −0.84 |
| R1/f | 0.45 | Y11/Y72 | 0.52 |
| (R3 − R4)/(R3 + R4) | 0.15 | — | — |

13th Embodiment

Figure 25:
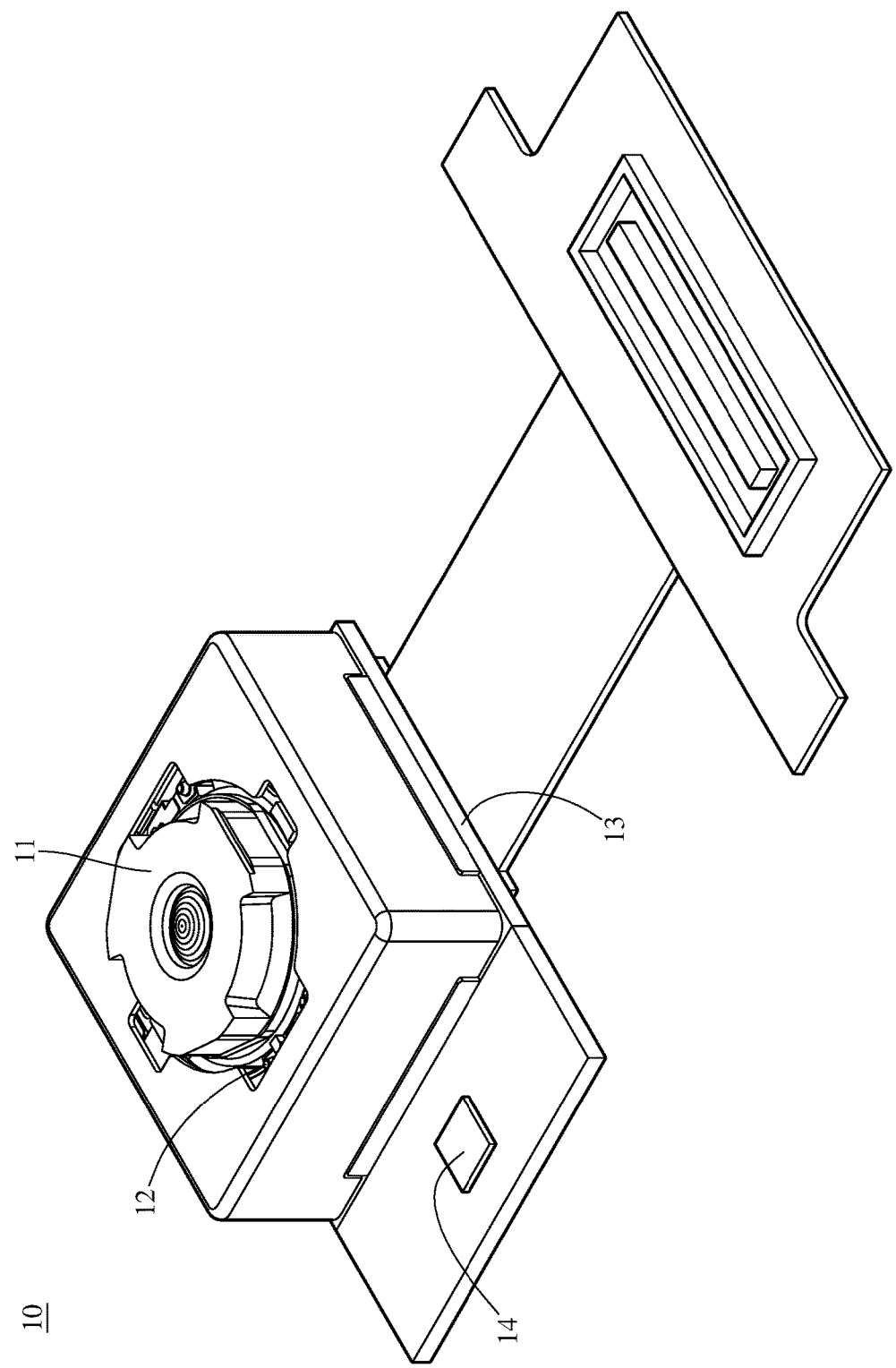
FIG. 25 is a perspective view of an image capturing unit according to the 13th embodiment of the present disclosure.

FIG. 25 is a perspective view of an image capturing unit according to the 13th embodiment of the present disclosure. In this embodiment, an image capturing unit 10 is a camera module including a lens unit 11, a driving device 12, an image sensor 13 and an image stabilizer 14. The lens unit 11 includes the image system lens assembly disclosed in the 1st embodiment, a barrel and a holder member (their reference numerals are omitted) for holding the image system lens assembly. The imaging light converges into the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the image system lens assembly to provide higher image quality.

The image stabilizer 14, such as an accelerometer, a gyroscope and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving the image quality while in motion or low-light conditions.

14th Embodiment

Figure 26:
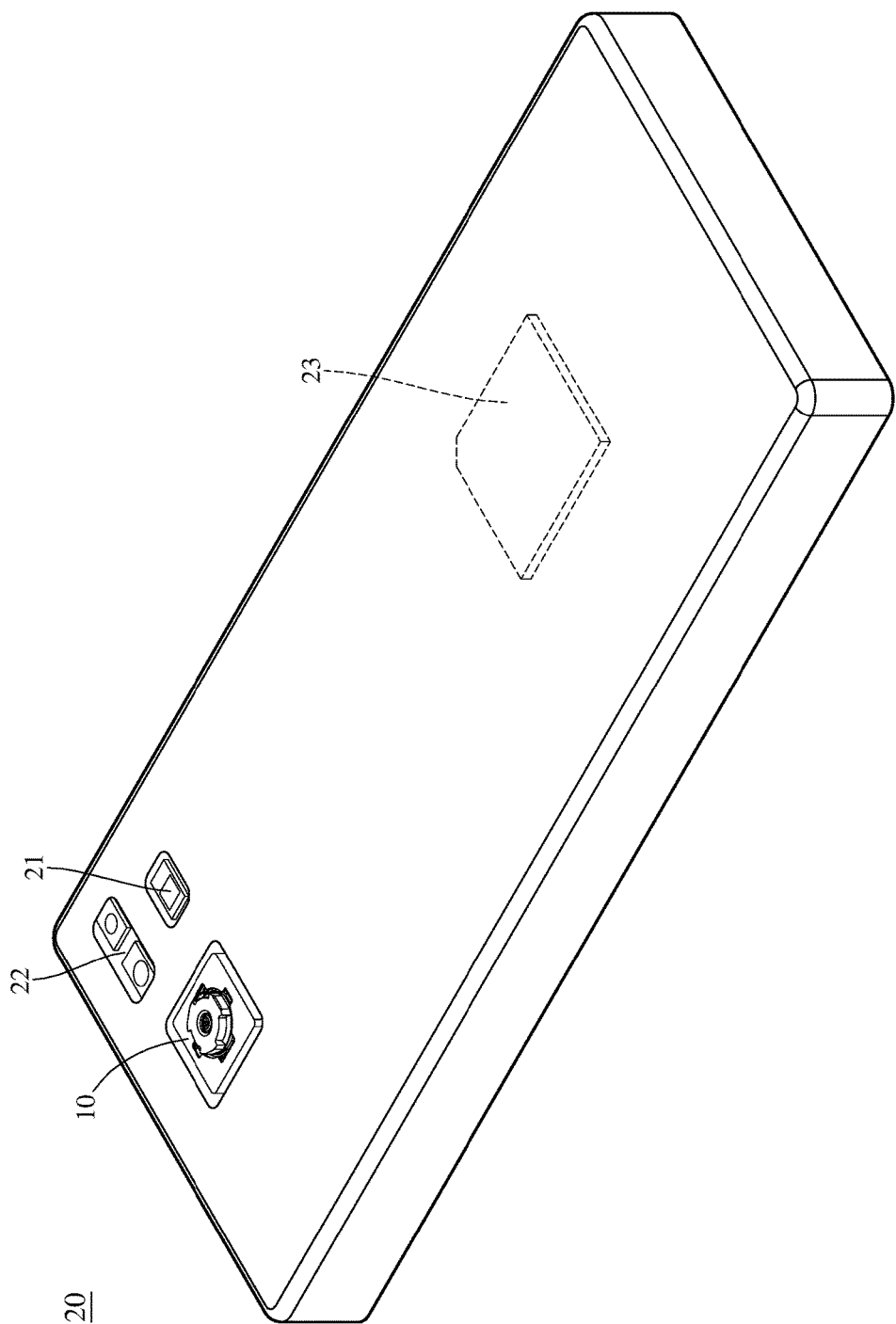
FIG. 26 is one perspective view of an electronic device according to the 14th embodiment of the present disclosure.
Figure 27:
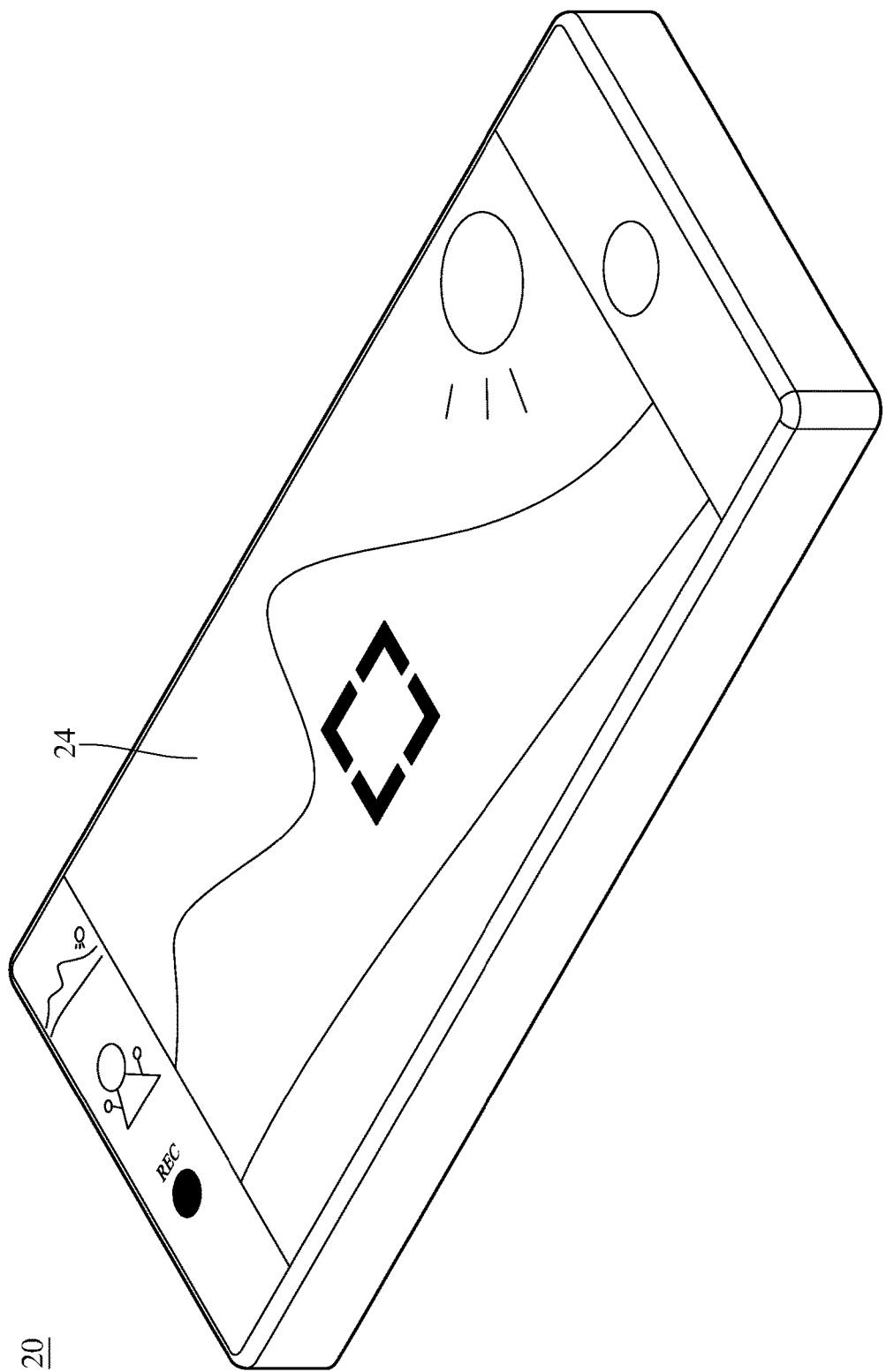
FIG. 27 is another perspective view of the electronic device in FIG. 26.
Figure 28:
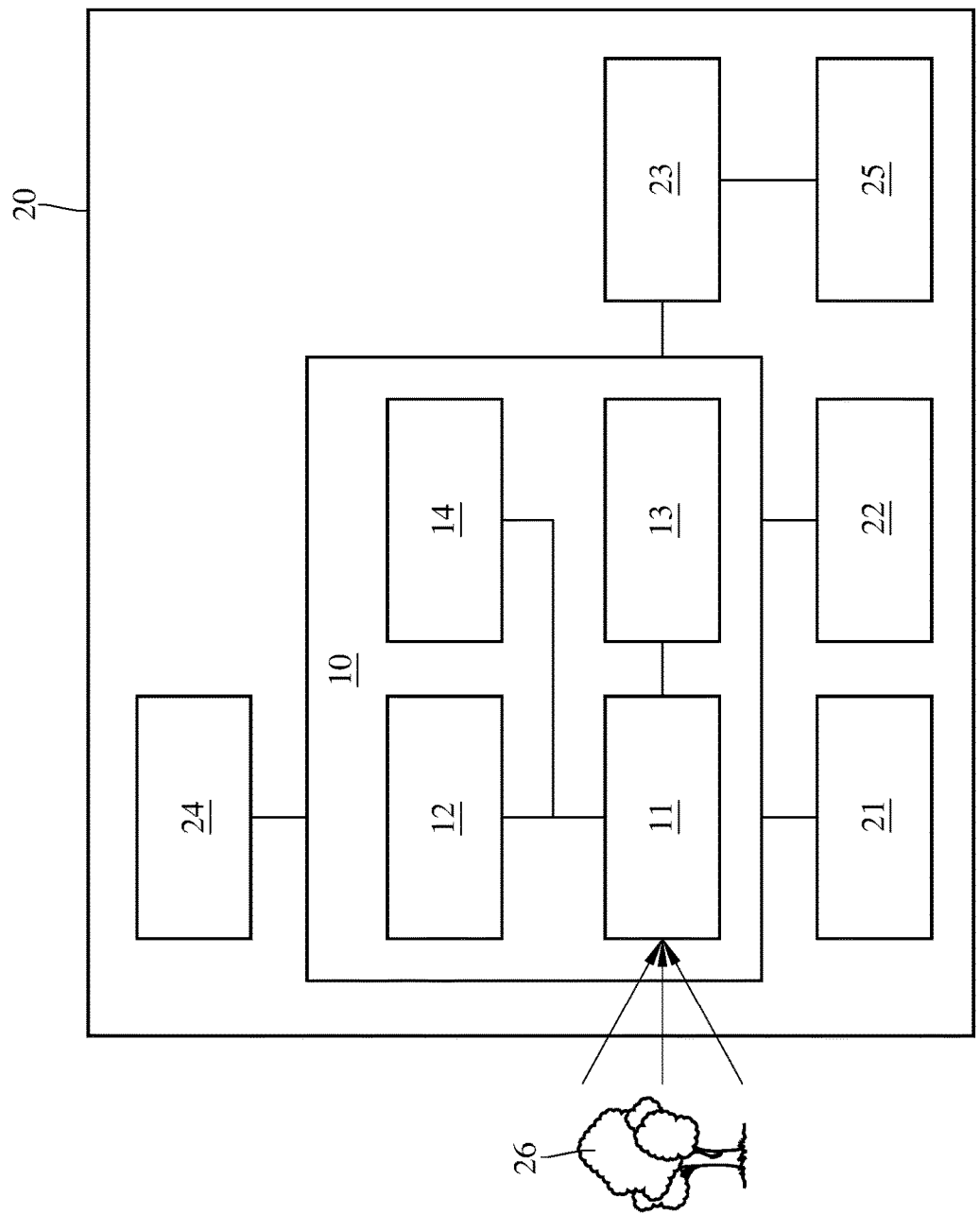
FIG. 28 is a block diagram of the electronic device in FIG. 26.

FIG. 26 is one perspective view of an electronic device according to the 14th embodiment of the present disclosure. FIG. 27 is another perspective view of the electronic device in FIG. 26. FIG. 28 is a block diagram of the electronic device in FIG. 26. In this embodiment, an electronic device 20 is a smartphone including the image capturing unit 10 disclosed in the 13th embodiment, a flash module 21, a focus assist module 22, an image signal processor 23, a user interface 24 and an image software processor 25. In this embodiment, the electronic device 20 includes one image capturing unit 10, but the disclosure is not limited thereto. In some cases, the electronic device 20 can include multiple image capturing units 10, or the electronic device 20 further includes another different image capturing unit.

When a user captures the images of an object 26 through the user interface 24, the light rays converge in the image capturing unit 10 to generate an image, and the flash module 21 is activated for light supplement. The focus assist module 22 detects the object distance of the imaged object 26 to achieve fast auto focusing. The image signal processor 23 is configured to optimize the captured image to improve the image quality. The light beam emitted from the focus assist module 22 can be either conventional infrared or laser. The user interface 24 can be a touch screen or a physical button. The user is able to interact with the user interface 24 and the image software processor 25 having multiple functions to capture images and complete image processing.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the image system lens assembly of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-24 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image system lens assembly comprising seven lens elements, the seven lens elements being, in order from an object side to an image side, a first lens element, a second lens element, a third lens element, a fourth lens element, a fifth lens element, a sixth lens element and a seventh lens element;

wherein at least one surface among object-side surfaces and image-side surfaces of the fifth lens element, the sixth lens element and the seventh lens element has at least one critical point in an off-axis region thereof, a number of lens element having an Abbe number less than 38 among the seven lens elements is NVd38, a displacement in parallel with an optical axis from an axial vertex of an image-side surface of the fourth lens element to a maximum effective radius position of the image-side surface of the fourth lens element is Sag42, a central thickness of the fourth lens element is CT4, a focal length of the image system lens assembly is f, a composite focal length of the third lens element and the fourth lens element is f34, and the following conditions are satisfied:

$5 \leq NVd38$;

$-1.5 < Sag42/CT4 < 3.0$; and $-0.80 < f/f34 \leq 0.36$.

2. The image system lens assembly of claim 1, wherein a number of lens element having an Abbe number less than 35 among the seven lens elements is NVd35, and the following condition is satisfied:

$5 \leq NVd35$.

3. The image system lens assembly of claim 1, wherein a sum of Abbe numbers of the seven lens elements of the image system lens assembly is $\Sigma Vd$, and the following condition is satisfied:

$70.0 < \Sigma Vd < 245.0$.

4. The image system lens assembly of claim 1, wherein a central thickness of the sixth lens element is CT6, a central thickness of the seventh lens element is CT7, and the following condition is satisfied:

$0 < CT6/CT7 < 2.10$.

5. The image system lens assembly of claim 1, wherein a curvature radius of an object-side surface of the third lens element is R5, the focal length of the image system lens assembly is f, and the following condition is satisfied:

$-3.0 < R5/f < 3.0$.

6. The image system lens assembly of claim 1, wherein the focal length of the image system lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, and the following conditions are satisfied:

$-2.0 < f/f1 < 3.0$;

$-2.0 < f/f2 < 2.0$;

$-2.0 < f/f3 < 2.0$;

$-3.0 < f/f4 < 3.0$;

$-3.0 < f/f5 < 3.0$;

$-3.0 < f/f6 < 3.0$; and $-3.0 < f/f7 < 3.0$.

7. The image system lens assembly of claim 6, wherein the focal length of the image system lens assembly is f, the focal length of the sixth lens element is f6, and the following condition is satisfied:

$0.40 < f/f6 < 2.5$.

8. The image system lens assembly of claim 1, wherein at least one of the seven lens elements has an Abbe number less than 20.

9. The image system lens assembly of claim 1, wherein each of at least two of the seven lens elements has at least one inflection point, an axial distance between an object-side surface of the first lens element and an image surface is TL, an entrance pupil diameter of the image system lens assembly is EPD, the focal length of the image system lens assembly is f, and the following conditions are satisfied:

$0.8 < TL/EPD < 2.8$; and $0.5 < TL/f < 1.6$.

10. The image system lens assembly of claim 1, wherein each of at least three adjacent lens elements among the seven lens elements has an Abbe number less than 38, a maximum effective radius of an object-side surface of the first lens element is Y11, a maximum effective radius of an image-side surface of the seventh lens element is Y72, and the following condition is satisfied:

$0.1 < Y11/Y72 < 1.0$.

11. The image system lens assembly of claim 1, wherein the first lens element has positive refractive power, the first lens element has an object-side surface being convex in a paraxial region thereof, the sixth lens element has an object-side surface being convex in a paraxial region thereof, the seventh lens element has negative refractive power, the seventh lens element has an image-side surface being concave in a paraxial region thereof, a curvature radius of the object-side surface of the first lens element is R1, a curvature radius of the image-side surface of the seventh lens element is R14, the focal length of the image system lens assembly is f, and the following conditions are satisfied:

$0 < R1/f < 1.5$; and $0 < R14/f < 1.6$.

12. The image system lens assembly of claim 1, wherein the second lens element has negative refractive power, a curvature radius of an object-side surface of the second lens element is R3, a curvature radius of an image-side surface of the second lens element is R4, and the following condition is satisfied:

$0 < (R3-R4)/(R3+R4) < 1.0$.

13. The image system lens assembly of claim 1, further comprising an aperture stop disposed between an imaged object and the third lens element, wherein an axial distance between the aperture stop and an image-side surface of the seventh lens element is SD, an axial distance between an object-side surface of the first lens element and the image-side surface of the seventh lens element is TD, a minimum value among all absolute values of focal lengths of the seven lens elements is |f|min, a maximum value among all absolute values of focal lengths of the seven lens elements is |f|max, and the following conditions are satisfied:

$0.7 < SD/TD < 1.1$; and $0 \leq |f|min/|f|max < 0.10$.

14. An image capturing unit, comprising:
the image system lens assembly of claim 1; and
an image sensor disposed on an image surface of the image system lens assembly.

15. An electronic device, comprising:
the image capturing unit of claim 14.

16. An image system lens assembly comprising seven lens elements, the seven lens elements being, in order from an object side to an image side, a first lens element, a second lens element, a third lens element, a fourth lens element, a fifth lens element, a sixth lens element and a seventh lens element;
wherein at least one surface among object-side surfaces and image-side surfaces of the seven lens elements has at least one critical point in an off-axis region thereof, a number of lens element having an Abbe number less than 38 among the seven lens elements is NVd38, an axial distance between an object-side surface of the first lens element and an image surface is TL, an entrance pupil diameter of the image system lens assembly is EPD, a focal length of the image system lens assembly is f, a focal length of the sixth lens element is f6, a curvature radius of an object-side surface of the fifth lens element is R9, a curvature radius of an image-side surface of the fifth lens element is R10, and the following conditions are satisfied:

$5 \leq NVd38$;

$0.8 < TL/EPD < 2.8$;

$0 \leq |f/R9| + |f/R10| < 5.0$; and $-1.07 \leq f/f6 < 3.0$.

17. The image system lens assembly of claim 16, wherein a number of lens element having an Abbe number less than 35 among the seven lens elements is NVd35, and the following condition is satisfied:

$5 \leq NVd35$.

18. The image system lens assembly of claim 16, wherein an axial distance between the sixth lens element and the seventh lens element is T67, a central thickness of the seventh lens element is CT7, and the following condition is satisfied:

$0.30 < T67/CT7 \leq 1.0$.

19. The image system lens assembly of claim 16, wherein the focal length of the image system lens assembly is f, a focal length of the seventh lens element is f7, and the following condition is satisfied:

$-2.5 < f/f7 \leq -1.2$.

20. The image system lens assembly of claim 16, wherein the focal length of the image system lens assembly is f, a composite focal length of the first lens element and the second lens element is f12, and the following condition is satisfied:

$0.60 < f/f12 < 2.0$.

21. The image system lens assembly of claim 16, wherein the focal length of the image system lens assembly is f, a curvature radius of an image-side surface of the sixth lens element is R12, and the following condition is satisfied:

$f/R12 \leq 0$.

22. The image system lens assembly of claim 16, wherein an f-number of the image system lens assembly is Fno, the axial distance between the object-side surface of the first lens element and the image surface is TL, a maximum image height of the image system lens assembly is ImgH, and the following conditions are satisfied:

$0.8 < Fno < 2.4$;

$2.0 \text{ mm} < TL < 8.0 \text{ mm}$; and $0.8 < TL/ImgH < 3.0$.

23. The image system lens assembly of claim 16, wherein at least one of the seven lens elements has an Abbe number less than 20.

24. The image system lens assembly of claim 16, wherein the seventh lens element has an object-side surface being convex in a paraxial region thereof and an image-side surface being concave in a paraxial region thereof.

* * * * *